(12) United States Patent
Lerner

(10) Patent No.: US 12,704,225 B1
(45) Date of Patent: Aug. 11, 2026

(54) HYDROGEN FUELING SAFETY INDICATOR

(71) Applicant: William S. Lerner, Litchfield, CT (US)

(72) Inventor: William S. Lerner, Litchfield, CT (US)

( * ) Notice: Subject to any disclaimer, the term of this patent is extended or adjusted under 35 U.S.C. 154(b) by 0 days.

(21) Appl. No.: 18/899,797

(22) Filed: Sep. 27, 2024

Related U.S. Application Data

(63) Continuation of application No. 18/094,863, filed on Jan. 9, 2023, now Pat. No. 12,135,113, which is a continuation-in-part of application No. 17/347,427, filed on Jun. 14, 2021, now Pat. No. 11,572,982.

(60) Provisional application No. 63/039,118, filed on Jun. 15, 2020.

(51) Int. Cl.
*F17C 5/00* (2006.01)
*B60L 53/16* (2019.01)
*B60S 5/02* (2006.01)

(52) U.S. Cl.
CPC .............. *F17C 5/007* (2013.01); *B60L 53/16* (2019.02); *B60S 5/02* (2013.01); *F17C 2221/012* (2013.01); *F17C 2250/043* (2013.01); *F17C 2250/0439* (2013.01); *F17C 2250/0443* (2013.01); *F17C 2265/065* (2013.01); *F17C 2270/0178* (2013.01)

(58) Field of Classification Search
CPC .................. F17C 7/00; F17C 2221/012; F17C 2250/0636; F17C 2265/065; F17C 13/025; F17C 13/026; F17C 2250/0452; F17C 2250/0626; F17C 2250/01; H01M 8/04686; H01M 8/04373; H01M 8/04425; H01M 8/0444
USPC ............................................................ 141/96
See application file for complete search history.

(56) References Cited

U.S. PATENT DOCUMENTS 6,899,151 B1 * 5/2005 Latka ..................... B67D 7/426 141/94
12,227,103 B1 * 2/2025 Lerner .................... B60L 58/12
2017/0074707 A1 3/2017 Mathison
2018/0205102 A1 7/2018 O'Brien et al.
2020/0173607 A1 6/2020 Mathison
2020/0276909 A1 9/2020 Boisen et al.
(Continued)

FOREIGN PATENT DOCUMENTS

CA 2844897 A1 9/2014
JP H07260773 A 10/1995

OTHER PUBLICATIONS

JPH07260773A—English Translation (Year: 1995).
(Continued)

*Primary Examiner* — Christopher M Afful
(74) *Attorney, Agent, or Firm* — Scale LLP

(57) ABSTRACT

One or more indicators provide an indication of fueling status of a hydrogen powered vehicle. One or more sensors detect temperature and/or other characteristics of the fuel provided to the vehicle and provide an electrical signal to one or more of the indicators to permit an indication of fueling status. The indicators, which may be visual and/or audible, may be positioned on the fueling apparatus and on the vehicle in the vicinity of a fueling receptacle. The indicators may also be positioned elsewhere on the vehicle and may be separate from the vehicle such as on or around a fueling station and/or on separate computerized devices. Certain of the visual indicators may be positioned on a fueling hose and may include electrically energized paint and an illuminated sheath.

26 Claims, 32 Drawing Sheets

(56) References Cited

U.S. PATENT DOCUMENTS

| | | | |
|---|---|---|---|
| 2020/0346554 | A1 | 11/2020 | Boisen et al. |
| 2020/0363016 | A1 | 11/2020 | Gambone et al. |

OTHER PUBLICATIONS

Society of Automotive Engineers (SAE) International J2601, Surface Vehicle Standard (Year: 2014).

Temperature Limit Values For Touching Cold Surfaces with the Fingertip, Geng et al. (Jun. 15, 2006—online publication).

* cited by examiner

HYDROGEN FUELING SAFETY INDICATOR

RELATED APPLICATIONS

This application is a continuation of and claims priority to U.S. patent application Ser. No. 18/094,863 filed on Jan. 9, 2023, entitled HYDROGEN FUELING SAFETY INDICATOR which application is a continuation-in-part of and claims priority to U.S. patent application Ser. No. 17/347,427 filed on Jun. 14, 2021, entitled HYDROGEN FUELING SAFETY INDICATOR and issued as U.S. Pat. No. 11,572,982, which application claims priority to U.S. provisional patent application 63/039,118 filed on Jun. 15, 2020. The aforementioned applications 17/347,427 and 63/039,118 are each hereby incorporated by reference in their entirety.

FIELD OF THE DISCLOSURE

This disclosure relates generally to fueling of vehicles and more particularly to systems for improving fueling safety.

BACKGROUND

Vehicles powered by hydrogen, often referred to as FCEVs (Fuel Cell Electric Vehicles) have recently been introduced. Such vehicles appear to the ordinary driver/operator to operate very similarly to conventional fossil fuel (e.g., gasoline, diesel) powered vehicles. Fueling of such vehicles has been designed to mimic in some ways fueling of fossil fuel-based vehicles. The characteristics of hydrogen however pose threats to operators of hydrogen powered vehicles, which can take a variety of forms including airborne, seaborn vehicles, and, any other powered vehicle that uses hydrogen alone or a mix of hydrogen and battery or gasoline or other fuel. It can be difficult to identify the type of fuel employed by a vehicle as certain passenger vehicles share global platforms that allow for a switch between a traditional gasoline engine, to a hydrogen powertrain and other vehicles such as military vehicles may be modified to have full or partial hydrogen propulsion. What is needed are improved systems, apparatus and methods for safely and predictably refueling vehicles powered by energy sources, such as hydrogen, that differ from conventional fossil fuels.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

DETAILED DESCRIPTION

Figure 1:
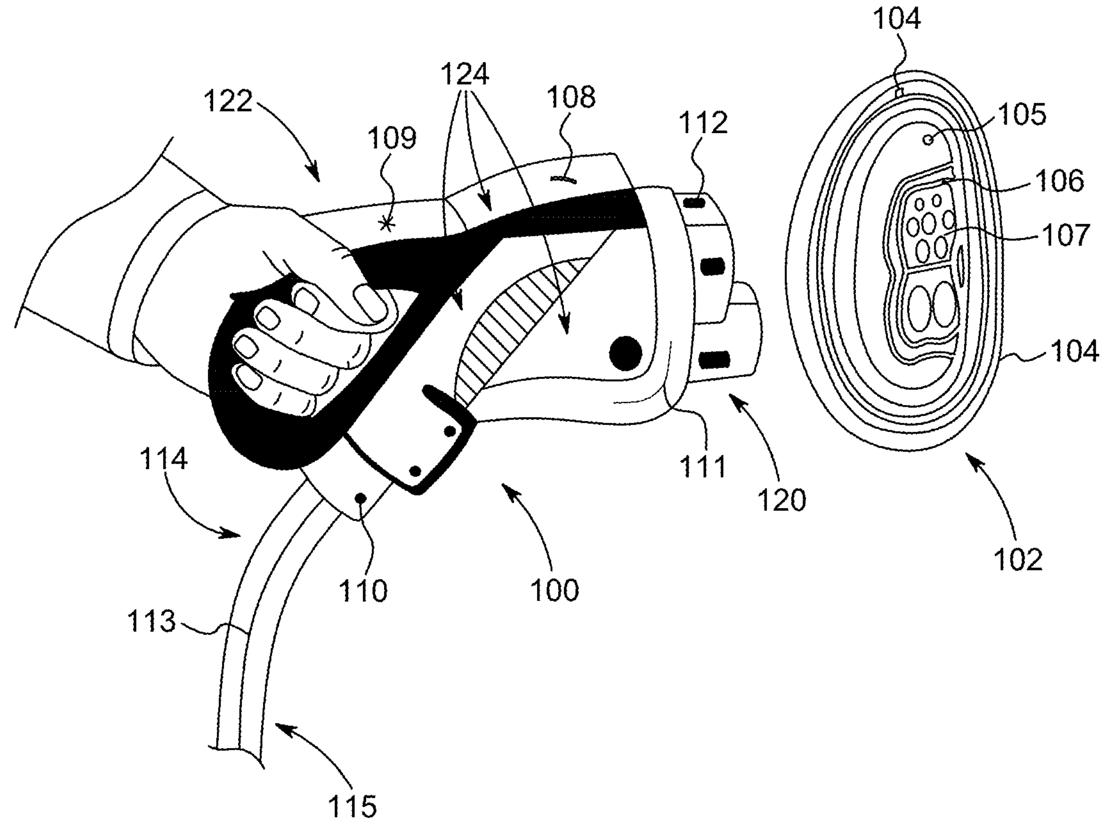
FIG. 1 is a view of a first embodiment of a hydrogen fueling handle and receptacle that operates to provide information regarding fueling status.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

As used herein, the term "vehicle" includes a thing or device with a self-contained motor or similar apparatus that causes movement of the thing or device, and which contains a source of energy. The vehicle may be used for transporting people or goods, such as those that move on land or water (on water or underwater), in the air, within the earth's atmosphere or in outer space or the vehicle may not necessarily transport anything other than the vehicle itself, such as a satellite, or a car or flying drone equipped with cameras or other sensors. The source of energy may be, by way of example, petroleum-based fuel, other type of liquid, gaseous or solid fuel (such as natural gas, propane or liquified hydrogen) or may be a battery or may be a combination thereof.

It should be noted that with the introduction of new energy sources for vehicles, such as batteries and hydrogen it is becoming increasingly difficult to identify the energy source(s) employed by a vehicle. Some vehicles, for example, military vehicles may require two types of propulsion for example, using one as a backup source of power. Many passenger vehicles share global platforms that allow for the switch between a traditional gasoline engine, to a hydrogen powertrain. Many expensive vehicles, such as military vehicles may be modified to have full or partial hydrogen propulsion. As we move towards cleaner emissions and away from traditional fossil fuels, the conversions or conversion may be partial or a full conversion. For example, large automobile carrying ships can transport between 4000-8000 vehicles. It is unreasonable to put this ship out of service because it currently uses diesel propulsion. So, a partial conversion, or use of a "cleaner" energy source like hydrogen may be gradually retrofitted in steps, if there are multiple engines for example. Large passenger airplanes may have their fossil fuel engines replaced at one time, or two of the four engines may be converted to hydrogen. Mixed fuel engines may be the first step to a full conversion to hydrogen for example. Or the hydrogen components may be used as a power assist, much like a vehicles mild hybrid assist system. Or the hydrogen propulsion system may be for power if the primary means of propulsion fails, due to mechanical issues or the inability to refuel (if it is a military vehicle in the field). This would make the hydrogen propulsion or power have the same function as a home generator that is always ready if there is a power outage.

Hydrogen technologies are not widely understood by the public. Only 11,000 fuel cell vehicles are currently on the road as of January 2020. In contrast, the first purpose-built gas station was opened in 1905, and for the past one hundred and fifteen years, the public has come to understand gasoline powered vehicles, gasoline stations, and the properties of gasoline as a fuel which powers their automobiles, trucks, buses, trains, boats, motorcycles, etc. Hydrogen as a pre-cooled compressed gas is virtually unknown to consumers. FCEVs (Fuel Cell Electric Vehicles) act like "normal" cars in the sense that the operator (driver) gets in the car, starts it, drives it like a gasoline powered car, and when the fuel is low, the car is taken to a self-service refueling station. The station looks similar to a gasoline station, and so does the "pump", sometimes referred to as a fueling dispenser. A typical pump is a tall rectangle, with a display, and a hose and handle similar to a gasoline pump. The vehicle has a fueling door that opens, like a gasoline vehicle, but here is where the similarities end. Instead of the consumer finding a plastic gas cap that they twist and remove, or "capless" filling nozzle insert, they find a round bar of metal, with a small opening at the end, that goes into the vehicle. On top of the end ball, bar or connection device, there is a small plastic cap. The consumer swipes his or her credit card, chooses between two current fill levels (350 or 700 bar, higher in the future) grabs the large handle and connects the end which looks like a gas nozzle to the vehicle, often with a secure snap into place system. The fueling handle does not have the usual 10 inches or so, slightly curved metal tube, that slides into the tank of a gasoline or diesel-powered vehicle. This procedure is known to any individual that has ever driven or filled a car, since the first purpose-built gasoline station was built in 1905. This is where all similarities end. For gasoline fueling, the driver or attendant can take the handle and insert it into the vehicle without any conscious thoughts. The long tube is tightly inserted into the hollow tube, guided in, and stops when it is inserted. To begin the fueling process, you simply pull the trigger like metal bar, let it click in place and you can get back in the car (or stand by it, manually holding the lever on the filling handle, if no such self-pumping mode is built into that handle). We do this without really paying attention. It has become a reflex without thought, like tying a sneaker.

The fueling handle for an FCEV does not slide into place. It is attached to the fueling nozzle inside the covered door area of the vehicle. It clicks and locks into place. Metal to metal. The handle is heavy, the attachment nozzle is small. It is not a rote experience. Attention must be paid. Why? Hydrogen coming out of the fueling handle is typically pre-cooled to −40 to −50 C. One drop on exposed skin will likely cause a disfiguring third degree burn. The elderly have thinner skin than the young and are even more susceptible to thermal injuries. Additionally, the elderly may "freeze" in a moment of panic. Children exhibit the same documented behaviors. If the pre-cooled hydrogen leaks onto a wearer's foot in sandals (such as "flip flops") the same situation will occur. Once the fill is completed, the whipping effect of the return of the nozzle to the dispenser pump can spray the hydrogen to others in the vicinity. Additionally, young individuals may be curious and touch the end of the pump or the fueling connector, which will cause a contact burn immediately and the exposed skin may become attached to the end of the fueling handle, or vehicle connector. The fueling procedure must be taught, learned and carefully followed. Studies of distraction from mobile phones, emails, texts, social media, and the like, can nullify attention spans, especially when a situation seems familiar.

There is unfortunately no margin for error concerning safely refueling a FCEV vehicle, and carefully returning the handle to the dispenser. The public does not understand hydrogen as a filling medium, and its potentially grave consequences. In one case a woman pulled her FCEV into a fueling station, parked and went into the store area. The passenger switched seats and proceeded to fill the hydrogen vehicle. The woman came out of the station, and got in the car, and drove off, assuming the fill was completed. It was not. The car went fifty feet or so, and she stopped. The passenger and two unrelated individuals from different areas of the station ran to the car, and proceeded to remove the handle, which was attached to the vehicle, without its hose attached. Due to the inexperience or made up "safety response" or needs, they were clueless about the handle's temperature. It was clearly up to −20 to 40 C, depending on the specifics. All three individuals were treated for thermal injuries and taken from the station in three different ambulances.

When a person fills a hydrogen vehicle, they must remove a small plastic cap, and after the fill they have to replace the plastic cap. At night they may not be able to see the cap perfectly due to shadows. The nozzle can become so cold it can cause a thermal injury in seconds or skin can become frozen to it. Additionally, men with very large hands, or women with long fingernails may have issues taking off plastic cap and putting it back on. The system is designed with the average person in mind. Again, hydrogen fueling is novel to most, and there are no courses for the public to take, and generally not much interest by consumers in learning the differences between gasoline and hydrogen refueling. Even if a dealer shows the new owner everything, one of the owner's children or friends may borrow the vehicle, or the hydrogen vehicle could be a dealer loaner car, or a newly introduced mail truck, delivery truck, bus, taxi, tram, etc. Also, if FCEVs become rental cars, the chances for injury increase as the renters are less likely to be familiar with the fueling procedures and the associated dangers. Motorcycles present another level of danger, because they are inherently unstable, and if knocked over due to a bump or a kickstand malfunction, they could cause a "breakaway" situation, where the hose separates from the filling handle, whipping the hydrogen about before the safety cut off prevents hydrogen from coming out of the hose that is detached from the handle. Any hydrogen entering the delicate eye area of the user could result in a grave injury or blindness.

Hydrogen as a fuel presents uncountable differences and additional hazards that gasoline or diesel does not experience. Back-to-back fills at a hydrogen station can alter the dynamics, pressures in the storage tank, and vehicle tank can present challenges, rubber seals, and hoses are subject to greater pressure and colder temperatures. While the hydrogen tanks are generally not the issue of a fault, all the supporting components generally are. Hydrogen tends to embrittle many components, and the prolonged freezing cold temperatures can affect the fueling hose and handle. Hydrogen also likes to hide in liners, and even if one believes a tank is fully empty or purged, it may not be. The pre-cooled hydrogen goes through a fueling hose at roughly −40 to −50 C.

Gasoline may be delivered from a dispenser to a vehicle at ambient temperatures, while a hydrogen station's hose can have it contents be −40 and deliver them when it is 106 Fahrenheit. The thermal differences take a toll on the equipment which could lead to premature failures. Human error (such as not tightening a bolt) has already led to an explosion in a hydrogen fueling station. Enough real-world incidents to safely predict all parameters have not yet occurred. By way of example, a hydrogen vehicle being fueled during a monsoon in Miami, Florida, where it is 102 F and humid, may be very different that a fill in a blizzard in Alaska. Those in the industry and writing standards and guidelines know extremely cold surroundings can be a challenge. Sensors, networks and other types of wired and wireless communications can fail due to moisture, heat, freezing and rapid temperature changes. Areas such as in Connecticut may have a summertime high of 98 F and a wintertime low of −6 F. We do not have sufficient data as to how these systems of communication between the vehicle and the dispenser will function properly. Nor have the couplings been standardized. Meaning a 350 Bar hose fitting should not fit a 700 Bar fitting. They should not be interchangeable by the standard, however at a standards meeting it was disclosed by a manufacturer that was not the case with their products. We have also not decided on the force that initiates a "break away" situation in a drive off. The testing and standard force have yet to be decided. It is also known that the hoses are not as robust as the experts would like them to be. Additionally, the standards world is questioning the stability of type 5 composite cylinders. There is simply not enough data or time in the market or field to draw unchangeable conclusions. We also assume that the vehicle has not been damaged, or improperly repaired before it is filled. Many substandard repairs to engines and fueling lines occur at repair facilities, exponentially increasing the likelihood of a leak, explosion, fire, etc. If there is a break away situation where a hose is severed from the handle or vehicle, the remaining material in the hose can cause an instant thermal injury to one's hand, face, neck, eye or foot. The dispenser is designed to stop the fueling process during a "break away" situation (meaning if someone forgets to disconnect the handle from the vehicle and drives away) but there is no measure to stop the cooled hydrogen in the hose at the time. That is simply dispersed into unknown areas. Typically, hydrogen fueling stations are located in the same station that sells gasoline, diesel or may have battery chargers for electric vehicles. Those working at the station, will in all likelihood not possess the knowledge needed or have the training to fully understand the specific needs and dangers of the hydrogen and its related equipment.

An FCEV cannot be driven in a tunnel in the New York metropolitan area, which connects Manhattan to New Jersey as of October 2022, because the safety systems cannot handle non-gasoline powered vehicle events. The disclosed embodiments address the above-noted issues and permit certain usage of hydrogen vehicles in tunnels and bridges and in certain parking structures. New Jersey's, Governor Murphy signed legislation in 2019 mandating 10% of state vehicles produce zero emissions by 2024, 50% by 2025, and 100% by 2032. NJ Transit has fielded eight (8) EV/Hydrogen buses at this time in an effort to move toward those legislative mandates. This will be the first time that hydrogen powered or hybrid hydrogen/EV buses will be allowed in previously restricted areas. Hydrogen buses present unique challenges during emergency events. While passenger vehicle's TPRDs release the hydrogen downwards during an emergency purge, the buses vent the hydrogen upwards, which presents it's own set of unique dangers in a tunnel. Hydrogen that ignites and is at the tunnels ceiling height can create a fire that spreads in both directions of the tunnel. The hydrogen venting may also catch fire if lighting or exposed electrical outlets are in its path. The buses being deployed in New Jersey that travel through the tunnels to New York represent a unique and never tested set of scenarios. Will the venting of the tunnels be sufficient? Will the hydrogen on the ceiling area, if the TPRD vents and purges all the hydrogen gas, make rescues more difficult? Clearly, the answer is yes, since these buses are not only electric, which presents their own challenges, but are also hydrogen powered. The bus may have a failure in the battery packs, which could cause the hydrogen components to fail, and release their entire contents upwards by the TPRD (Thermal Pressure Relief Device) or similar device. Or the hydrogen components of the bus, may fail causing a battery issue, such as off gassing, fire, propagation, and re-ignition for up to three weeks. Additionally, these battery packs that power the bus are very large, heavy and powerful. Suppression of a battery event on a bus, is not the same as a hydrogen powered vehicle. These buses can weigh upwards of 45,000 pounds, be sixty feet long, and hold a total of 73 passengers. A typical hydrogen vehicle weighs 4000 pounds with a length of 15 feet and holds a maximum passenger capacity of five. These large bus fires will require more time and resources to suppress or put out the fire. One manufacturer is putting the Emergency Response Guide by the driver of the bus. So, if there is an incident, the first responder has to board a bus which may be on fire or smoke filled, look for a guidebook which may or may not be there, then exit the bus, read it and make a plan with the other first responders on the scene? That is implausible, when you might have 73 occupants of the bus in danger, and the surrounding areas affected. Additionally, one of the largest global manufacturers of trucks estimates that only half of their truck and fleet buyers care about having the ERGs available. Additionally, first responder, second, and third responder training is not standardized and there is much confusion about the amount of water, rescue tools, toxins emitted, PPE, distances to cordon off, gasses produced, and how to protect the public and infrastructure. One example is battery pack resignation. Often it is not mentioned, and if it is generally, it is stated that it may occur in 24 hours. This is a false statement, re-ignition can and has occurred up to three weeks after the initial battery fire. First responder and the public's health issues are not properly disseminated either. Those exposed to HF vapor clouds, cannot have symptoms that show up for up to 24 hours later. They may leave a scene, feel fine and then suffer the potentially grave health issues these battery gasses can cause. Typical symptoms that have been observed in first responders, are skin irritations, lung irritations which may cause permanent damage. Furthermore, these EV/Hydrogen busses may be modified based on battery development needs, or market changes. Meaning these busses may need replacement batteries that are of a different type, such as solid state, or they may find that retrofitting them to be powered purely by hydrogen may be advantageous. These busses, unlike passenger cars are in constant use, and can cost upwards of one million dollars in 2022 (with significant price adjustments as more are produced), so retrofitting and modernizing them is expected. Their service life is much longer than an average passenger vehicle. Additionally, they may be somewhat modular, and offer any type of fuel, battery, or combination of fuels. That may change, but to the first responder and public, the bus will look the same, no matter how it is powered. The visual, acoustical and wireless indicators can change as the bus is modified to give the specific warnings and indicate the propulsion type. This becomes a dynamic situation and allows the first responders and public know what the dangers are immediately. An ERG on board may be missing or worse outdated based on the previous battery or fuel type, leading to an improper remediation strategy. The handle, collar, area of the connector and station, will send the freeze or thaw alerts the same way if HF or other gasses or indications of a hydrogen leak, fire, battery off gassing, component failure, hose failure or other vehicle powertrain or station issues are detected that present a danger to the user, station or surrounding areas. However, if the bus that is disclosed herein fills up at a hydrogen station, the sensors on the handle can be a failsafe system to some degree. Each time the bus fills up the handle can sniff for any HF or hydrogen or battery related gasses. It is like a mini-safety check that the buses diagnostic may miss. A battery failure can happen in seconds from vapor cloud to fire. It is well known that it happens so quickly that often smoke detectors do not have enough time to process the information and set off an alarm.

A number of incidents in hydrogen fueling systems have been experienced and the risk of failure can arise from a number of components in the fueling system including, compressor fracture, hose disintegration, dispenser handle embrittlement, dispenser leakage, valve leakage, O-ring extrusion, O-ring swelling, O-ring rupture, etc. These issues are documented and have caused accidents in Korea (May 2019), Norway (June 2019) and the US (June 2019) for example. The incident in Norway was at a hydrogen fueling station. Hydrogen was leaking from equipment at the station. The leak was due to human error, where a connection was not installed, and tightened properly. There was a fire, and explosion. The injuries were not due to the hydrogen fire but were sustained due to the explosion which triggered airbags to deploy in nearby vehicles. This is highly unusual, but an unaddressed concern. If the occupants of the vehicle or those around the station were warned of a potential explosion, and unintended side effects, the airbag injuries might have been mitigated. A visual and or acoustical warning such as disclosed herein should have occurred at the station, immediately after the leak was detected. Everyone at the station, should have been alerted to immediately exit the station and surrounding area. Hydrogen is an odorless, colorless gas that can burn invisibly to the naked eye in daylight. A member of the public could have walked directly into the hydrogen flame while smoking, which would have caused a disfiguring burn or death. The public does not understand the differences between hydrogen and other fuel sources. The industry and the standards bodies are still collecting information. What is needed first are safety protocols to protect the public and workers.

In hydrogen fueling, if a coupling, seal, hose, or handle fails, the enormous pressure of a 350 or 700 BAR (1200 BAR fills are expected in the future) (700 Bar=10,152.64164 Psi) fill can disperse hydrogen that is pre-cooled to a temperature range of −40 to −50 C (in 2020). This hydrogen will potentially cause third degree burns to unprotected skin, sometimes, immediately, and if it is to a hand region, it could limit the users hand motion in the future, by destroying the skin, nerves, joints or tendons. Breakaway devices, which are defined as hydrogen handle dispenser to vehicle unintended separations, do have standards, and as of October 2022 the newton force for the breakaway standard has not been globally decided upon at ISO, but no acoustical or visual warnings are noted. Systems exist to shut off all internal connections compressors, valves filters, storage tanks, shut off valves, check valves etc. The specific break away, will vary from dispenser to dispenser and is designed to stop the flow of hydrogen out of the hose if the handle is separated due to a user error or equipment malfunction. This can include a drive away situation, where the driver forgets, the handle is still attached to the car, or due to a cracked hose that separates from the handle in an unanticipated way. The hose may have been subjected to a run over situation by a car or truck, or may have been dropped with great force, which eventually could cause the handle to separate from the filling hose. Even after the dispenser stops the flow of hydrogen, there is still hydrogen in the hose. The hose has a "whipping effect" since it was violently separated from the handle, and sprays the residual contents about, and potentially on to those in the area, and may do so for customers on both sides of the dispensers at an island, with multiple dispensers on its two sides. Failures can also be caused or facilitated by aging which can cause embrittlement in parts and by improper installation or maintenance and dropping of the hose in normal use.

Humidity of certain levels can increase the chance of freezing of the fueling nozzle to the vehicle. Back-to-back fueling can also contribute to such freezing. For example, a hydrogen dispenser that fills two cars per hour, has a different temperature or moisture level that a dispenser filling twenty cars per hour. Ambient temperatures also factor into the equation. Meaning, in Northern Canada in the winter the temperature may be −10 F, and in Arizona it could be 110 F. Both examples have completely different baseline humidity. Ambient temperatures (temperature that is recorded not with the sun's rays on a surface) also play a role in determining calculations for fueling parameters.

Additionally, each state in the United States for example may have its own unique set of rules for fueling and re-fueling. For example: a vehicle owner is allowed to fill a vehicle at a "self-service" station in New York, but a mile away, in New Jersey, the owner is forbidden by law to fill a vehicle. This patchwork of rules creates its own set of known issues. The owner of the vehicle may know how to properly fill their vehicle due to experience or reading the manual. The station attendant in New Jersey may not be trained on how to fill a vehicle properly. And, a lifelong resident of New Jersey may vacation in California, where they may fill a vehicle for the first time on their own. The attendant likely has not been to training courses, read manuals, or have been properly instructed. Often these employees have no training because they are often entry level jobs, requiring no skills in the art of refueling protocols. There may be language barriers and there may be lack of respect for the owner's vehicle and for the station's property. The owner of a vehicle may carefully connect the refueling handle to his or her car, making sure that the connection is correct, and that they do not drop the fueling handle, as to damage it, their car or injure a foot for example. COVID has created a workforce environment where an employee shifts from entry level job to entry level job, if the pay increase is as little as a dollar more an hour. Additionally in 2022, twenty percent of those hired fail to show up for work on the first day. The employee of the station that requires an attendant to fill the vehicle, may be careless, distracted or not realize or respect the property of the employer or customer. This repetitive carelessness can create very dangerous situations. The repeatedly dropped refueling handle will be damaged, may leak or not seal properly to a vehicle, creating a greater chance of a fire of incident. The attendant may bang the nozzle into the fueling receptacle so often that the end of the vehicle's connector had indentations. They may attach it in a violent and abusive manner and may do the same at the end of the fill. This repetitive abuse can cause unknown perpetual incidents. Standards are written to be followed, and data is derived from the intended design. This is just one example of potential source of perpetual issues concerning fueling and refueling. The current connectors being used on the vehicles are tricky to use in the best of circumstances. It is not a rote procedure like filling a gasoline vehicle.

Standards and data for usage and testing in a variety of areas are lacking, including, testing of equipment and data on the usage in the field of dispensers, breakaways (or drive away events), tank pressure testing for optimal fill results, effect of back-to-back refueling, lifecycle of hoses and related components, nozzles, coupling of nozzles with different flow rates, connection hardware, or wired, wireless, or any other means of communications between the dispenser and the vehicle. The breakaways or drive-aways, are well known in the field and function as intended. However, with hydrogen fueling there is no agreement of force of separation (666 newtons to 2000 newtons) and there are documented issues where the breakaway occurred from an attendant dropping a fueling handle. There is also documentation where a customer drove off, with the nozzle in the vehicle, and the fueling hose got caught on the dispenser and pulled the fueling dispenser out of the housing, creating a very dangerous situation. There is currently little agreement among the suppliers of the hydrogen, the suppliers of the components and the automakers. ISO (The International Organization for Standardization, which represents 164 member countries, CSA (Canadian Standards Organization) and SAE (Society of Automotive Engineers) and regulatory and standards bodies from up to 164 individual countries, like AFNOR from France, for example, all come together with global experts and are currently trying to gather the disparate information, and data, with no clear direction to harmonizing the directions. An example of this alarmingly dangerous, and life-threatening situation, is that the largest supplier of fueling nozzles, hoses, and handles, has fittings that do not allow low flow equipment to be used for heavy duty use. They prevent bursting and dangerous malfunctions by making the connections different, however only on some parts, and are working towards full protection. Another global supplier has no such safeguards in place and all components are fully interchangeable. Meaning a hose designed for 35 megapascals, can be swapped for use in a 70 megapascal application, creating unforeseen issues, which could lead to bursting, fires, explosions, etc. Furthermore, there is no way to immediately tell what the combination of components are at a fueling station. Marine, Industrial, rail, motorsports, including motorcycles, ATV's, jet ski and any other form of transportation, for leisure or commerce have not been standardized or even have working drafts to achieve such goals. For example, a gasoline vehicle may be towing a hydrogen powered small pleasure boat, and both may need to be re-fueled, so the user will have to fill both, which may compound the confusion, if it is his or her first time fueling a newly purchased hydrogen fueled item.

Among the many issues that exist: (i) common universal language to describe the issues and standard is not agreed upon. (ii) Lack of coding of the nozzles which include: H25, H35, H35HF, H50, H70, etc. HF designates high flow, which increases all stress parameters, making them more susceptible to issues. In the future the industry will focus on high flow fills and begin to retrofit many older designs. The retrofit parts are often not compatible or suitable. It was disclosed that many non-high flow hoses can be used with high flow equipment causing alarming issues, safety wise and overall failure issues. (iii) Some dispensers have data interfaces, and some vehicles do also. However, in any scenario a vehicle with a data interface, may be filled at a station without a data interface, rendering it useless. And the fueling station may have a data interface, but not communicate with a vehicle that lacks one. And, in the future, gasoline, diesel, or battery vehicles may be converted to hydrogen, if it is a cleaner and less expensive alternative than replacing a vehicle's battery which may cost $15, 000.00 vehicle. If an older vehicle that might have been junked, or an inexpensive vehicle retrofitted, it is possible that the vehicle has analog gauges, and no digital display area. This is the case for jet skis, lawn equipment, forklifts, and other hydrogen powered "tools." And there is no standard for the data interface, if it will actually be implemented to scale and what information or actions it may set in motion. (iv) A nozzle designed for a data interface, can be swapped with a nozzle that was not designed for a data interface. The station owner will not be able to execute or observe any data, since the owner may not know that issue is retarding communication. It is not obviously different and fits perfectly like the correct one. (v) Compatibility testing is currently being discussed, with no globally agreed up standards in place. (vi) Breakaway separation: that is when the hose disconnects from the fueling handle if there is an accidental drive off by a driver after executing a fill but not removing a handle. With traditional gasoline or diesel dispensers, this is well known, and effective. The reason is that gasoline is delivered at ambient temperature, not severely pressurized, flows normally through a standardized hose, into a vehicle. The gasoline is stored as a free-flowing liquid in a car's tank. With a hydrogen dispenser, you have a storage tank above or below ground, that pre-cools the hydrogen to −40 to −50 C, distributes it at 35 to 70 Bar, and pressure fills a tank or three in a vehicle. The parameters for issues are unforeseeable. What will happen if the storage tank of the dispenser produces hydrogen that flows to the vehicle at −60 or −30? How will that affect the dispenser unit, the hose and the vehicle? What will the additional 10 C do to the hoses, fittings, handles, etc. What if there is a tank rupture or a BLEVE (Boiling Liquid Expanding Vapor Explosion)? Will the vehicle nozzle reject the added pressure and kick back the hydrogen on to the customer filling the vehicle? Will the hose burst, showering the user with −60 C hydrogen? We simply do not currently know. (vii) Currently breakaway separation (or "drive away separation) is 667 Newtons. Proposals and usage are documented at 1000 Newtons. 1300-2000 Newtons of force are also being discussed. There is no current agreement as to what force to choose. There have been documented incidents where the separation happened at the wrong time or because the hose was caught on a part of a dispenser, or the hose became wrapped around itself. Violent drops can mimic break away situations, spraying the hydrogen causing severe injuries or violent fires and explosions if the user is smoking. Fueling customers routinely pull up to the dispenser with the filling door on the opposite side. They get out and stretch the handle and hose over the car. Customer's routinely torque and twist the handle and hose. Sometimes so much so, that the next user gets hit in the leg or arm, as the hose and handle try to twist back to their intended state. Tests typically occur at ambient temperatures in controlled environments without deviating improper human behaviors which occur with frequency. We have all seen consumers fill their gasoline vehicles while smoking. We have also experienced consumers twisting hoses when putting them back in the fueling receptacle. When you go to fill your vehicle, it will often leave the cabinet with force and twist about. Additionally, some hoses are constantly tugged on by consumers who do not pull their cars close enough to the fueling dispenser and tug on the handle and hose to reach the vehicle. Consumers give little thought to hoses breaking or handles separating. One documented incident involves a Shell station in Germany. The Shell station performed as designed, the customer and the surrounding individuals did not. These events are unforeseen, and can cause fires, burns, loss of life and massive destruction. The Shell incident as it occurred:

By way of example, a woman pulled into a hydrogen fueling station. She got out of the car to purchase a beverage at the station. The passenger in the other seat moved to the driver's seat and initiated a fill by inserting the filling nozzle to the vehicle fuel receptacle. He then moved back to the passenger seat. The woman approached the car, go in, assumed the fill was complete because her fellow traveler was back in the passenger seat and drove away. She was unaware that the fill was in process, and the hydrogen handle was still attached to the vehicle. The hose separated from the handle, sprayed hydrogen, which did not injure anyone, fortunately. Three individuals ran to her car each trying to remove the fueling handle. Each suffered a severe burn from the cold metal. They were unaware that the handle being attached was not a grave danger, nor were they aware of the cold temperature the handle became due to the separation. Three ambulances came to ferry each panicked bystander to receive wound care. This disclosed vehicle indicator addresses human error, based on a need for immediate action in a clearly defined way at the time of the incident.

The alert and information as disclosed herein can take the form of illuminating the dispenser as a whole, the "island" of fueling dispensers, the roof above the dispensers, the entry sign to the station or the typical "house" that has the attendant, and soft drinks, and bathrooms. Many gasoline and hydrogen stations allow you to pay at the pump using a credit card or pre-paid fuel card. However, those paying with cash must enter the station, and the attendant must then enter the amount paid for fuel into the corresponding pump number. This presents the cashier with a display of information. Which pump is getting the $20.00 cash that the customer paid for example. The pump is activated by the cashier, and the safety systems and warnings described in this application can be mirrored on the display the attendant sees or uses to control the flow or stop the flow of fuel. Although it is ideal for the customer to pay at the pump, which keeps the vehicle, fueling apparatus and operator in the same space during the fill, but some users do not have credit or debit cards. The warnings on the pump, handle or other areas including the vehicle, can be relayed to the station operator. Since most stations have convenience features, such as food, a restroom or the like, human attendants are generally always around. Some states like New Jersey forbid customers to fuel their own vehicles, so there are multiple employees working at one time. Since these fueling attendants, may be going between a gasoline fill, diesel fill and hydrogen fill, the warnings in this application are vital. The attendant has to fill as many cars as he or she can, in rapid sequence, and the care and attention paid may not be ideal. Additionally, these attendants may not be properly trained since this is a relatively low paying job without certificate completion training required in many states or countries.

In certain embodiments, the alert can keep individuals and cars entering a station where there is a malfunction. In such embodiments, there is a visual and or acoustical alert that warns or blocks others from entering the danger zone. For example, if the nozzle is frozen to the vehicle, the driver needs to know when it is thawed. The driver can then remain in the vehicle until the warning symbol/visual indicator and or sound component (acoustical indicator) alerts the driver, they can exit the vehicle and remove the filling handle. Or if the driver goes into the station's store area, they will be able to see by a light on the dispenser and or a light on the vehicle alerting them of the frozen situation, and when it is safe to remove the handle from the vehicle. The screen or information mirror imaging to the attendant in the station will also know when the nozzle is no longer frozen and may be disconnected. As we have more and more electric vehicles in use, customers will be in the concession area, because a full electric vehicle charge may take 30 minutes or so. The customer will in all likelihood now want to sit in a vehicle when it is 110 in Palm Springs, California, or −6 degrees on a cold night in the winter in Iceland. It is anticipated that these concession areas will be interactive, meaning the cashier may say: "EV charging at station 9 is full", so that the owner that plugged into station 9 can now leave the concession area and resume their journey.

On vehicles, the indicator can be at the fueling connector and/or on the instrument panel indicating a safe refueling state, and a problematic freezing of the nozzle to the vehicle. This is a known problem and documented in Toyota and Honda FCEV manuals. As specified in such manuals, if the nozzle becomes frozen to the vehicle, the driver must wait until it thaws, in order to remove the filling handle from the vehicle's nozzle. The time for thaw, can be ten or more minutes. During extraordinary or unplanned or unknown events, it may take far longer, because we simply do not have enough data of incidents as of October of 2022. Not addressed by such guidance is that the driver should be informed when the nozzle is no longer frozen to the vehicle. In certain of the disclosed embodiments, the driver can remain in the vehicle until the warning symbol/visual indicator and or sound component alerts the driver, they can exit the vehicle and remove the filling handle. With current fueling apparatus, it is not safe or practical for drivers to stand by a vehicle alone at night, nor not know if they can leave the station. Weather conditions like torrential rain or heavy snow, make standing by the vehicle, undesirable. With the disclosed embodiments, if the driver goes into the station's store area, they will be able to see by a light on the dispenser and or a light on the vehicle alerting them of the frozen situation, and when it is safe to remove the handle from the vehicle. This information may also be available to the attendant as a mirror image of information. This becomes very useful and practical if the vehicle operator's sightline to the pump's display is blocked, due to a larger SUV or truck in the way, or in a heavy rain or during a snowstorm.

In certain of the disclosed embodiments, the information can also be transmitted to other vehicles, with or without drivers. Autonomous vehicles may play a dominant role in the future, and the occupants must know where the accident is, and what is the safest way to exit to safety, to avoid a fire or hydrogen venting situation. The alert can take the form of an alert in the in-cabin screen and or an audible alert, using a recorded voice or any other type of warning. Vehicles will be connected via one or more communication methods including (V2V) Bluetooth, Wi-Fi, 5G, 6G, IoT, mapped roads, like GM's SuperCruise, etc. Certain of the disclosed embodiments permit the system to be accessed remotely by emergency responders, to guide the occupants. For an individual passenger, driver driven cars, the alert and guidance can appear on the IP (Instrument Panel), Navigation screen, passenger screen, center screen, screen or tablet located behind the driver's seat or in the headliner. Some 2023 vehicles, now have interactive displays where the traditional window switches were. The message or messages, or warnings can be displayed there too. Some models also have removable tablets, which the occupants can take with them. and also in the "Head's Up" display. The vehicle can also alert the occupants of a dangerous situation by performing unusual functions to get the occupant's attention. Meaning it can flash the interior lights, open the sunroof shade panels, heat the steering wheel, blast bursts of cold or hot air at passengers and sound a horn, or emit a tone from the sound system. The options are virtually unlimited, but the goal is for the vehicle to do everything it can to make a driver pay attention if they are in the middle of an important email chain and not paying attention to the surroundings. It will alert the driver as to how to exit the vehicle and the path to take, if it is safe to exit the vehicle. If it is not safe to exit the vehicle, the responders can communicate vocally, through an acoustical alert, or through any display system that they should remain in the vehicle, until rescued or it is safe to exit. The disclosed embodiments in this respect benefit passengers, the public and all first and secondary responders. The disclosed status indicators can be visual and/or acoustical, and sent by any known means, today or in the future, such as for example, the "Google Glass" product by Google or a similar type of "Head's Up" type message transmission into a normal looking pair of glasses. The display can be an image projected on to the ground, or to the fueling canopy, since many chargers and pumps have rain protecting canopies. The image can rapidly blink, swirl about, use lasers or any other visual means, utilizing LEDs, Bulbs, OLEDs or OLED painted surfaces that illuminate. The goal is to create a visual display or audible alert that is out of the ordinary and gets the attention of anyone in the area, or about to enter the area.

In accordance with certain of the disclosed embodiments, an emergency team can send received information regarding an emergency fueling situation directly to those who need guidance, warnings, or directions like a vehicle's navigation system. The path to safety can also be directly sent to the vehicle, in a navigation style message, or to the user's smartphone. In certain embodiments, the received alert information can cause activation of a mapping and/or guidance application (such as Google Maps) to provide the driver and/or occupants, with clear directions, seamlessly as they leave the vehicle. The information sent to the user's smartphone can be used to provide information to the user via the vehicle audiovisual systems, such as via Apple CarPlay or Android Auto. This information, while practical, is imperative in hydrogen station malfunctions. Those in the area could walk directly into the flame, and not know it. It is virtually invisible, produces no heat or smell. The individual walking into or through the flame can be set on fire, and if smoking can set off a dangerous plume of fire. The vehicle occupants may also be provided with a portable, lighted path (by way of activating the flashlight of the phone(s) of one or more of the vehicle occupants) to safety. The emergency guidance can be programmed to turn the flashlight feature of the phone on, lighting the path below, while having the path on the screen of the phone. The phone for example can blink a red and white light from the flash part on the back of the phone to let the first responders they have gotten the alert and are moving toward safety. The same message can be sent to the user's smartphone, which can brighten and darken the screen in rapid sequences while viewing the map. If the first responders go directly to the attendant's booth, they may have video of all individuals in the area and will know what pumps were in use at the time of the incident. This information can tell first responders of how many civilians that they must find or rescue. This can be done automatically, since during emergencies it may not be easy for those seeking safety to spend time opening the alert and turning on the flashlight feature. The goal is to clear the area as soon as possible, in the clearest and easiest way possible, especially at night, or during a smoke-filled fire incident. In another embodiment, the main screen of a mobile device may be lit up, such as turned bright white, to operate as a low lumen flashlight, in addition to or in lieu of using the flash on the mobile device. Controlling the mobile device to operate as a low lumen flashlight permits the mobile device to be operated as a rescue beacon. The lighting of the screen(s) and/or flash(es) of the mobile device may be performed in a number of manners including at various illuminations and/or flashing.

A lack of understanding about hydrogen as a fuel source also exists in the railway, truck and maritime uses of hydrogen. For example, if large ships are powered by hydrogen, fueling boats will dock alongside them and fill them. Safety issues arising from such fueling scenarios not been addressed, because they are not scaled up. Certain of the disclosed embodiments pertain to hydrogen filling stations, and all machinery that uses the hydrogen from the station to ultimately power a machine. A machine in such a context is defined as a car, truck, ship, drone, bus, dump truck, railroad car, autonomous vehicle, submarine (not submerged for a fill) boat, moving crane, subway car, etc. The disclosed embodiments also pertain to other equipment such as portable hydrogen generators, lawn mower equipment, golf carts, motorcycles, and any movable machinery that a user, must fill with hydrogen. Even if the hydrogen is filled robotically or from the top, like at some bus depots, there are still individuals in the area. Hydrogen is not just a danger at the handle, it is a danger in the surrounding areas. If the bus is being filled from the top, and a hose ruptures, the hydrogen can drop down and land on the bus driver who may have exited the bus for fresh air or a stretch. If the robotic fill at the side of the vehicle is taking place, the driver, may exit the vehicle and go to the trunk to get the groceries that were just purchased. The driver may be in harm's way during a leak or malfunction or may be smoking and further enhance the event.

Fuel cell-based water ferries are being planned to be in operation by 2023 or so. The hydrogen fueling of the ferry may be performed at a dock, where the boat is, or remotely by a filling ship that pulls alongside the vehicle. This involves fueling operations in the presence of potentially hundreds of unprotected passengers aboard, and outside on deck, which may be made of wood or any other burnable or meltable materials. Typically, ropes are used to tie ferries or boats to docks. These ropes easily burn if ignited. Ferry operators are familiar with diesel or gas fueling, but not hydrogen fueling. In the context of this disclosure, the entire filling ship is treated like a dispenser. It is a unit that dispenses hydrogen using a hose and connector. The "dispenser" does not have to take the traditional form as a typical gas station. Additionally, fueling handles, connectors, hoses, couplings, etc. are sensitive to corrosion, from sea water. Also susceptible are fueling stations in coastal areas where there may be an increased saline presence due to the crashing sea's spray. Also, there have been developed systems that provide the ability to make on demand hydrogen. It is not scaled up to be widely used yet, but its benefits are known. You can place a self-generating system anywhere. That is advantageous in the desert, for a military operation or after a hurricane, like the one in Florida in 2022. Not only was the power knocked out of a barrier island, the only means to land was washed away. The definition of "hydrogen dispenser" related to this disclosure is the self-generating equipment treated as a dispenser, since it will function as such.

The disclosed status indicators can be visual and/or acoustical and sent by one of a variety of techniques, such as for example, "Google Glass" or a similar "Head's Up" type message transmission into a normal looking pair of glasses. An emergency team employing such an embodiment can send the information directly to those who need guidance, warnings, or directions like a vehicle's navigation system. The path to safety can also be directly sent to the vehicle, in a navigation style messages or simple clear large arrows that indicate a walking path, or to the user's smartphone, which can open up an application, such as Google Maps, and give the occupants, clear directions, seamlessly as they leave the vehicle, and have a portable, lighted path to safety. Augmented reality and destination photo display may also be employed to permit the user to see the photo of the same area they are being directed to. Seeing a photo of the large red building may be easier than tracking a map to get to it, when the user doesn't know what it looks like. The emergency guidance can be programmed to turn the flashlight feature of the phone on, lighting the path below, while having the path on the screen of the phone. This can be done automatically, since during emergencies it may not be easy for those seeking safety to spend time opening the alert and turning on the flashlight feature. The goal is to clear the area as soon as possible, in the clearest and easiest way possible, especially at night, or during a smoke-filled fire incident.

Disclosed herein are devices, systems, methods, and products that address many of the challenges posed by hydrogen fueling dispenser and vehicle indicators, to inform of status, safety and malfunctioning states. The indicators can be visual and/or acoustical, and may be sent to user's mobile phones, personal electronic devices (which include smart watches, ear buds, headphones, etc.) and station operators. The status alerts can also be sent wired or wirelessly to remote locations, like the fire department or other emergency services and vehicle remote call centers like GM's OnStar. If there is a malfunction that can affect the entire station, putting others in harm's way. The indicators can be visible and, and or acoustical, and used to "cordon off an area" or alert vehicles wishing to enter the station or surrounding area to not enter. The "cordoning off" can be but is not limited to a spinning red and white visual alert, a projected image on to the ground or canopy above the dispenser, and image projected on to a nearby wall, or other vehicles at the station. The vehicle or vehicles in distress may flash their lights and sound their horns, and if connected to each other (V2V) may initiate this response to vehicles in the vicinity even if they are not in danger. They help warn others not to enter or to be alert that there is a situation at hand.

Additionally, disclosed herein is a status indicator on the handle of the hydrogen dispenser. When hydrogen is flowing into the vehicle, the handle will illuminate to tell the user the hydrogen is filling the vehicle, and when the fill has been completed. It will also alert the user if there is a freezing situation, by means of a visual or audible indicator. The hose, or part of the hose may also illuminate. Having the hose, or any portion of it illuminate makes the warning visible in novel ways. Since the fueling hose often comes from a height above the user's head, a portion of the hose will always be in a direct sightline of the user and those in the vicinity. If the user is filling the hydrogen vehicle, and attention is not required for the three-to-seven-minute fill, the user may be busy texting and not looking at the handle or the dispenser. The hose then becomes a light column or light rope. The hose is not a fixed object like a dispenser or a vehicle. It has motion, is flexible and very visible if illuminated. The other advantage of the hose or any part of it being illuminated is that the hydrogen passing through it is very cold and can stiffen the hose. This stiff hose makes it more difficult to use, both in the taking it out of the dispenser and returning it to it. And, if previous customers have torqued it, it puts further stress on the hose, which could cause a tear or micro-tear. It is well known to those in the industry, the hoses are one of the weakest and most likely to fail components. The majority of hydrogen events do not involve the cylinders, it is the ancillary components that tend to be an issue, based on durability or human faults, like not tightening fittings properly, which happened in Norway and produced a three million dollar fine for the company that installed the dispenser. Both the vehicle and hydrogen dispenser may have temperature sensors to facilitate the indicators. The freezing alert will also warn individuals in the area, not to touch the nozzle, hose or vehicle connector due to the extreme temperature, which could cause severe thermal injuries to individuals. The "illuminated" area on the handle, and or hose will also inform users that the cold hydrogen is flowing into the vehicle's tank. The illuminated area can have color coding, meaning, for example, Green=Ready, Blue flashing=Filling, Blue solid=Fill is complete, Red=malfunction. The same colors and or illuminated symbols can be located in the area of the vehicle's connection device, or on or near the fueling door, the hose that receives the hydrogen from the handle. Currently that area is covered by a fueling door, but future vehicles are not bound to any specific placement on a vehicle. Meaning, the fill point (receptacle) may be on the side, front, back or underneath the vehicle, or even on the top of a bus, tractor, truck, drone, ship, airplane. If the fill is from underneath the vehicle, the vehicle alert system can be positioned above the driver's door handle, or on the instrument panel, navigation screen, user's smartphone, etc. The alert can also be sent to the station's office, or to a remote location. An example would be a fire department, police department, or other first responders. An alert of a sudden stop of a fill, a leak determined by the sensors, over pressure, under pressure may also be provided.

The illuminated area can also, additionally, or in lieu of the handle, be located around, adjacent, on the fill door, or anywhere on the vehicle itself, including the roof, sides, grille, bumper, GPS antenna, taillight or any surface that is a light conducting, or can produce a lighted area or areas. The illuminated area can also be illuminated by a projector type lens. The illuminated area can be one specific area or multiple areas, which can cover a 360-degree viewing area if one were to walk around the vehicle. The same illuminated area on the dispenser housing or any surface of it, that is a light conducting, or can produce a lighted area or areas, or have an illuminated area, symbol, line, flashing LEDs, or the light can simply be projected on to it. The illuminated area can be one specific area or multiple areas, which could cover a 360-degree viewing area if you were to walk around the vehicle.

The information can also be transmitted to other vehicles, with or without drivers. Autonomous vehicles may play a dominant role in the future, and at times the vehicle may be filled with occupants on board. A passenger in such a vehicle may need to wait for up to ten minutes for the vehicle to fill up. Passengers must be alerted to malfunctioning states of a vehicle, especially one that could cause a ten-minute delay, rendering the vehicle immobile. The status or malfunction situation can take the form of an alert in the in-cabin screen and or an audible alert, using a recorded voice or any other type of warning. The alert and accompanying instructions and other information can also be displayed on the rear-view mirror which is easy to see from the center rear seat, or even a display on the back of a headrest for rear passengers. The occupants must know where the accident is, and what is the safest way exit to safety, to avoid a fire or hydrogen venting situation. The indicator can take the form of an alert in the in-cabin screen and or an audible alert, using a recorded voice or any other type of warning. Vehicles will be connected via Bluetooth, Wi-Fi, 5G, 6G or IoT (The Internet of Things) or any other future communication methods. This system can be accessed remotely by emergency responders, to guide the occupants. For individual passengers, driver driven cars, the alert and guidance can appear on the IP (Instrument Panel), which is seeing a trend of being the entire width of the vehicle, sometimes divided into three separate screens under a long piece of glass, or separate screens for the driver and passenger. The new Ferrari SUV has a dedicated passenger screen, so this feature will become more widespread. Navigation screen or in the "Head's Up" display. It will alert the driver as to how to exit the vehicle and the path to take, if it is safe to exit the vehicle. If it is not safe to exit the vehicle, the responders can communicate vocally, through an acoustical alert, or through any display system that they should remain in the vehicle, until rescued or it is safe to exit. Passengers in autonomous or regular driver operated vehicles, also may have varying abilities, meaning a passenger may have visual or acoustical impairments that would not get a visual or acoustical warning. As a redundancy of warnings, the seat can vibrate, the armrests can vibrate, the seats could cycle from hot to normal or if the person using an autonomous vehicle has a profile, like the one on UBER or Lyft, they could have in their profile that they have specific impairments, and the redundant warnings can be activated for their trip only. This gives an incredible amount of flexibility for the autonomous vehicle owner and user. Additionally, the passenger can have on his or her profile, that English is not their native language and the instructions heard in the cabin are in their preferred language. Google can translate any statements to any language, and at no cost. This can be implemented for on the fly in cabin translations. If it is a ride share, the profiles would be noted as occupying the same vehicle, and the instructions can be heard in their native language. Currently there are more than 7,100 spoken in the world today, so the confusion is obvious. It will also be helpful for travelers from other countries. So, an UBER user from Bahrain would be recognized as holding an account from that country, so the instructions would be Bahrain's official language which is Arabic. Users of ride share, or autonomous services can opt in or out of any service offered now or in the future.

Vehicles may be connected via one or more of a variety of communication protocols including Bluetooth, 5G, 6G, Wi-Fi, and/or other communication protocols. This system can be accessed remotely by emergency responders, to guide the occupants. For individual passenger, driver driven cars, the alert and guidance can appear on the IP (Instrument Panel), Navigation screen or in the "Head's Up" display. It will alert the driver, and passengers, if they have screens in front of them, on the dash or in the second or third row of large SUVs, as to how to exit the vehicle and the path to take, if it is safe to exit the vehicle. If it is not safe to exit the vehicle, the responders can communicate vocally, through an acoustical alert, or through any display system, speakers, the vehicle's horn, including the occupant's mobile phones and PDAs, and smart watches, that they should remain in the vehicle, until rescued or it is safe to exit. It can be an added feature, overlaying the current vehicle to remote center's parameters. It is new, useful and benefits passengers, the public and all first and secondary responders. The system can also alert drivers, passengers, first responders, etc., on their smartphones, or send out a tone like the known "Amber Alerts" or Emergency Notification built into smartphones today. Additionally, the status indicators can be visual and/or acoustical, and sent by any known means, today or in the future, such as for example, "Google Glass" or a similar "Head's Up" type message transmission into a normal looking pair of glasses. Head's Up can also include the entire interior interactive surface of the windshield for not only the driver but for all occupants. The emergency team can send the information directly to those who need guidance, warnings, or directions like a vehicle's navigation system. The path to safety can also be directly sent to the vehicle, in a navigation style message, or to the user's smartphone. It can open up Google Maps, and give the occupants, clear directions, seamlessly as they leave the vehicle, and have a portable, lighted path to safety. The emergency guidance can be programmed to turn the flashlight feature of the phone on, lighting the path below, while having the path on the screen of the phone. This can be done automatically, since during emergencies it may not be easy for those seeking safety to spend time opening the alert and turning on the flashlight feature. The goal is to clear the area as soon as possible, in the clearest and easiest way possible. The emergency team can send the information directly to those who need guidance, warnings, or directions like a vehicle's navigation system. The path to safety can also be directly sent to the vehicle, in a navigation style message, or to the user's smartphone. The emergency guidance can be programmed to turn the flashlight feature of the phone on, lighting the path below, and by doing that will make themselves visible to anyone in the surrounding area. They turn into a trackable person who may need assistance. This can be done automatically, since during emergencies it may not be easy for those seeking safety to spend time opening the alert and turning on the flashlight feature. The goal is to clear the area as soon as possible, in the clearest and easiest way possible. The visual and or acoustical status indicators can alert of a breakaway situation. If the hose becomes separated from the filling handle, a whipping effect can occur, leaking the pre-cooled −40 to −50 C hydrogen, which can create multiple thermal injuries to drivers and all individuals in the vicinity. If there is a breakaway or freezing of the hose, fissure, crack, pin hole, leak, separation at the dispenser or handle end, the hose can illuminate and or flash in any pattern, using any colors or user set parameters. The hose can have a light guide (a flexible plastic rope that carries light, with the LED and electronics safely in the dispenser or handle) the hose can also fully illuminate if coated with a material that can be activated, or one that is painted on, like an OLED paint.

Another alternative is to have the visual indicator on the roof, for example by the GPS antenna or area on the rear portion or front portion of the roof. In some vehicles, like the GMC Yukon, the GPS antenna is on the roof of the vehicle just above the windshield. The GPS antenna, which in BMWs for example looks like a shark's fin, at the rear of the top of the roof, located near the rear window. The "shark's fin" is raised, visible, and it has wires going from the car's electronics going to it. Adding a light is simple, it simply requires running an additional wire to the exterior "Shark's fin" and having a visible opening with an LED or bulb that is powered and visible. In pickup trucks, like the RAM 2500 a popular option is the clearance lamps. They are a series of small yellow illuminated areas above the windshield. These clearance lamps can serve the dual function as described to present visual indicators. Rarely are roofs destroyed in common car crashes since rollovers account for roughly 3% of all accidents. The back, front and sides are the most common areas of impact. The roof is only affected in a roll over situation or where a car would underride a truck's rear trailer. Those incidents are a miniscule fraction of all vehicular accidents. Trucks or truck trailer lights are positioned at the top of the cab and the trailer. The visual indicator in this position has the clear advantage of being seen from any vantage point. It offers 360% coverage. A retrofitted system can easily be achieved with vehicles that already have the illuminated clearance lights. In one embodiment, the amber light can be reprogrammed to add a flashing mode, to indicate a malfunction or dangerous situation. The amber light can be reprogrammed to add a flashing mode, to indicate a malfunction or dangerous situation, or replaced to enhance visibility and add different colors to make the status of the vehicle better understood. Meaning during the day, these clearance lights are usually not on and are turned on at nighttime. In the disclosed embodiment, the clearance lights can be turned on, even during the day, to transmit status. The result is taking a pre-wired, illuminated area that is not in use, during the day, and making it useful for an added purpose.

If FCEVs and non-traditional gasoline powered vehicles can prove their safety, the whole non-traditional gasoline powered vehicles segment can grow. Autonomous vehicles may become a significant portion of the segment and they may be powered by hydrogen or non-traditional gasoline powered vehicles. The same safety measures must be enacted, even if there is not a traditional driver. That is irrelevant for many safety situations, meaning the autonomous vehicle is designed to carry passengers.

During hydrogen fueling, if the nozzle becomes frozen to the vehicle during a fill, the driver needs to know when it is thawed. The driver can then remain in the vehicle until the warning symbol/visual indicator and or sound component alerts the driver, they can exit the vehicle and remove the filling handle. Or if the driver goes into the station's store area, they will be able to see by a light on the dispenser and or a light on the vehicle alerting them of the frozen situation, and when it is safe to remove the handle from the vehicle. The frozen/thawed warning may also include additional warnings such as "HF Detected, Battery malfunction issue. Do not return to vehicle, call 911" The same sensors can be employed to detect battery off gassing from batteries used in a hydrogen powered vehicle. The customer may be able to remove an object from the dispenser, which will alert the customer when the vehicle is "thawed" meaning it is safe to return to the vehicle, to disconnect the handle from the vehicle. These vibrating devices look like hockey pucks and are routinely used in restaurants to notify the patron, their food is ready, or their table is ready. They are common and called "restaurant pagers" They vibrate/light up, or buzz. These devices are inexpensive, durable and are routinely sold to food establishments. Common suppliers are Vevor, and Daytech. They are arranged in a tray, like a dish rock, and the customer is given a pager with a number on it. The driver/customers have the opportunity to remain safely in the vehicle, or exit the vehicle to use the facilities, get coffee or stay inside by the attendant's area, in a store or service area. This also is an advantage when a user's mobile phone is not fully charged, or the smart watch lacks power and will not function. The customer (s) may also go anywhere in the vicinity of the station since the thaw could take up to ten minutes. The removable device allows them to be notified, that it is safe to return to the vehicle and exit the station. This device also can alert the customers of any other danger in the station, such as a fire, and alert them minutes or hours later it is safe to return. This type of display screen may be part of the dispenser, and available to remove and replace if the customer does not have a cell phone. This system is in place in restaurants where a device is given to a customer, and the device lights up and vibrates indicating that the customer's order or table is ready. Some fueling station customers or commercial fueling operators, may have a fully charged phone, or phones (many attorneys have a personal and a work phone) and a smart watch, and wear "Google Glasses" or the like. They may choose not to use their own device if they have cumbersome gloves or mittens on in the winter, or not wish to get their phone or watch wet if it is snowing or raining. Or, they may simply not desire to touch their personal electronics after touching a dispenser handle that is dirty or wet. Commercial fillers may leave all of their personal electronics in their locker and only use the equipment provided to them on the job.

While hydrogen as a fuel source has several advantages and is being implemented in consumer and commercial settings it poses a number of challenges. Being highly explosive, characterized by leakage issues, and requiring storage at extremely cold temperatures and/or high storage pressure however poses several dangers to vehicle users, first responders and the public in general. Gasoline has a distinct smell that anyone can detect, and be alerted of a leak, and potential fire or explosion. Hydrogen is odorless and colorless. Currently, odorants are not used with hydrogen because there are no known odorants light enough to "travel with" hydrogen at the same dispersion rate. Current odorants also can contaminate the HFC, leaving no way to "mark" hydrogen for identification due to a unique or known warning smell. So, if a tank which is designed to vent its hydrogen contents, does so in an enclosed area, there is no way to detect its presence. Hydrogen is a very small molecule with low viscosity; as a result, it is prone to leakage. Additionally, hydrogen gas is highly flammable and will burn in air at a very wide range of concentrations between 4% and 75% by volume. The mixture may be ignited by spark or heat, or static, and even an open electrical socket or light fixture in the ceiling, where the hydrogen may vent to, since it rises rapidly. Pure hydrogen-oxygen flames emit ultraviolet light and are invisible to the naked eye. As such, the detection of burning hydrogen requires a flame detector, or combustible object put in the path of the suspected flame. First responders, commonly use a corn husk broom. Hydrogen is also colorless, odorless, and tasteless, which further makes detection of a leak impossible to detect, and upon ignition, the flames will be invisible, unless they mix with a contaminant such as burning plastic, rubber, debris etc. Liquid and gaseous hydrogen also tends to cause cracking (by causing embrittlement) in certain enclosures (such as tanks and hoses and fittings), particularly those made of metal. For hydrogen as a fuel source, many of the facts are from Sweden, because the USA has very few hydrogen vehicles and stations. The U.S. data is virtually non-existent concerning these described incidents in enclosed spaces, garages, and tunnels. The foregoing characteristics can present a grave danger to the public, responders, and to property. Professional first responders, and amateur good Samaritans who know nothing about vehicles but see an injured person or persons in a vehicle, will tend to run to the vehicle, and try to comfort, remove or assist. While admirable, these good Samaritans will tend to assume the vehicle is petroleum powered or will not think of the power source given the historic homogeneity of power sources and will therefore not appreciate the dangers of a non-gasoline vehicle.

As documented in Hydrogen Fuel Cell Engines and Related Technologies: Rev 0, Module 6, Fuel Cell Engine Safety, December 2001 (pp. 6-7) a radius of 1500 feet is suggested as the evacuation distance for an uncontrolled fuel cell vehicle fire. And some guidelines say to let a fire burn out concerning fuel cell vehicles, so the goal is controlled burn out, but that is not always possible. HFC vehicles are not placed in perfect controlled venting situations during fires. So, in essence they are all by nature uncontrolled fires. Additionally, fuel tanks for gasoline vehicles were traditionally made from metal, with great heat resistant qualities. Now, 98% of all European gasoline tanks are plastic. In the USA the figure is 75%. This contributes to all fire incidents, due to the low melting point of the plastic tank, which can contribute to the fire and or ignite vehicles in the vicinity as the fuel leaks out and burns.

If hydrogen vehicles are parked next to each other and battery vehicles during a fire, one can vent, which can cause the next vehicle to catch fire and vent. This can result in a never-ending chain of ignition. Additionally, a battery vehicle could spontaneously re-ignite and cause a nearby hydrogen vehicle to vent, adding new fires, which will spread to other flammable areas. It can be a "snowball down a hill effect, constantly growing as it moves." The battery of the hydrogen vehicle may fault, overheat, catch fire and that may cause the TPRD to fully empty the hydrogen stored in the vehicle. The battery can cause the hydrogen vehicle to vent all of the hydrogen in the tanks.

In the future, the needs will increasingly likely contradict the prescribed methods of rescue. If there is a possibility of a hydrogen tank explosion, who do we minimize loss of life of? Do we evacuate up to 1500 feet from the potential explosion, leaving those trapped in a vehicle to perish, or do we send multiple first responders into the potential explosion, which could result in multiple fatalities which would be in addition to the trapped occupants. As discussed above, if we know a TPRD (Thermal Pressure Relief Device) is going to vent all the contents of a vehicle's tank, then we clearly have to eliminate any flammable materials from behind, above and to the side of the vehicle, so it can vent and potentially burn, shooting a jet stream of flames out and in an upward direction. Garages both underground, above ground, and mixed coverings were never designed for such events, flames or heat. All of these structures were built with gasoline and diesel event parameters. Since 2012 when the first widely adopted Tesla Model S was released for sale architects and builders may have thought about designing these structures differently, but few have been built to handle battery or hydrogen events. Retrofitting an underground garage may be impossible. How do you fireproof and have sufficient venting installed, especially in an older building. Additionally, many battery vehicles have individual cells, some with 7000. One popular vehicle maker actually has a number of vehicles on the road, that have been designed to drop their cells and modules in a fire to assist first responders. Typical garages have a spiral design, so you can go up to the next level, or down to exit. If a battery vehicle that has a battery that drops down, to assist the first responders, the individual cells, can roll down the parking structure setting off multiple vehicle fires. These individual cells can also behave like fully lit bottle rockets, shooting out in all directions from the vehicle. Some documented events have seen battery components fly across a typical street, and directly on to an adjacent house of first responder's path.

The examples below are a fraction of the possible situations. Hydrogen use in railway, truck, aviation, both traditional and vertical, and that category will include personal air taxis, increased use of helicopters, drones, and the like, and maritime standards are also lacking, and these are emerging applications without safety protocols, due to their nascent standing. This means that if large ships are powered by hydrogen, fueling boats will dock alongside of them and fill them. These issues have not been addressed, because they are not scaled up. The embodiments disclosed here pertain to a variety of hydrogen filling stations, and the vehicles that use. Additionally, if a hydrogen powered air born device fails in the air, the crash to earth can be devastating.

When you fill a HFC vehicle, you have to remove a small plastic cap, and after the fill you have to do the same. At night you may not be able to see it perfectly due to shadows. That nozzle can become so cold it could cause a thermal injury in seconds or skin could become frozen to it. Additionally, men with very large hands, or women with long fingernails may have issues taking off the nozzle and putting it back on. Vehicles and the refueling apparatus are typically designed with the average person in mind. Often, off-the shelf components are used instead of specially designed components which can render the usability less than optimal across a range of users. An HFC vehicle, as with any other non-petroleum powered vehicle employs what is to most people, a novel way to fill a vehicle. Moreover, even if a dealer explains to a new owner the details of refueling the vehicle, one of the owner's children or friends may borrow the vehicle. Also, if HFC vehicles are used as rental cars, that increases the chances of use by a person unfamiliar with the fueling practices and the possible dangers. Taken as a whole, HFC vehicles and all hydrogen powered equipment present an unknown quantity of differences and dangers which must be, and are not currently, properly addressed.

First responders face serious risks to their safety as they provide life-saving services. Each year, there are an estimated 46,000 crashes; 17,000 estimated people injured; and nearly 150 fatalities involving emergency response vehicles (ERVs), which include law enforcement, fire, and emergency medical services vehicles. The above data is historical and based on gasoline vehicles, not on the introduction of HFC vehicles and other alternative fueled vehicles.

Currently manufacturers have emergency response guides, which only point to small commonly known vehicle name plates, which are small, and identical to similarly named cars. These name plates typically appear on the rear of the vehicle above the bumper. For currently available vehicles the name plate may indicate the vehicle model as "Clarity" or "Nexo". Such name plates may not be visible if there is no light, if the vehicle was hit from behind, or if another vehicle is parked directly behind it. Currently about 256 car names are used today. These names are constantly changing as names are added, and names are dropped. For example, in 2019 Hyundai introduced models named Palisade, Venue, Ioniq, in the USA. However, if you count a model like the Hyundai Tucson as a continuous model by name, that is true, however for 2020 the car looks completely different, yet retains the same name. That exacerbates the confusion for the quick identification of a vehicle. Concerning the 2020 Ioniq line, the same vehicle comes in three different variations. You can only tell the difference by the small name plate. The versions are: Ioniq Hybrid, Ioniq Electric, Ioniq plug in hybrid.

In certain embodiments, a display screen may be attached to the dispenser in a manner that it or another piece with wireless capability is removable by the customer who can then carry it while the vehicle is being refueled. The customer may then be alerted wirelessly of completion of refueling, or of an emergency situation.

In the disclosed embodiments, information may be transmitted wired or wirelessly (Bluetooth, Wi-Fi or IoT, 5G, 6G etc.). The power source and "brain" then send out the acoustical and or visual alert to the sound producing component and the visual alert medium (laser, fiber optic line, LED, bulb, light guide, etc.). In certain embodiments, the visual alert medium may take the form of electroluminescent type paint, such as LumiLor® available from Darkside Scientific, Inc. In such embodiments, a paint type substance is applied to a surface and connected to a source of electrical energy which causes the surface to emit light when energized by electrical current.

It is vital that the public and responders evacuate an area if a venting of the tank will occur. This includes off gassing from a hydrogen vehicle powertrain including venting of the tank, leaks or potential fire hazard, cell propagation, or thermal runaway. The colors and sounds in the disclosed embodiments can be any hue, intensity, area covered or pitch (constant sound, beeping, intermittent, siren like, etc.). The system can also alert drivers, passengers, first responders, the public, etc. on their smartphones, or send out a tone like the known "Amber Alerts" or Emergency Notification built into smartphones today. The alerts may also be provided programmatically to navigation applications or other applications (such as Waze, Apple maps, Google Traffic) to provide real time information, by way of text, icons, or other graphical or visual indicators that are automatically loaded onto, for example, a viewer's map.

The sound components of the system can be vital for those with visual impairments, or if a vehicle is in a danger mode, but visually blocked by another vehicle or obstacle. For example: a Toyota Murai FCEV type vehicle may be venting or off gassing and about to cause a disastrous fire, but the warning light may not be visible if a large sport utility vehicle, is parked in front of it or to the side of it. This situation can also occur if the vehicle in question is parked on the side of a building or parked on a street when a delivery truck could block the ability to see the vehicle and its light.

Current Thermal Pressure Relief Devices (TPRDs) vent from the rear, trucks and buses from the top, so if a bus or truck is in a tunnel and the venting hydrogen goes upward, it could create a fireball that travels on the ceiling. Vehicle to Vehicle (V2V) communication, can be employed to send a wireless signal from one vehicle to another, alerting of the danger. This technique makes the cars interact with each other, and provide additional safety warnings in a timely manner, potentially reducing loss of life, injury, and destruction of property. A user, bystander or first responder does not have to witness the event, the car can broadcast the event and the status to other cars in the vicinity, which can set off a series of warnings. As cars become more connected, one car in the middle of a tunnel can send the signal to all of the cars in the tunnel and surrounding areas. This can greatly aid in determining the nature of the event(s). In certain embodiments, the light pattern and sound signature of the warnings can be transmitted to all vehicles, buildings, first responders in a predetermined radius.

In the following description, any indicator that requires power should be coupled to power in a manner to cause power to be supplied to the indicator even when power from the vehicle is off. This can be accomplished by way of connection to one or more power sources, including a local battery, to enable power to the indicator in the event that one or more power sources of the vehicle are inoperative. The disclosed embodiments may be realized by modifying a conventional hydrogen fueling station such as described in the following specification by the International Standard Organization, ISO/DIS 19880-2(en), Gaseous hydrogen—

Fueling stations—Part 2: Dispensers (available at: https://www.iso.org/obp/ui/#iso:std:iso:19880:-2:dis:ed-1:v1:en). The terminology employed in the foregoing ISO standard is reproduced in Exhibit A, which is hereby incorporated by reference.

The disclosed embodiments may be better understood by way of the accompanying figures which are described below with reference to the designated alphabetical references in the figures.

The visual indications in the drawings represent both the freeze and thaw situations, as well as a "safe" alert or a "danger" alert. They also represent updated instructions in real time. They are not static, and do not represent finite displays. They are just for example and can display other images, words and combinations thereof.

FIG. 1 is a view of a first embodiment of a hydrogen fueling assembly 100 and receptacle 102 that operates to provide information regarding fueling status. The fueling dispenser assembly 100 in one embodiment illuminates green for a thaw or safe situation and red for a freeze situation. In other embodiments, any desired letters, symbols or lights may be used, or in any combination to provide information regarding fueling status. The receptacle 102 includes one or more visual indicators 104 located around the filling area or connection area on the vehicle. Other visual indicators 105, 106, 107 may be positioned near the area of contact to the receptacle 102 by the assembly 100. Moving to the assembly 100, a visual indicator 108 may be positioned at the top portion of the assembly 100 and the indicator 108 may take the form of a screen that provides a visual indication by way of words or characters. Another, or in lieu of, indicator 109 is positioned at the top portion of the assembly 100 closer to the user's hand. This may be a screen that indicates words or characters. A visual indicator 110 may be positioned at the bottom of the assembly 100 and/or 111 at the end of the assembly 100. A visual indicator 112 may be positioned at the end of the assembly 100 closest to the nozzle that contacts the receptacle 102. Moving to the other end of the assembly 100, a visual indicator 113 may be positioned on a hose 114 which provides hydrogen via the assembly 100 to the receptacle 102. The visual indicator 113 may take the form of a line or a series of dots or a skin that makes the whole hose 114 illuminate. One or more other indicators 115 may be similarly positioned on the hose 114 at various positions along the hose. The various visual indicators described above may be employed in different combinations in different embodiments. As noted above the indicators may be color coded to provide a visual indication of fueling status and/or may blink or flash to provide a visual indication of fueling status. Certain of the visual indicators may provide an image and/or text to provide a visual indication of fueling status.

FIG. 1 shows one example of a hydrogen fueling assembly 100. Other examples are shown in FIGS. 2-5. As can be seen, the various fueling assemblies shown can take a variety of forms. In general, they will supply hydrogen by way of a fueling hose, such as 114 that supplies hydrogen that is dispensed by way of a nozzle, shown generally at 120. The fueling assembly 100 includes a grip area shown generally at 122 that takes a form to enable the fueling assembly 100 to be grasped by a person's hand. The grip area is typically comprised of a type of plastic that provides some thermal protection. The assembly 100 also includes an area termed a "body" 124 herein which generally comprises various portions of the assembly other than the grip area 122. The body 124 includes an upper portion and side portions. As shown the assembly 100 includes an upper portion located at the top of the body 124 and side portions located at each side of the body 124.

Figure 2:
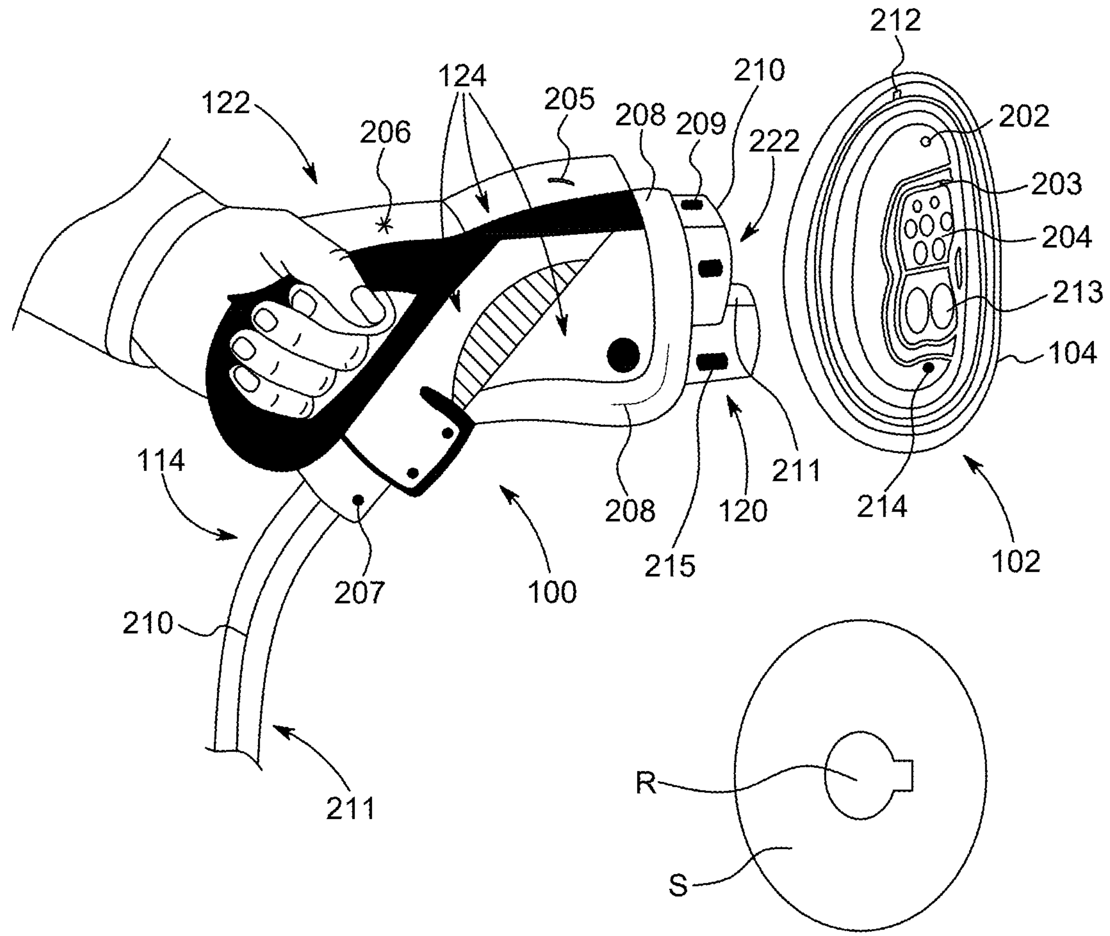
FIG. 2 is a view of an embodiment of a hydrogen fueling handle and receptacle showing positioning of sensor(s) on the fueling dispenser handle and fueling receptacle of FIG. 1.

FIG. 2 is a view of an embodiment of a hydrogen fueling handle and receptacle showing positioning of sensor(s) on the fueling dispenser's assembly 100 and fueling receptacle 102 on a vehicle. One or more sensors may be positioned in various combinations at the positions shown in FIG. 2 to sense temperature to provide the visual indicators in FIG. 1, and other indicators described herein with an indication of fueling status including conditions that may be harmful to the individual operating the assembly 100 and/or to others in the vicinity of the individual. Sensors may be positioned on the receptacle at various locations such as a sensor 202 around the filling area or connection area on the vehicle, one or more sensors 203, 204 positioned near the area of contact to the receptacle 102 by the assembly 100. The handle sensing an out of bounds situation can trigger the illumination of the hose, in full or in part. A sensor 213 may be positioned near the perimeter of the opening in the receptacle 102 into which hydrogen flows or 214 further from the perimeter. A sensor 212 may also be positioned near the perimeter of the receptacle 102. Turning to the assembly 100, a sensor 205 may be positioned at the top portion of the assembly 100, a sensor 206 may be positioned at the top portion of the handle closer to the user's hand, a sensor 207 may be positioned at the bottom of the handle, a sensor 208 may be positioned at the end of the handle closest to the nozzle that contacts the receptacle 102. A sensor 209 may be positioned at the end of the assembly 100 closest to the nozzle that contacts the receptacle 102, a sensor 210 may be positioned on the nozzle 120. A sensor 211 may be positioned on the data interface area 222. Moving to the other end of the assembly 100, a sensor 210 and another sensor 211 may be positioned on hose 114 which provides hydrogen via the assembly 100 to the receptacle 102.

The sensors described in FIG. 2 and in the other drawings and elsewhere in this specification may in some embodiments be connected directly to one or more of the visual indicators shown in FIG. 1 and elsewhere in this specification. In such embodiments the sensor provides an electrical signal that causes a connected indicator to provide a visual indication as a function of the received electrical signal. An electrical signal in one range (e.g., a particular voltage range and/or current range) will cause one indication, for example that the temperature of the fueling assembly is within a safe range. Similarly, an electrical signal in a second range will cause a second indication, for example that the temperature of the fueling assembly is within a dangerous range. In other embodiments, more than two indications, each associated with a range of the received electrical signal may be employed. In certain embodiments, certain sensor(s) may be connected to one or a first set of visual indicators while other sensor(s) are connected to another or a second set of visual indicators. In certain embodiments, one or more of the sensors provides a signal to a microprocessor that processes the received signal and in turn provides a signal to one or more indicators (visual, audible) to provide an indication of fueling status including a safe and dangerous condition. Examples of such embodiments are shown in FIGS. 14, 15A-C, 16A-C and 17.

Figure 3:
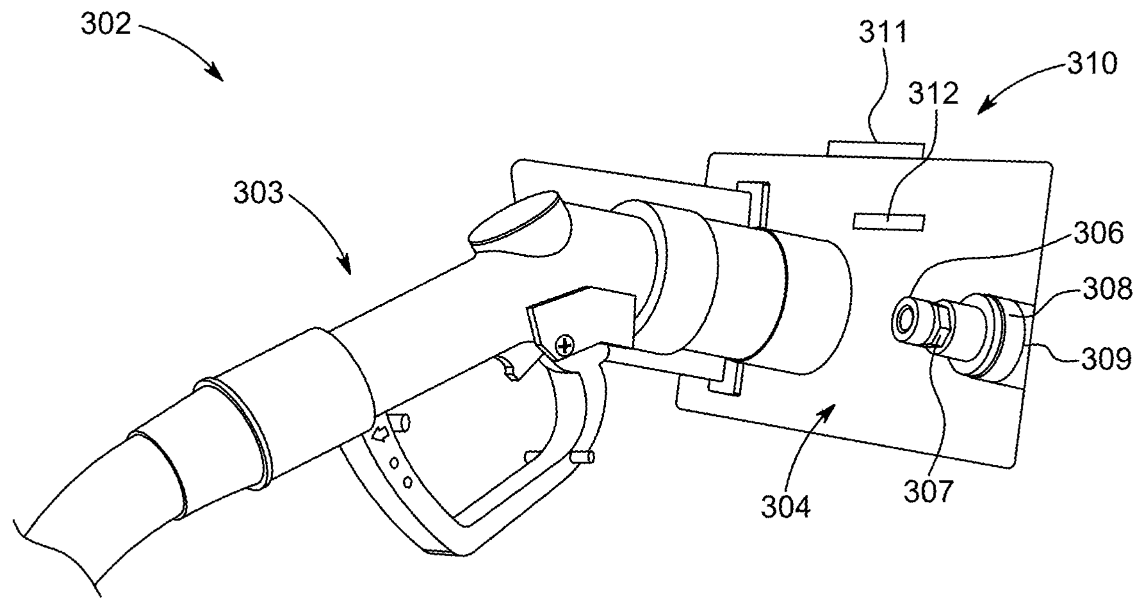
FIG. 3 is a view of an embodiment of a hydrogen fueling handle showing details of an embodiment of a vehicle with sensors and indicators.

FIG. 3 is a view of an embodiment of a hydrogen fueling handle showing details of an embodiment of a vehicle 302 with sensors and indicators with a fueling assembly 303 with recessed vehicle connector 304 and door (not shown). In the embodiment of FIG. 3, fueling receptacle 306 receives fuel from assembly 303. A sensor may be integrated into receptacle 306 or may be attached to receptacle 306. The assembly 303 securely attaches to the vehicle connector 304 by way of a clamp shown at 307. One or more sensors 308, 309 may be positioned at the base of receptacle 306. One or more sensors 310 may also be positioned elsewhere in the vehicle connector 304 and not on or integrated with the fueling receptacle 306. One or more visual displays 311 and 312 may be employed in the vehicle connector 304 to provide a visual indication of fueling status. In one embodiment the visual indication may be in red to indicate a dangerous situation, green color for normal filling, blue for a frozen state of the fuel through the assembly 303, and white when a frozen state ends to indicate to the user that the operator may safely detach the assembly 303 from the connector 304.

Figure 4:
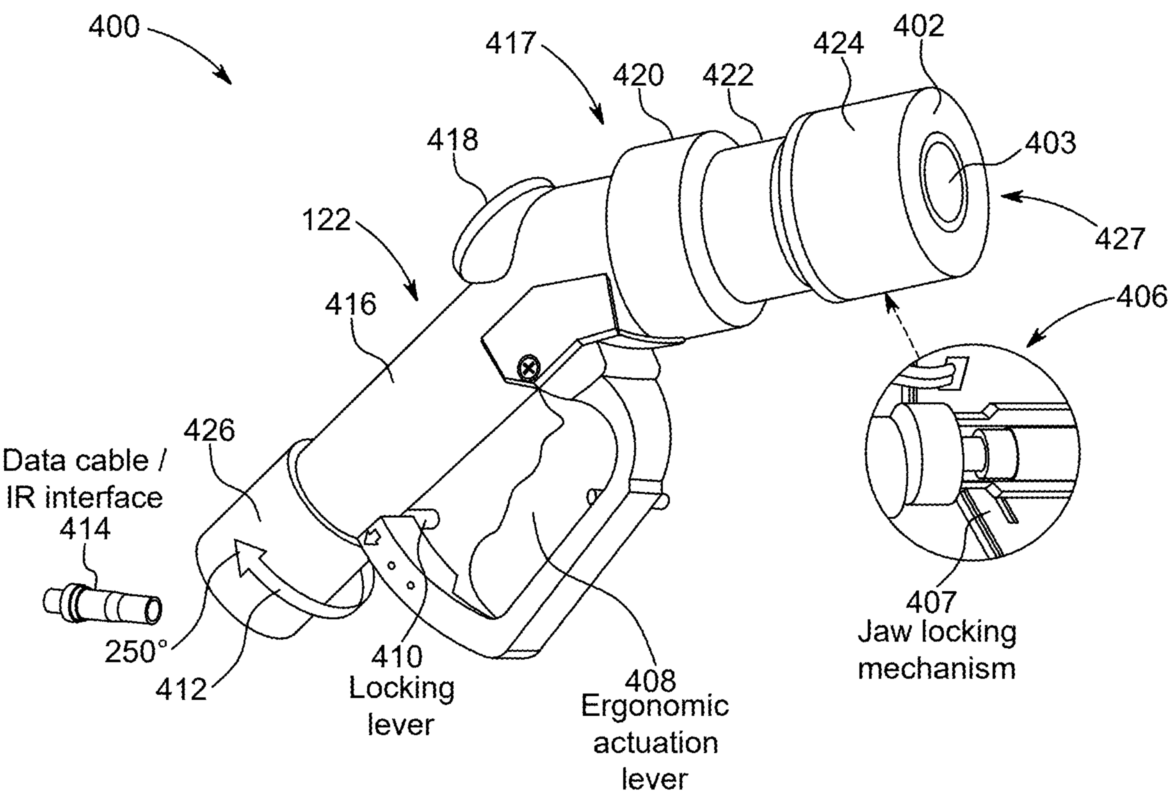
FIG. 4 is a view of an embodiment of a hydrogen fueling handle that operates to provide information regarding fueling status.

FIG. 4 is a side view of another embodiment of a hydrogen fueling assembly 400 that operates to provide information regarding fueling status. A sensor 402 may be positioned in the vicinity of the nozzle 427. In certain embodiments, this area may be used as an integrated interface for data transfer, according to SAE J2601. A sensor 403 may be positioned on the interior of the nozzle 427 through which fuel is transported. In certain embodiments, this area may be used for coding of pressure range and gas type. The assembly 400 employs a locking mechanism, seen in greater detail at 406 by which the assembly 400 securely attaches to a receptacle on a vehicle that is being fueled. In the embodiment shown, the locking mechanism takes the form of a jaw locking mechanism. The assembly 400 includes an actuation lever 408 to control the flow of fuel, a locking lever 410 to hold the lever 408 in an open position without pressure from the hand of an individual performing a fueling operation. In certain embodiments, the lever 408 may be equipped with one or more actuators to provide haptic feedback to a user as a warning. Also referred to sometimes as kinesthetic communication or 3D touch, haptics creates an experience of touch by applying forces, vibrations, or motions to the user. The assembly 400 may include an illuminated warning area 412 to provide a visual indication to a user of fueling status (normal, danger, etc.). The assembly 400 may also be equipped with a data cable or infrared (IR) interface by which information with a fueling station is exchanged. A grip area 416 may be equipped with a visual indicator to provide information on fueling status. In one embodiment, the visual indicator may take the form of integrated illumination which causes the grip area 416 to be illuminated in a manner to provide visual indication of fueling status. The grip area 416 is positioned at an obtuse angle relative to the body 417 and at a transition from the grip area 416 to the body 417 a visual indicator 418 may be positioned to provide an indication of fueling status. In other embodiments, other visual indications may be provided at other locations on the body 417 such as shown at 420, 422 and 424. One or more sensors may also be positioned at 426 on a rotatable cuff that permits rotation of the assembly 400 with respect to a hose (not shown) that connects the assembly 400 to a dispensing system. The sensor(s) may take the form of a temperature sensor with or without a humidity sensor, of varying forms including an IR sensor or sensors that map heat, or any type of thermal imaging or temperature imaging. A hose which connects the assembly 400 to a fueling station may be illuminated at portions to provide a visual indication of fueling status. The illumination may take the form of an illuminated spiral around the hose. Additionally, the hose may be wrapped in an illumination surface or jacket, or an electroluminescent paint as described elsewhere herein may be employed.

Figure 5:
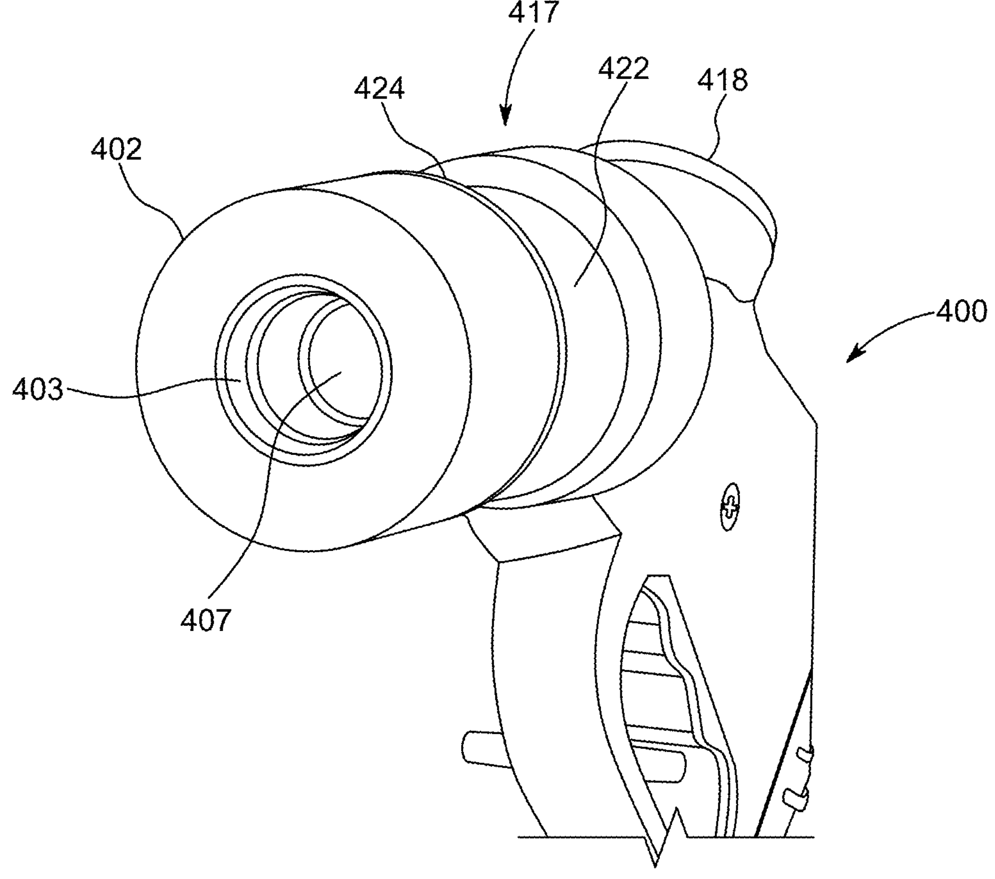
FIG. 5 is a view looking into the nozzle of the embodiment of the hydrogen fueling handle of FIG. 4.

FIG. 5 is a view looking into the nozzle of the embodiment of the hydrogen fueling handle of FIG. 4. The locking mechanism 407 in the interior of the fuel nozzle is shown as is the sensor 403 positioned within the fuel nozzle. The sensor 402 positioned on the end of the nozzle is shown along with the sensor 422 and 424 positioned on the body along with the visual indicator 418.

In certain of the foregoing embodiments, the nozzle area of the hose from the dispenser, clamps around a vehicle's fueling receptacle attachment area. The seal is secure, typically with metal-to-metal contact. Any metal can be measured for temperature, and a humidity sensor may be positioned in the area. That adds another layer of information for a configuration of a display of freezing, thawing and about to freeze situations. The information about a fueling event may be transmitted to the dispenser handle to alert the user. Meaning it may vibrate to alert of an undesired situation, or the alert may signal to terminate the fill, due to a potential freezing situation which could take up to ten minutes for a thaw, to safely disconnect the nozzle from the vehicle.

Figure 6:
FIG. 6 is a side view of a hydrogen fueling dispenser island that operates to provide one or more of the indications disclosed herein.
Figure 6:
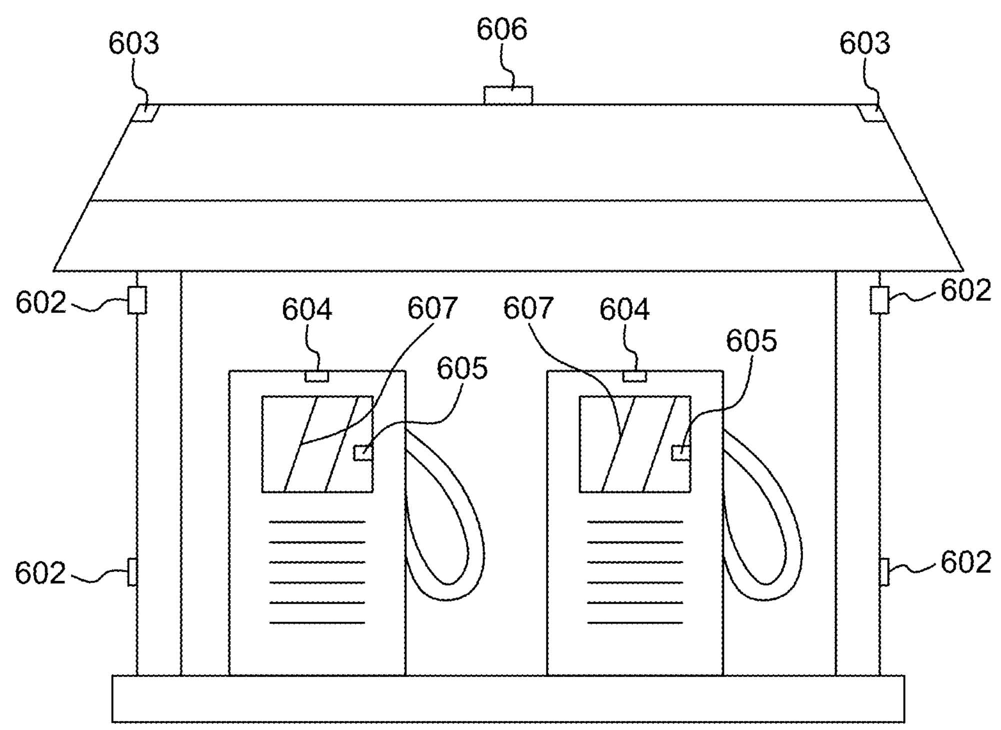

FIG. 6 is a side view of a hydrogen fueling dispenser island 600 that operates to provide one or more of the indications disclosed herein. The embodiment of FIG. 6 operates to provide visual indication of fueling status in lieu of or in addition to the visual indication(s) provided on the fueling dispenser as described herein. The indicators on the island 600 operate to provide others in the vicinity of the island 600 with an indication of fueling status and in particular to provide a warning of a hazardous condition to cause such individuals to take safety precautions such as warning others and/or evacuating the area. The indicators may be positioned in a variety of areas on the island 600 including: 602—on the side of the island; 600, 603—at the top of the corner of the island; 600, 604—at the top of one or more of the dispensing systems in the island; 600, 605—on the display screen of one or more of the dispensing systems; 606—at the top of the island 600; and 607 at the top of the dispensing systems. The visual indicators receive indications of status directly from one or more sensors or from a computerized unit to provide the appropriate visual indication. The visual indicator 605 on the display screen of the dispenser. In one embodiment, in conjunction with the visual indicator 605 the hose also illuminates in a manner as described elsewhere in this specification, for example as described in FIGS. 19A, 19B, 19C, 20A, 20B, 20C, 20D and 20E.

Figure 7:
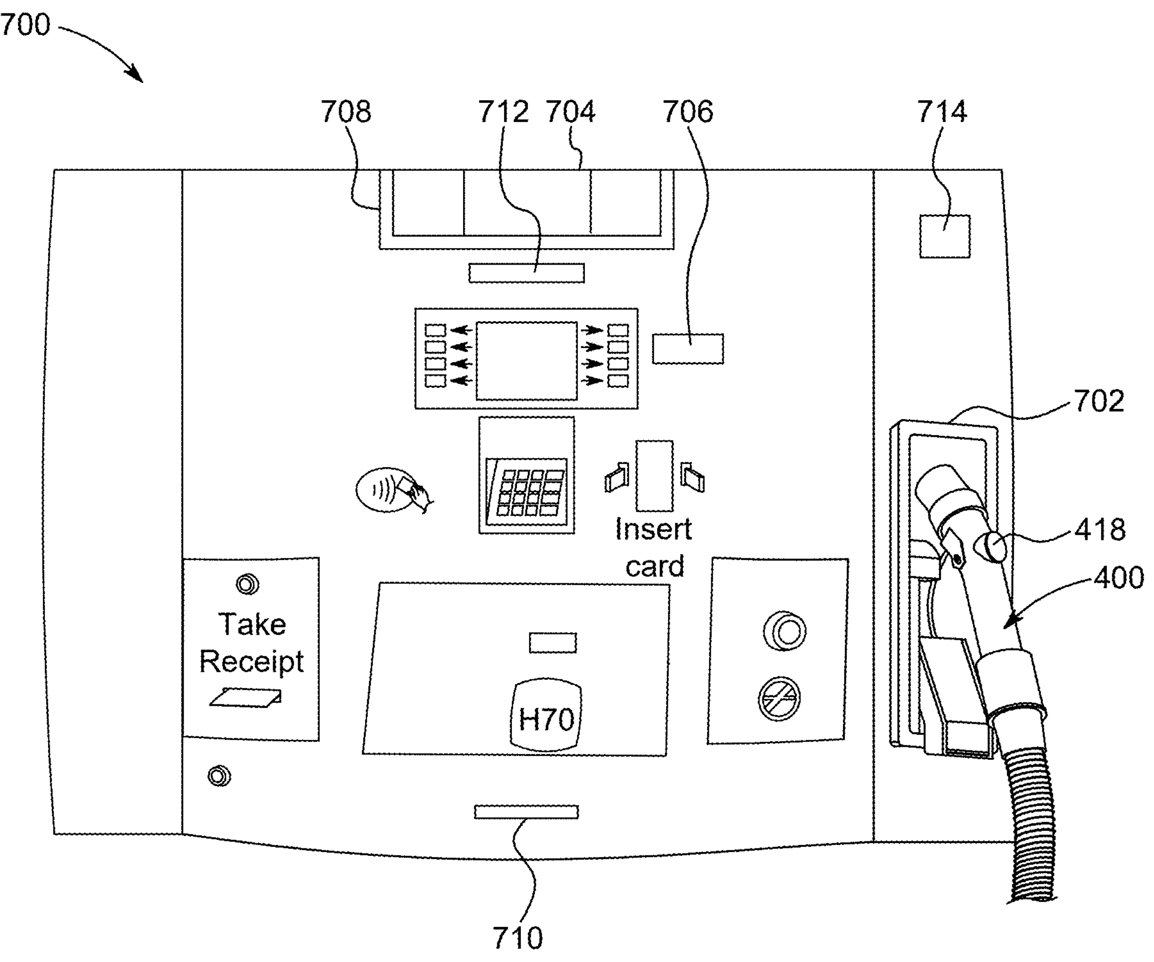
FIG. 7 is a close-up view hydrogen fueling dispenser.

FIG. 7 is a close-up view of a hydrogen fueling dispensing system 700. The visual indicator 418 as described above in connection with FIG. 4 is shown. A visual indicator 702 is positioned at the perimeter of the holding receptacle for the assembly 400. Such a visual indicator 702 can be useful in providing an indication to a user that it is safe to start fueling. Other indicators on the dispensing system 700 are positioned to provide a conspicuous visual and/or audible indication of fueling status. When fueling is being initiated by inserting or attaching the assembly 400 to a vehicle and when fueling is being terminated and sometimes when fueling is in operation, the user will be turned away from the dispensing system 700. In such instances, visual indications will be of limited use to the user but may be of use to others in the vicinity, including those in the vehicle being fueled. In such an instance, certain of the indicators shown in FIG. 7 may provide an audible indication to inform and/or alert the user, and others in the vicinity, of fueling status and of any hazardous condition. As seen, indicators 704 and 708 may be positioned on or in the vicinity of the fueling meter that indicates the amount of fuel delivered to the vehicle. Indicator 706 is positioned adjacent to a control area, comprised of a screen and control buttons, which can be used by the user to make selections pertaining to fueling of a vehicle. An indicator 710 is positioned on a lower portion of the dispensing system 700. Other indicators 712 and 714 may be positioned elsewhere on the dispensing system 700 such as approximately at user eye level in the vicinity of the fueling meter and above the holding receptacle. In one embodiment, in conjunction with the visual indicator of FIG. 7, the hose also illuminates in a manner as described elsewhere in this specification, for example as described in FIGS. 19A, 19B, 19C, 20A, 20B, 20C, 20D and 20E. In one embodiment, in the dispensing system 700, the illumination apparatus as shown and described in connection with FIGS. 32A, 32B may be incorporated into the dispenser shown in FIG. 23 at 2302 to provide illumination of the hose.

Figure 8:
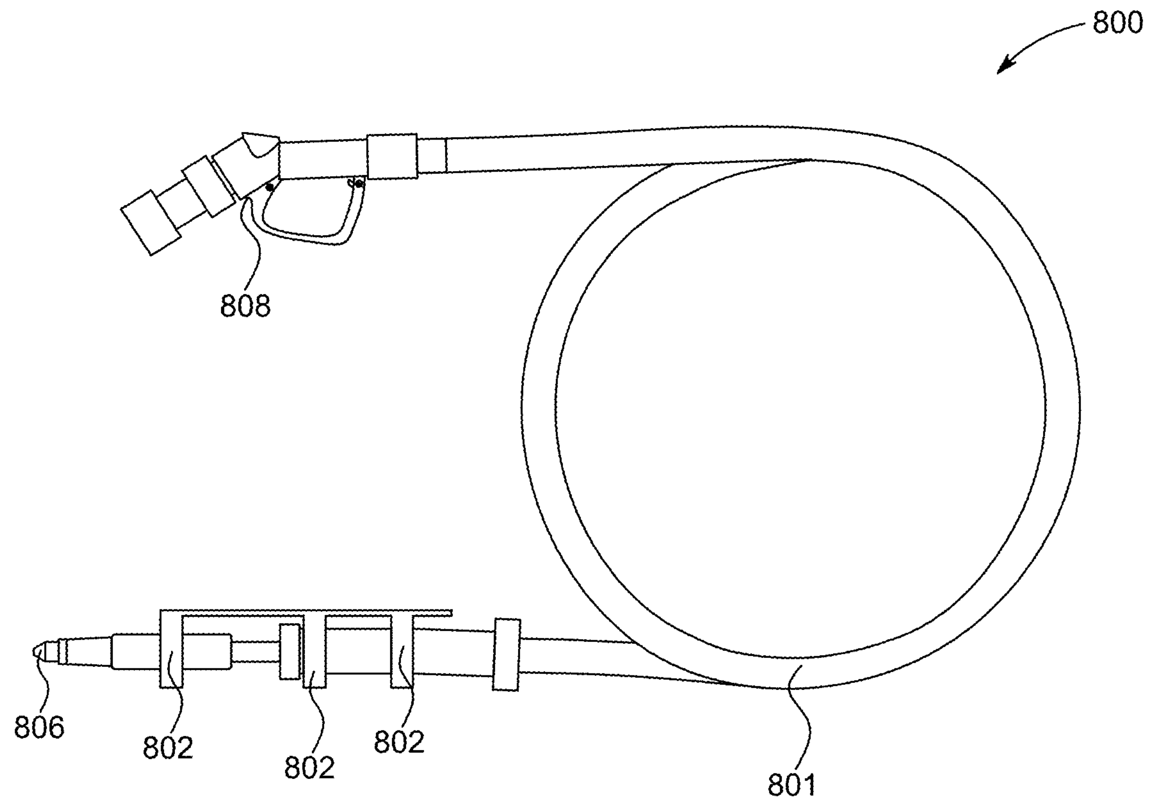
FIG. 8 is a view of a hose assembly that may be employed in a hydrogen fueling assembly.

FIG. 8 is a view of a hose assembly 800 that may be employed in a hydrogen fueling assembly. The hose assembly 800 includes a hose 801 and typically employs a breakaway device 802 that permits detaching of the hose 800 from the fuel dispenser if the hose is pulled away from the dispenser, such as when a vehicle is driven away without removal of the nozzle from the vehicle. A connector 806 connects the hose 801 to the fuel dispenser and can in certain embodiments include a data cable to permit data communication between the dispenser and components on the hose assembly such as sensors and indicators. Also seen is fueling nozzle 808 to attach to a vehicle to permit fuel to be provided to the vehicle. The fueling nozzle 808 may take a form such as shown in the embodiments of FIGS. 1-5.

Fueling status as sensed by the sensors described herein may be provided to the vehicle being fueled to provide occupants of the vehicle, the person performing the fueling and others in the vicinity of fueling status of the dispenser and hose assembly being employed and of the vehicle being fueled. The indicators may be positioned in various places on the vehicle being fueled and this is shown in FIGS. 9A, 9B, 9C, 10, 11, 12, 13, 14 for various types of vehicles.

Figure 9A:
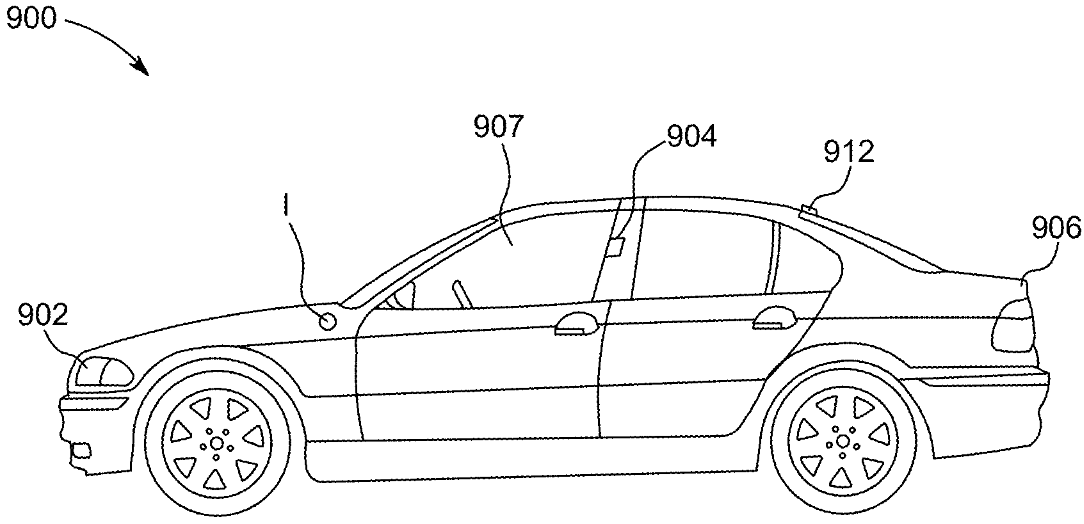
FIGS. 9A, 9B and 9C are respectively, a side view, front view and top view of an embodiment of a sedan type vehicle employing indicators of the type disclosed herein.
Figure 9B:
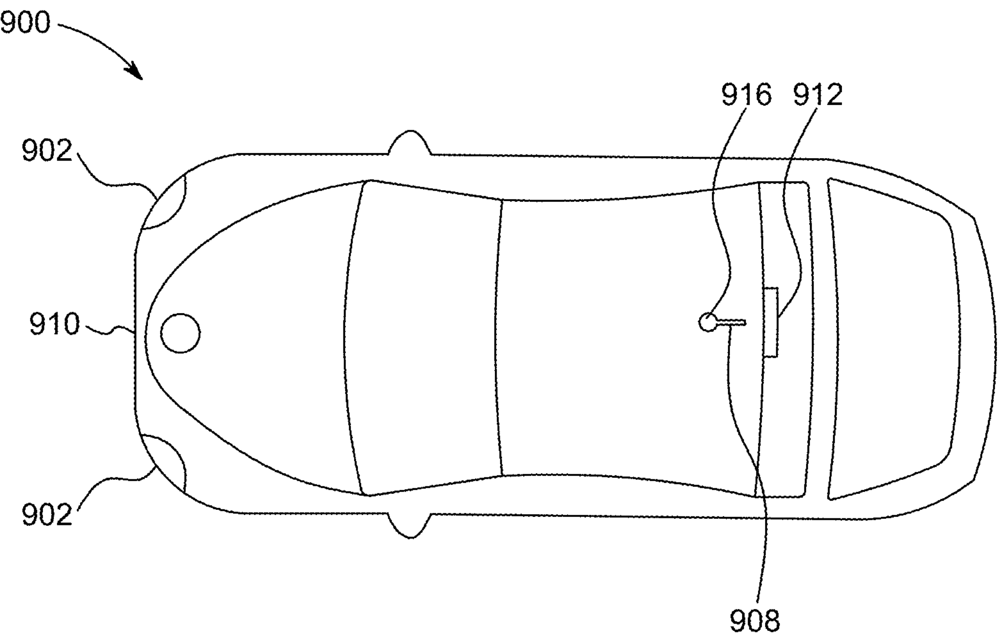
Figure 9C:
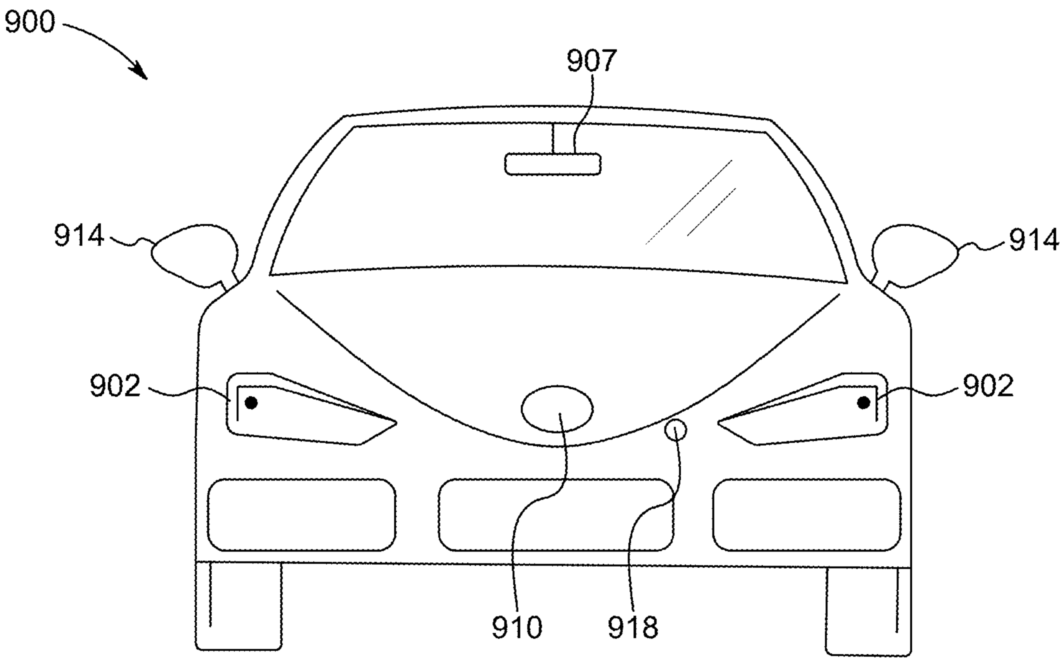

FIGS. 9A, 9B and 9C are respectively, a side view, front view and top view of an embodiment of a sedan type vehicle employing indicators of the type disclosed herein. The vehicle 900 has a visual indicator 902 positioned in the headlight housing, an indicator 904 in each B pillar and one or more indicators 906 in the taillight housing. The vehicle 900 also has an indicator 907 positioned in the rearview mirror, which may face the front as well as the cabin, to inform occupants. The vehicle 900 also has an indicator 908 positioned in the GPS roof mounted antenna area and an indicator 910 positioned where the manufacturer's badge may be, such as in the center of the hood toward the front edge, or in the vehicle's grill. Another indicator 912 is positioned in the third brake light mounted above the rear window and there is an indicator 914 on the exterior portion of each rear-view mirror. In some embodiments that use turn signal indicators in the side rear-view mirror the indicator 914 may be integral with the turn signal. A battery 916 is also employed to provide energy as a backup source in case of loss of power from the main vehicle battery and/or motor. A horn 918 or acoustic indicator may provide a distinctive tone such as three short beeps followed by three long beeps.

Figure 10:
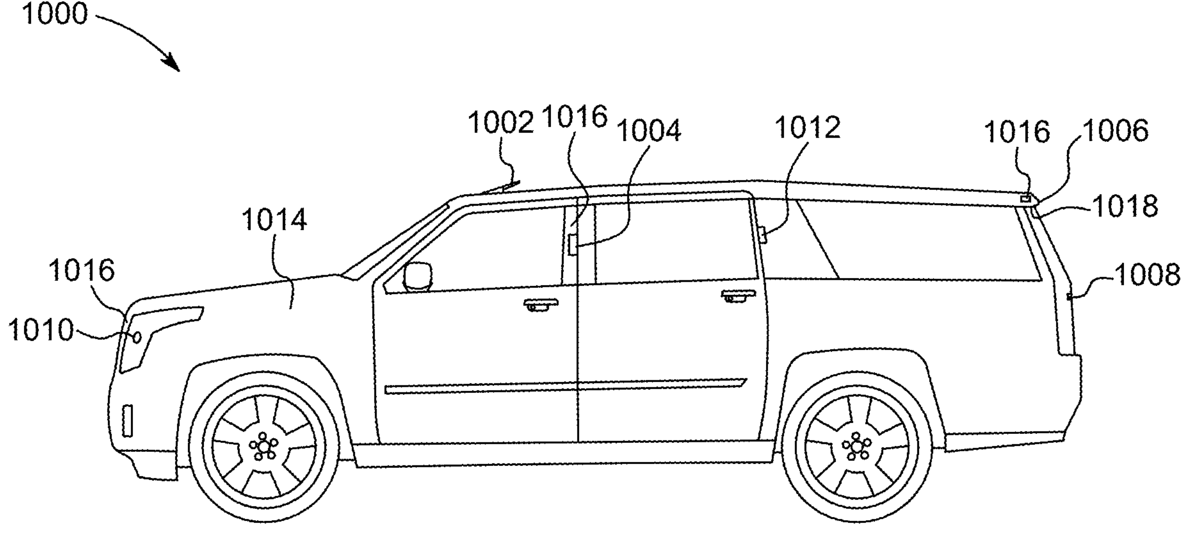
FIG. 10 is a view of an embodiment of a Sport Utility Vehicle (SUV) employing indicators of the type disclosed herein.

FIG. 10 shows a view of an exemplary Sport Utility Vehicle (SUV) 1000 employing indicators of the type disclosed herein. A visual indicator 1002 is located on the GPS antenna which is mounted on the roof of the vehicle toward the front in the vicinity of the windshield. Another indicator 1004 is positioned at the B pillar of the vehicle 1000. This offers the advantage of the indicator being in the same area as the driver's head. Another indicator 1006 is positioned at the rear of the vehicle toward the upper area of the rear window, and in certain embodiments near the area where the roof of the vehicle meets the tailgate/rear window area. In some embodiments the indicator 1006 may be positioned upon or within the third brake light area. The indicator 1006 may take the form of an Organic Light Emitting Diode (OLED) painted surface, anywhere on the structure, to allow it to light up in any color. In such an embodiment, the entire painted surface may light up in any way, shape, color, or pattern or a combination thereof. Another indicator 1008 is positioned in or around the taillight area. Another indicator 1010 is positioned in or around the headlight area. In a larger SUV such as the SUV 1000 which may have three rows of seats, the C pillar may have an associated indicator 1012, near the rear occupant's head. This provides a secondary alert zone, where passengers may be in the vehicle. A battery 1014 is also employed to provide energy as a backup source in case of loss of power from the main vehicle battery and/or motor. A horn 1016 or acoustic indicator may provide a distinctive tone such as three short beeps followed by three long beeps. A visual indicator 1018 may be located in the third brake light.

Figure 11:
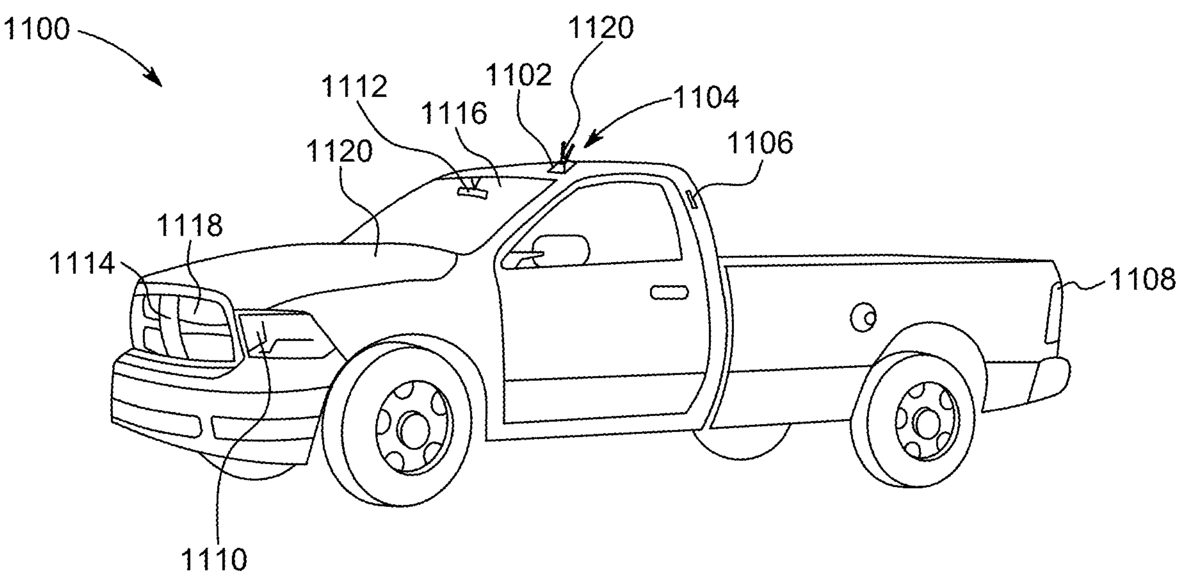
FIG. 11 is a view of an exemplary pickup truck employing indicators of the type disclosed herein.

FIG. 11 shows a view of an exemplary pickup truck 1100 employing indicators of the type disclosed herein. An indicator 1102 is positioned on the top, side or any area of a GPS roof mounted antenna. By way of example, GM vehicles have their antennae in this position above the driver's head. Others like BMW have them at the rear of the roof. An indicator 1104 is positioned in the form of a light at the top of the antenna. An indicator 1106 is positioned at the "B" pillar of the truck. In the overwhelming majority of accidents this area is still intact, unlike the front or rear bumper. An indicator 1108 is positioned in the taillight housing. An indicator 1110 is positioned in the headlamp housing. An indicator 1112 is positioned on the reverse or front side of the rear-view mirror. This is another area that remains intact during crashes, and can warn those in front of the vehicle, and those in the cabin with different colored indicators. An indicator 1114 is positioned in the grille. An indicator 1116 is integrated with the vehicle's emergency communication system (such as "SOS" Onstar by General Motors), or any other external way of communicating with the vehicle. It may play a recorded message, may be a human operator or a general warning. The operator may give the passengers directions, and information. An indicator 1118 is also positioned in the front grill of the vehicle 1100. In one embodiment, a portion of the vehicle grille may illuminate to provide a visual indication.

Figure 12:
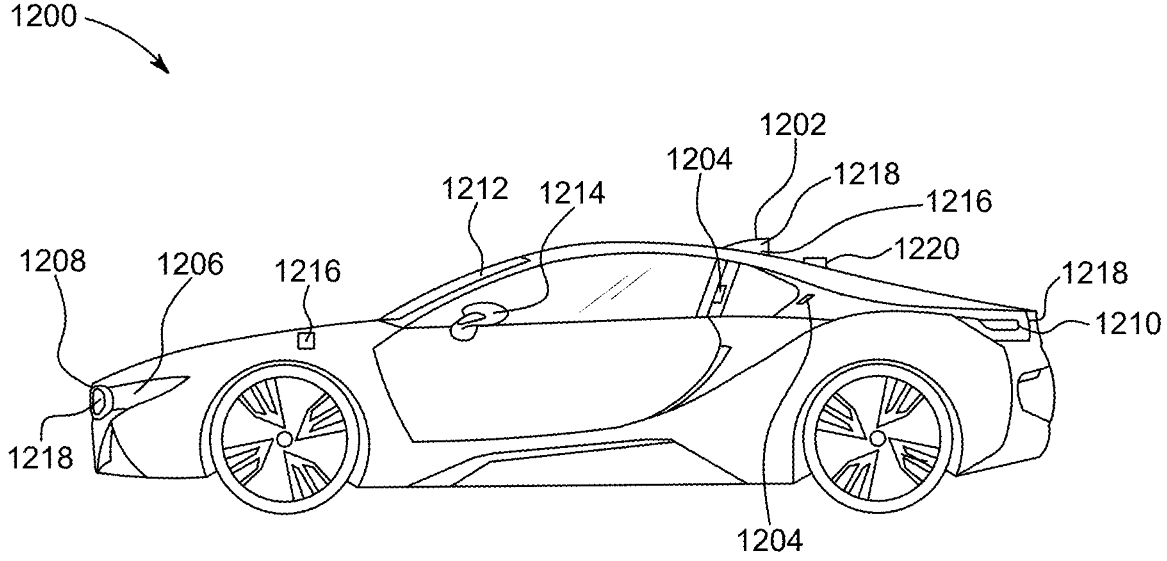
FIG. 12 is a view of an exemplary sports car employing indicators of the type disclosed herein.

FIG. 12 shows a view of an exemplary sports car 1200 employing indicators of the type disclosed herein. An indicator 1202 is positioned in the "shark's fin" GPS antenna on the roof of the vehicle toward the rear of the vehicle near the upper region of the rear window. FIG. 12 shows a single shark's fin but multiple shark's fins or similar apparatus may be employed on any given vehicle. The indicator 1204 is positioned at each B pillar, an indicator 1206 is positioned in the headlamp area and an indicator 1208 is positioned in the front grille. An indicator 1210 is positioned in or around the tail lamp area and an indicator 1212 is positioned in on or around the rearview mirror which could be front or rear facing. The indicator 1210 may take the form of an Organic Light Emitting Diode (OLED) painted surface, anywhere on the structure, to allow it to light up in any color. In such an embodiment, the entire painted surface may light up in any way, shape, color, or pattern or a combination thereof. Also, an indicator 1214 is positioned on the outside area of the turn signal area on the rearview mirror. A battery 1216 is also employed to provide energy as a backup source in case of loss of power from the main vehicle battery and/or motor. Another visual indicator 1220 may be positioned in the third brake light of the vehicle.

Figure 13:
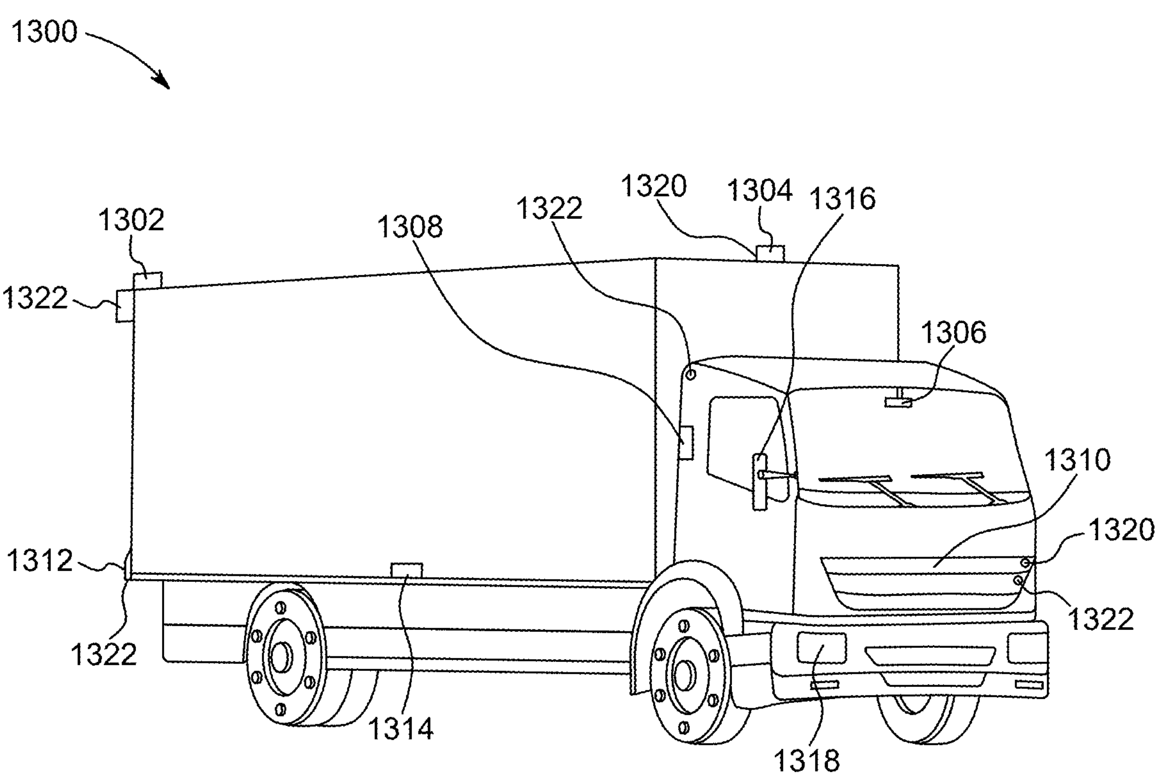
FIG. 13 is a view of an exemplary panel type truck employing indicators of the type disclosed herein.

FIG. 13 shows a view of an exemplary panel type truck 1300 employing indicators of the type disclosed herein. An indicator 1302 is positioned at the top of the truck in the rear and is either integrated with or is in the vicinity of the vehicle clearance light. The indicator 1302 may take the form of an Organic Light Emitting Diode (OLED) painted surface, anywhere on the structure, to allow it to light up in any color. In such an embodiment, the entire painted surface may light up in any way, shape, color, or pattern or a combination thereof. An indicator 1304 is positioned at the top front of the truck 1300 and is either integrated with or is in the vicinity of the vehicle clearance light. An indicator 1306 located on, around or in a rearview mirror. An indicator 1308 is positioned on the cab of the vehicle. Such vehicles may operate with only a cab, and not the box type storage container. An indicator 1310 is positioned in the front grille. An indicator 1312 is positioned at the rear by the loading platform. An indicator 1314 is positioned at each side of the vehicle and an indicator 1316 is positioned on each exterior side view mirror. Also, an indicator 1318 is positioned in the headlamp housing area or around it. A battery 1320 is also employed to provide energy as a backup source in case of loss of power from the main vehicle battery and/or motor. A horn 1322 or acoustic indicator may provide a distinctive tone such as three short beeps followed by three long beeps.

Figure 14:
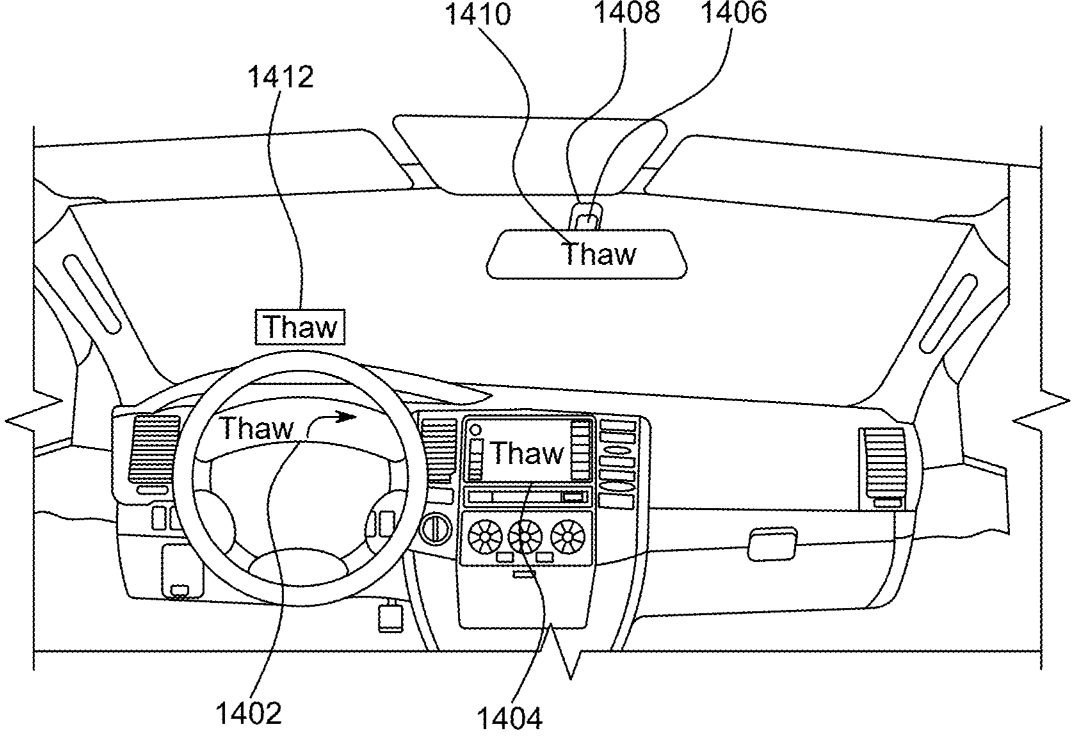
FIG. 14 is a front view of an exemplary dashboard (instrument panel) of a common vehicle employing indicators of the type disclosed herein.

FIG. 14 is a front view of an exemplary dashboard (instrument panel) 1400 of a common passenger type vehicle employing indicators of the type disclosed herein. The central display 1402 in front of the driver indicates the danger and the directions for the occupant. Meaning the danger and directions would be provided as described herein in connection with FIG. 16C. The navigation screen 1404 or the central display, and passenger screen in front of the passenger. in front of the driver operates to indicate the danger and the directions for the occupant(s). An indicator 1406 is positioned in the rear-view mirror to also provide guidance to the user as to a dangerous situation. An indicator 1408 at the rear of the rear-view mirror, may also be used to be seen by those outside of the vehicle. The rearview mirror 1410 which is often not a true mirror but a display like a television. For example, the Infinity QX-80 displays what the driver would see, if their view is blocked due to bulky items in the rear cargo area. This image is virtually identical to what they would see, but it is done through a dedicated camera at the rear and can be flipped on and off from real to virtual images in seconds. in it, when the cargo area of the vehicle blocks the view from a traditional mirror. This area can be used in the manner described in connection with FIG. 16C to provide instructions and other information to guide the user to safety. An indicator or message in the "Head's Up" display 1412 on a vehicle windshield may also be provided. The "Head's Up" is an optical image displayed from the dashboard of the car, which makes the image opaque in front of the driver. **NEW. As once cutting-edge technologies become more and more affordable, there may be a second "head's up" display in front of the passenger, or in the center of the windshield. The entire windshield may be a virtual image displaying the alert from passenger to driver. Additionally, the alert can be imbedded in the glass, but invisible to the naked eye, and can illuminate. This can also be displayed in the glass moonroof, the side windows, and the rear windshield. The imbedded or projected image can be for both the occupants and for first responders or people in the vicinity of the car in distress. It could flash: "SOS CALL 911, MOVE AWAY FROM VEHICLE" or any message or symbols. The entire door frames that are around all the windshield, side and rear glass areas can light up. A battery (not shown) may also be employed as a backup source in case of loss of power from the regular power source to power at least the warning systems described in this paragraph. An acoustical indicator, which in one embodiment may take the form of a dedicated speaker (not shown), can operate to silence, or override music or other audio emanating from the vehicle's regular speaker system. The speaker can operate to produce pre-determined warning tones in a unique way and in a unique placement.

Fueling status as sensed by the sensors described herein may be provided to computerized devices commonly used such as mobile phones, and wearables such as watches and glasses to inform various individuals such as occupants of the vehicle, the person performing the fueling and others in the vicinity of fueling status of the dispenser and hose assembly being employed and of the vehicle being fueled. Additionally, there can be a detachable device that operates in the manner described below that the end user can take into a safe area while they wait for the vehicle and nozzle to thaw. That will signal they can disconnect the nozzle safely and leave the station. This detachable device can work by Bluetooth or any wireless means. (e.g., cellular, Wi-Fi).

Figure 15A:
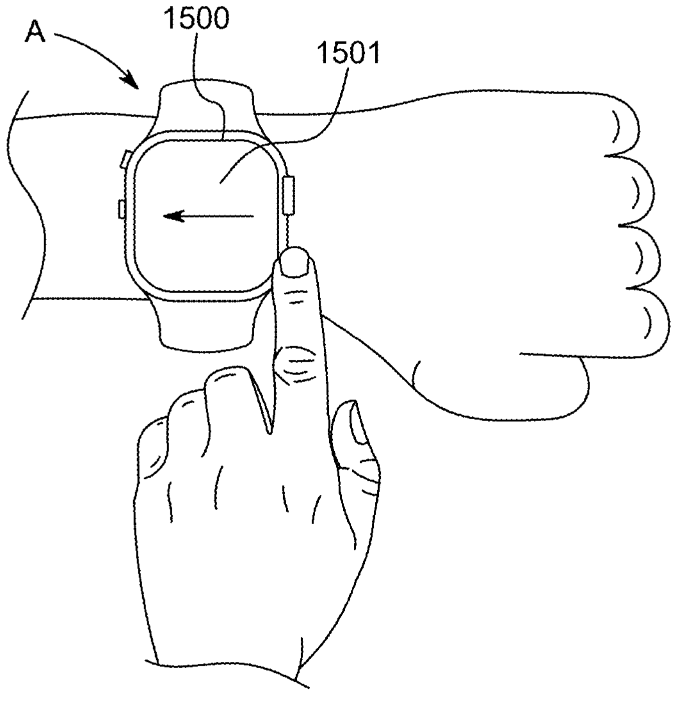
FIGS. 15A, 15B and 15C are views of a wearable computerized device that operates to provide indications of the type disclosed herein.
Figure 15B:
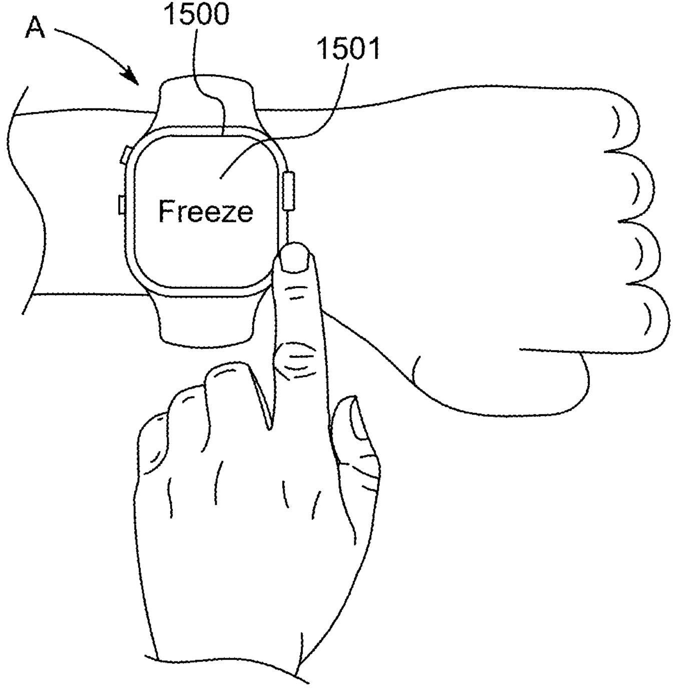
Figure 15C:
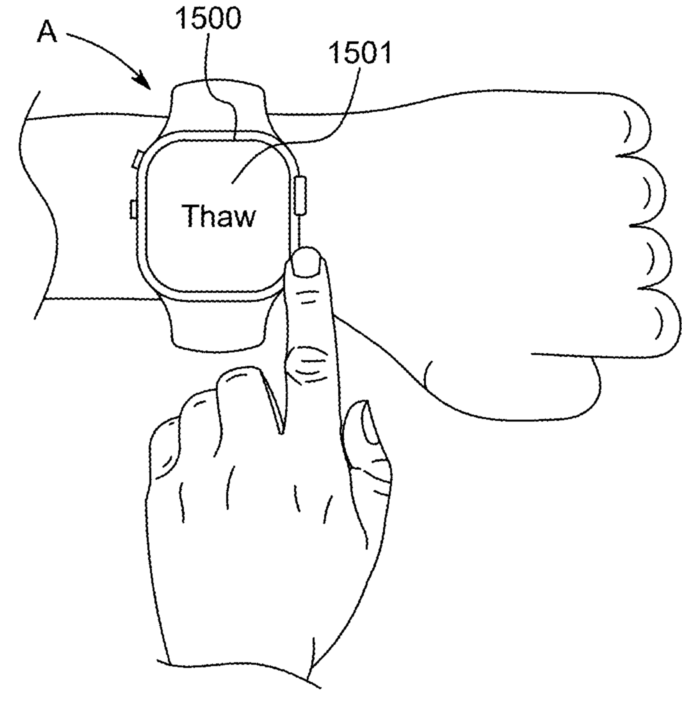

FIGS. 15A, 15B and 15C are views of a wearable computerized device that operates to provide indications of the type disclosed herein. Shown is a user's hand wearing a "Smartwatch" or wearable or other device 1500, such as the Galaxy Watch or Apple Watch. If the user is in the vicinity of an event that may put the user in danger, instructions are provided from a location remote to the user's device 1500 that cause control to be taken of the device's screen to provide instructions and other information to guide the user to safety. This can be done automatically or by swiping the screen, pushing a button or by any other means. The directions can be embedded with different lights to alert of the level of danger and "Waze" like characters like ambulances that are available for assistance. Thus, the embodiment of FIGS. 15A-15C provides safety to individuals by guiding them with indications and instructions by way of screen 1501 to stay away from a dangerous event and to guide them away from a dangerous event. The indications and instructions can include an acoustical indication by way of a speaker on the device, a visual indication such as a red warning light, which is a common symbol associated with danger. A vibratory alert may also be employed. As shown in FIG. 15A the user is controlling the device 1500 by way of interactions on the screen 1501. In FIG. 15B the user has been provided with an indication "Freeze" that indicates a freeze state in fueling of a vehicle such as a vehicle being fueled by the user or a freeze state of a fueling station that the user is about to use for fueling. In FIG. 15C the user has been provided with an indication "Thaw" that indicates the freeze state of FIG. 15B has ended and that the frozen state of the fueling apparatus has thawed to permit continued fueling or start of fueling.

Figure 16A:
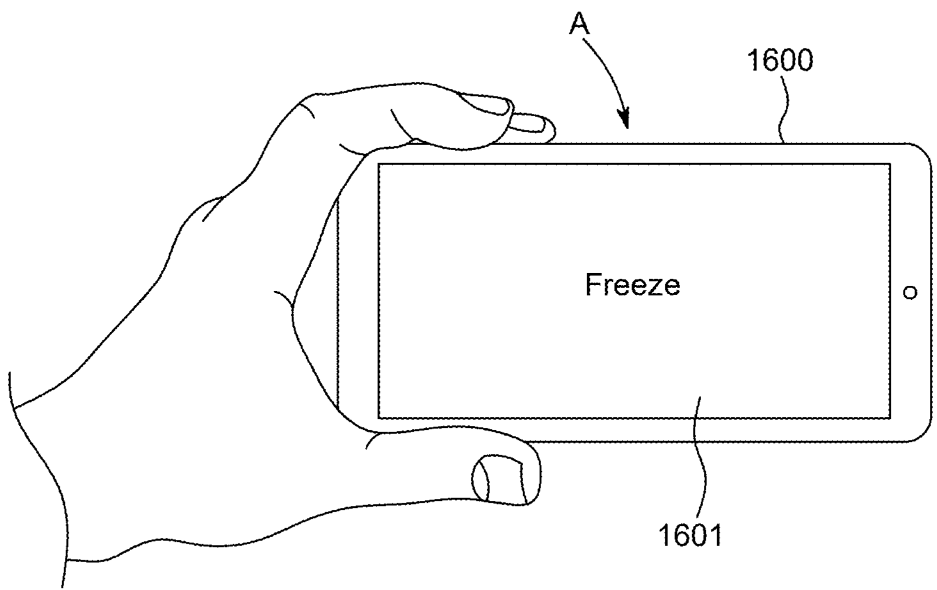
FIGS. 16A, 16B and 16C are views of a hand-held computerized device that operates to provide indications of the type disclosed herein.
Figure 16B:
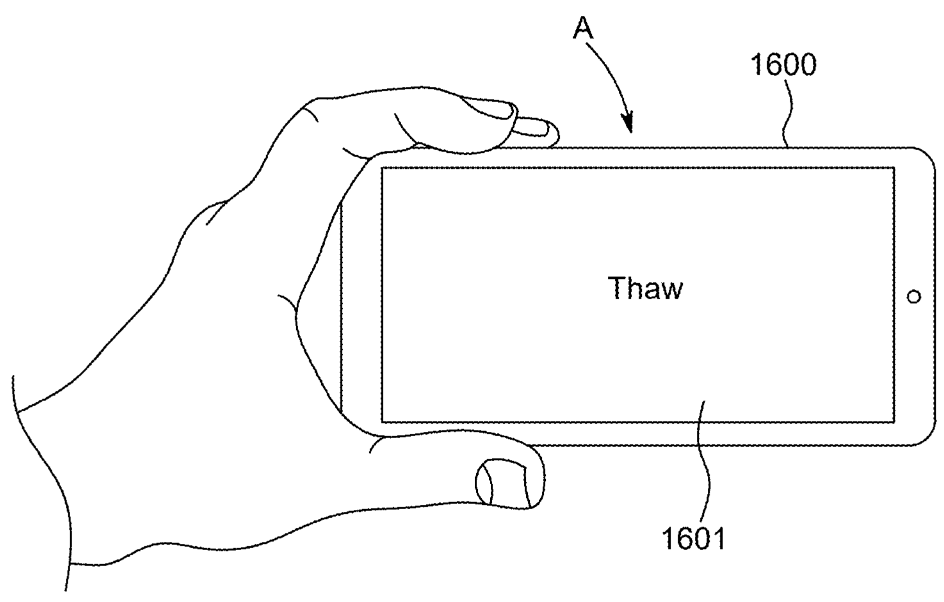
Figure 16C:
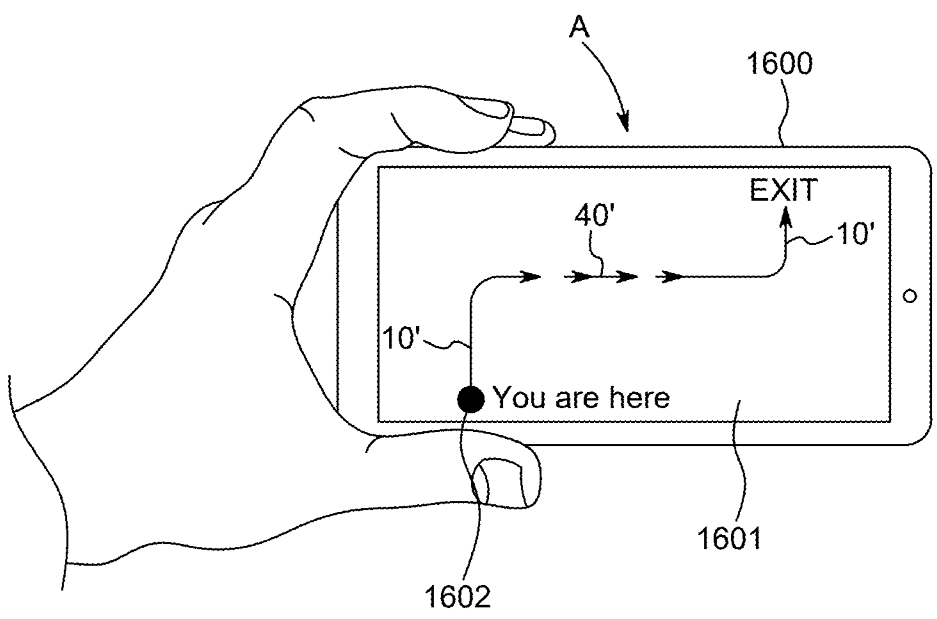

FIGS. 16A, 16B and 16C are views of a hand-held computerized device 1600 that operates to provide indications of the type disclosed herein including warnings, instructions and/or indications to a user with regard to an emergency situation. The screen 1601 is controlled during an event as described above in connection with FIGS. 15A-15C. The instructions to safety are immediately projected onto the screen 1601. At night or in dark situations, the rear facing flash on the device 1600 may be turned on to guide the user to safety, by illuminating the path. The device 1600 is programmed to provide turn by turn instructions, such as shown at 1602, which may be embedded with "Waze" like icons, to guide the user to safety. The screen also provides an indicator to indicate position of the user.

Figure 17:
FIG. 17 is a view of a wearable computerized device in the form of eyeglasses that operates to provide indications of the type disclosed herein.

FIG. 17 is a view of a wearable computerized device in the form of eyeglasses that operates to provide indications of the type disclosed herein. The glasses 1700 operate to project an image 1702 on the lens in a manner to be visible to the wearer. The information may only be visible during an alert or may be a constant stream of information. The indicator may provide instructions to safety, or status concerning the event. The information comes via WIFI, 5G, 6G, Bluetooth, cell transmission or by any other means, from the user's smartphone, or as the glasses acting independently. In one embodiment, a speaker or speakers may also be contained within the frame of the glasses. Additionally, a specific danger LED may be employed to provide a unique flash pattern in case of danger. The lens of eyeglasses facing outward, meaning a person looking at the wearer may see, can display and image. Meaning, as the occupant of the car is running, walking, or limping away from the vehicle, the outer portion of the glasses can display "SOS-MOVE AWAY. CALL 911" followed by "TOXIC FUMES IN THE AREA AND POTENTIAL FIRE." Another added benefit of the glasses displaying a message is if the occupant is overcome by toxic gasses which can irritate the lungs, rendering the person unable to speak. Furthermore, people having strokes, mini-strokes TIAs, are typically unable to speak. These glasses are of benefit to a plethora of individuals including those who cannot speak, which would not allow them to warn others in the area, or about to enter the area, who are unaware that they should move as far away as possible.

Aspects of certain of the embodiments herein can be implemented employing computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The processing of information generated by the various sensors disclosed in this specification may in one embodiment be performed by existing diagnostic systems that provide information to various control and information systems in a vehicle or fueling apparatus, as the case may be. Such control and information systems may employ hardware as described in conjunction with FIG. 18. In another embodiment the processing of information generated by certain of the various sensors disclosed in this specification may be performed by separate programmed computer processors employing conventional A/D conversion to detect when the sensor is providing a signal that is outside a fixed or dynamically determined range. Such a distributed or dedicated controller may be positioned in or on the fueling apparatus, such as for example on the fueling handle and/or hose. In such an instance the controller is self-contained on the fueling apparatus and therefore the generated warnings and indications may be less susceptible to failures elsewhere on the vehicle or fueling apparatus.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 18:
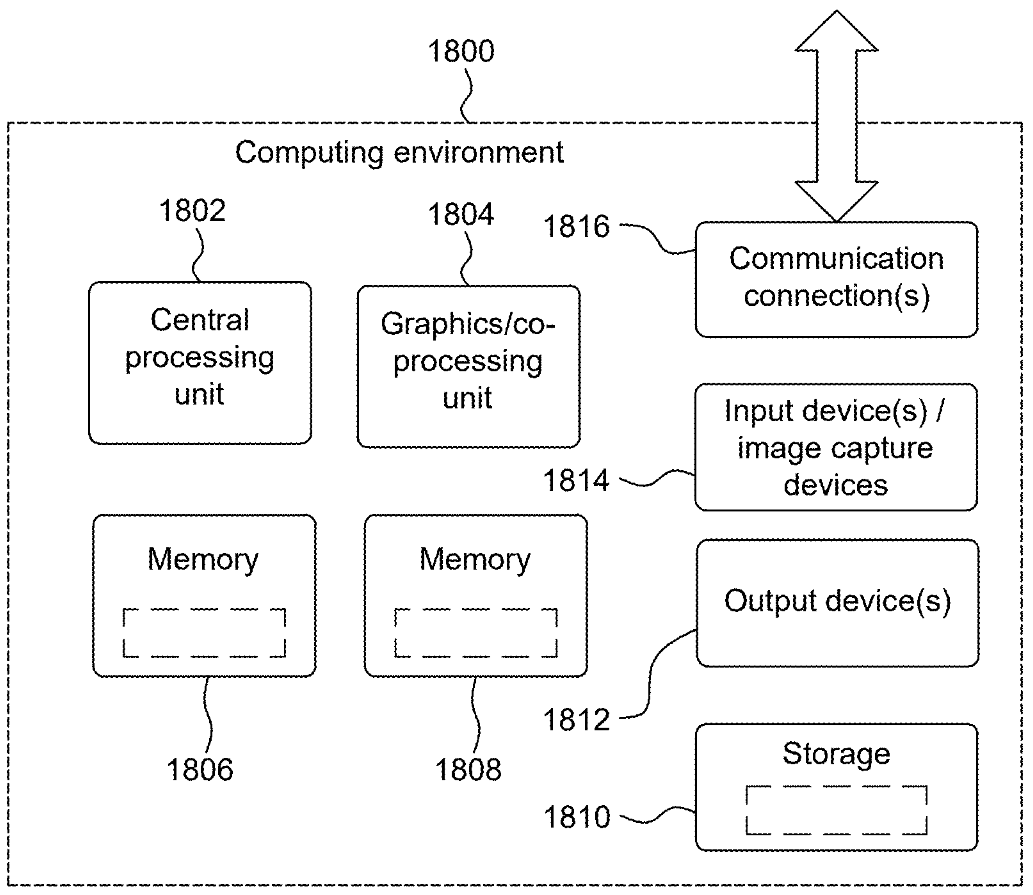
FIG. 18 is a block diagram of an exemplary computing environment that may be employed in implementing computerized aspects of the systems, methods and stored program modules described herein.

FIG. 18 illustrates a block diagram of hardware that may be employed in an implementation of the embodiments disclosed herein employing computer-executable instructions. FIG. 18 depicts a generalized example of a suitable general-purpose computing system 1800 in which the described innovations may be implemented in order to improve the processing speed and efficiency with which the computing system 1800 operates to perform the functions disclosed herein. With reference to FIG. 18 the computing system 1800 includes one or more processing units 1802, 1804 and memory 1806, 1808. The processing units 1802, 1806 execute computer-executable instructions. A processing unit can be a general-purpose central processing unit (CPU), processor in an application-specific integrated circuit (ASIC) or any other type of processor. The tangible memory 1806, 1808 may be volatile memory (e.g., registers, cache, RAM), non-volatile memory (e.g., ROM, EEPROM, flash memory, etc.), or some combination of the two, accessible by the processing unit(s). The hardware components in FIG. 18 may be standard hardware components, or alternatively, some embodiments may employ specialized hardware components to further increase the operating efficiency and speed with which the system 1800 operates. The various components of computing system 1800 may be rearranged in various embodiments, and some embodiments may not require nor include all of the above components, while other embodiments may include additional components, such as specialized processors and additional memory.

Computing system 1800 may have additional features such as for example, storage 1810, one or more input devices 1814, one or more output devices 1812, and one or more communication connections 1816. An interconnection mechanism (not shown) such as a bus, controller, or network interconnects the components of the computing system 1800. Typically, operating system software (not shown) provides an operating system for other software executing in the computing system 1800, and coordinates activities of the components of the computing system 1800.

The tangible storage 1810 may be removable or non-removable, and includes magnetic disks, magnetic tapes or cassettes, CD-ROMs, DVDs, or any other medium which can be used to store information in a non-transitory way, and which can be accessed within the computing system 1800. The storage 1810 stores instructions for the software implementing one or more innovations described herein.

The input device(s) 1814 may be a touch input device such as a keyboard, mouse, pen, or trackball, a voice input device, a scanning device, or another device that provides input to the computing system 1800. For video encoding, the input device(s) 1814 may be a camera, video card, TV tuner card, or similar device that accepts video input in analog or digital form, or a CD-ROM or CD-RW that reads video samples into the computing system 1800. The output device(s) 1812 may be a display, printer, speaker, CD-writer, or another device that provides output from the computing system 1800.

The communication connection(s) 1816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

The fueling indicator can indicate if the nozzle is damaged, or not securely attached. Maybe the customer did not click it in 100% right and the fueling begins, but the handle separates from the fueling receptacle on the vehicle or has a small virtual undetectable leak or there is suddenly a change in temperature of the metal parts due to a small cold hydrogen leak. Cars that have been in accidents or improperly repaired may have fueling receptacle issues. Additionally, there may be frozen water, or ice on either the fueling connector or in the handle, that can prevent a perfect seal. Hydrogen embrittles metal, plastic, rubber, etc. For example, an O-Ring or gasket may be damaged and lodge remnants of the items into or on the connector or handle, creating an imperfect seal. The sensing system may be set to detect specific faults and out of bounds conditions, for example to sense conditions of hairline damage, or micro-perforation of the O-Ring, hose or chip on the fueling connector.

Figure 19A:
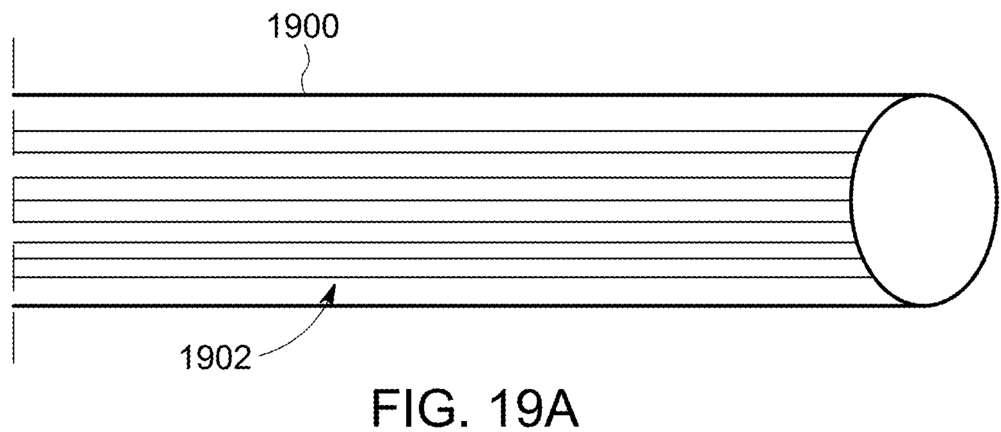
FIG. 19A illustrates an embodiment of a hydrogen fueling hose.
Figure 19B:
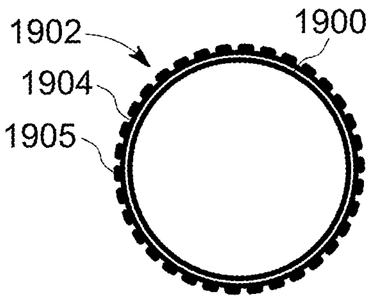
FIGS. 19B and 19C illustrate details of alternate embodiments of the hose of FIG. 19A.
Figure 19C:
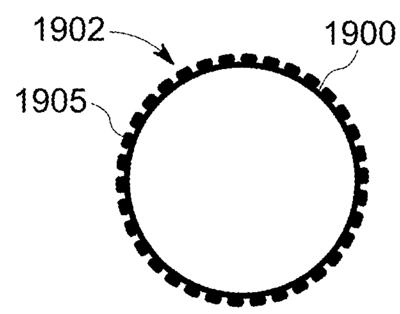

FIG. 19A illustrates an embodiment of a hydrogen fueling hose 1900, in a diagonal cross-section view, with lighting elements disposed thereon which may be used in various disclosed embodiments. Hose 1900 has disposed thereon one or more lighting elements 1902 that operate to provide a visual indication. The lighting elements 1900 may be disposed onto the hose 1900 in a variety of ways and may take a variety of shapes and configurations. Two alternate embodiments are disclosed in the cross-sectional views of FIGS. 19B and 19C. As shown in FIG. 19B, the lighting elements 1902 may be mounted to a sheath 1904 upon which one more lighting elements 1905 are attached. This arrangement permits an existing fueling hose to be easily modified to be capable of providing a visual indication by sliding the sheath 1904 over the hose. The lighting elements 1905 are shown mounted to an outer surface of the sheath 1904. In another embodiment the lighting elements may be mounted to an inner surface of the sheath 1905 and in another embodiment the lighting elements may be mounted between an inner sheath, an inner surface of which contacts the hose 1900 and an outer sheath, an outer surface of which is exposed and facing away from the outer surface of the hose 1900. The lighting elements 1905 may be formed in a variety of patterns or lines to illuminate red or any other color to indicate a fault, leak, or any other out of bounds message, which may indicate that the station operator, or customer must leave the area and not touch the handle, dispenser or hose. The hose may have developed a leak, the handle may not be securely connected to the hose after abuse, or the dispenser attachment is loose or malfunctioning. The illuminated area can be on part of the hose or on its entirety. The electrical connections are at the area where the hose meets the dispenser. The electrical connectors may also be at the handle providing power to the hose. This is advantageous if there is a black out, a drive away situation, where the vehicle operator forgets to return the handle to the dispenser and drives off, separating the hose from the dispenser. The hose illumination may have a separate back up battery in the dispenser, and the handle may also have a backup battery located in it, because if the customer drives off with the handle and the hose connected to the vehicle, the driver must know if the handle and any portion of the hose is dangerously cold or has other issues that could harm those in the vicinity, such as residual hydrogen in the hose, which would create a dangerous situation not only due to the excessively cold temperatures, but may present flammability issues and combustibility issues. Hydrogen could get trapped in the handle or hose, depending on the drive off situation. Meaning the force may render the handle still connected to the vehicle, but the hose may have been severed off. The backup battery in the handle can illuminate the built in or retrofitted collar and or hose. The hose 1900 may be covered in an OLED paint or similar substance, that when powered can illuminate the entire hose. In one embodiment, the illumination can be provided by way of the Light Emitting Coating (LEC) system available from LumiLor, Medina, Ohio (lumilor.com). Such an LEC takes the form of a flexible coating that can conform to various curved and/or shaped substrates (such as a hose) and provide illumination when electrically energized. It may be applied as a liquid coating (referred to herein as "paint") or as a film.

Figure 20A:
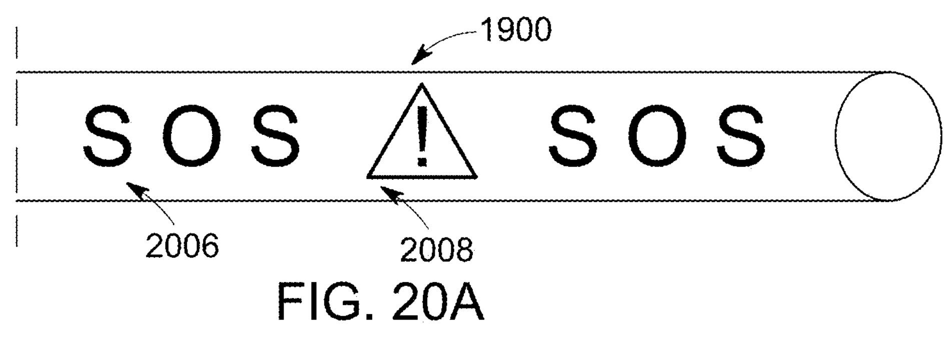
FIGS. 20A, 20B, 20C, 20D and 20E each illustrate a visual indication provided by disclosed embodiments.

Illumination of portions of hose 1900 to provide a visual indication may take a variety of forms such as shown in FIGS. 20A, 20B, 20C, 20D and 20E. As shown in FIG. 20A, the visual indication shows an SOS 2006 and triangle message 2008 alerts. These alerts on the hose or on the overlay sheathing of a standard hose may be of any color, have any symbol or symbols, blink, flash, light up in sequence, go from very bright to dim, and back to very bright again. Blue is sometimes used to denote hydrogen, so the first warning can be a bright blue indicating hydrogen, and then a red indicating a dangerous or out of bounds situation. The indication may also indicate if the handle is frozen to the vehicle and may also indicate when it is safe (connections thawed) and ready to remove. This allows the attendant or user to remain safely in the vehicle or in the station's common area. This is useful during rain, wind or snowstorms.

Figure 20B:
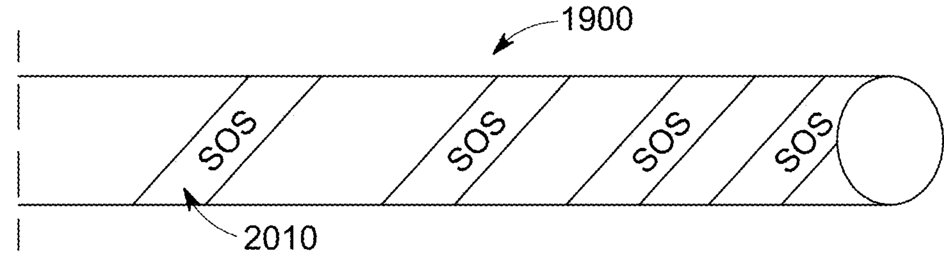

In FIG. 20B, the hose 1900 or its sheath covering indicates SOS repeatedly in a rotating band that appears wrapped at a diagonal around the hose 1900. This arrangement permits perception of the SOS text at any given angle. The customer or attendant may be very close to the malfunctioning fueling dispenser and a smaller message might be more easily understood in a tight viewing range. In one embodiment the smaller SOS aimed at the viewer close to the hose, can then flash the larger SOS and triangle shown in FIG. 20A. The images can alternate from very large, so those in the area or about to enter the area can see the danger warning, and then flash the smaller SOS message for the customer holding the handle or close to the hose. The hose typically goes from the customer's waist height to the top of the dispenser. In a typical situation, the customer's direct sightline of the hose may only be a foot away from it, and the smaller message may be preferable. The smaller message for an individual close to the hose, which may be followed by a larger message for those not in the immediate area.

Figure 20C:
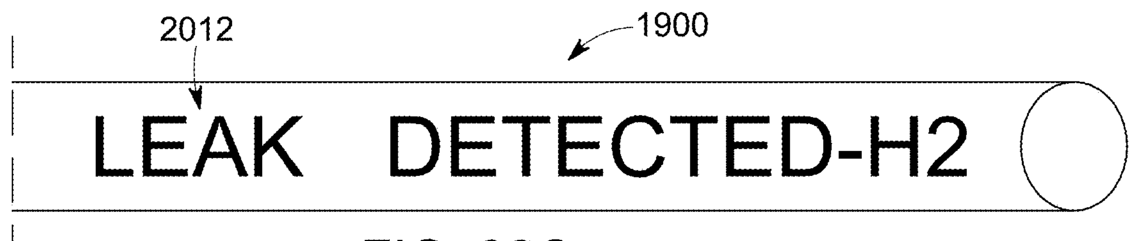

In FIG. 20C, the visual indication on the hose 1900 takes the form of a message clearly written out for those not expecting a station to be all hydrogen or more commonly have a hydrogen dispenser, along with traditional fueling options, such as gasoline, diesel or electric charging stations. At night, or in a smoke-filled environment, the public and first responders must be able to identify which fueling or charging dispenser is having the fault and must know what the danger is. If it is the gasoline dispenser, the liquid drops down, if it is the electric charger, there could be arching or shock risks. If the dispenser, is hydrogen, it could create an invisible flame, thermal injury or explosion. Hydrogen handles and hoses do not always purge their contents completely in an out of bounds situation. When there is a "drive off" and "break away" situation as designed into the dispenser, the well-known "whipping effect" of the hose may spray the remaining contents of the hose onto others in the area. Any substance that is −40-50 C that comes in direct contact with skin can create an thermal injury or worse damage the eyes of those in the area. If the vehicle leaves the station with the hose and handle attached, there may be residual hydrogen or gas in the handle or hose too.

Figure 20D:
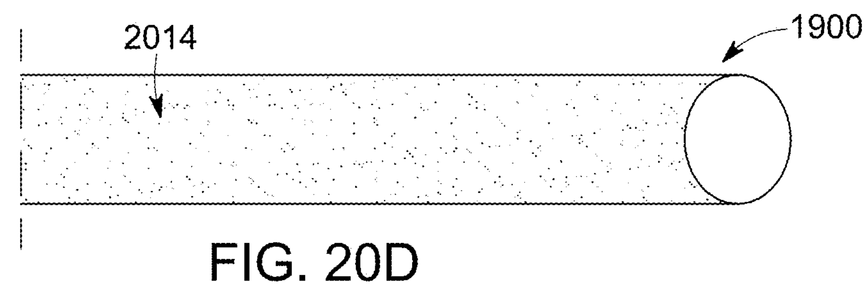

In FIG. 20D the hose 1900 or the protective sheath, illuminates a solid color or blinking in multiple colors without a message. If the hose is inclusive of the light emitting medium (LEDs, OLEDs or OLED paint, Light Guides or Fiber Optics, etc.) or a retrofitted sheath covering the hose, the message would be the same from a viewer's trajectory. Additionally, the sheath can be clear, with one or two areas embedded with LEDs, OLEDs or OLED paint, Light Guides or Fiber Optics, etc.

Figure 20E:
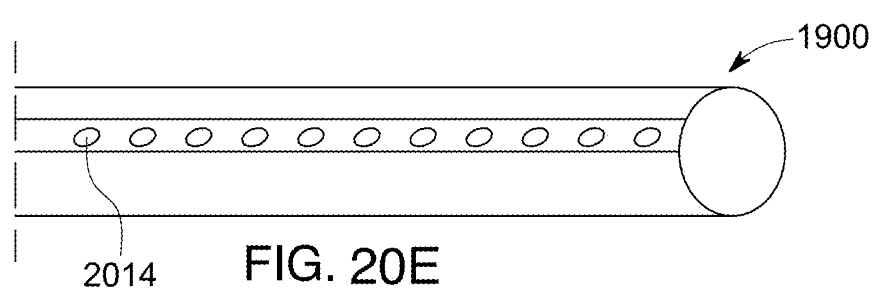

In FIG. 20E, the hose 1900 employs a clear sheath with one or two areas embedded with LEDs, OLEDs or OLED paint, Light Guides or Fiber Optics, etc., such as seen at The sheath may serve only as a clear, water-resistant covering, and may hold an LED, Fiber Optic or light guide rope or any other illuminated substance which would hold the light producing medium close to the hose and allow it and the dispenser to display a message. The protective sheath, may due to normal wear and tear (customer's dragging it on the asphalt) may become scratched or damaged, reducing the light medium between it and the hose. The simple clear sheath can be removed and replaced returning the visibility and at the same time, acting as a protecting surface for the hose and the light producing medium. The hose is often the weakest part of the dispenser assembly and often takes the most abuse. Allowing the sheath to be easily swapped out has many advantages as described. It can protect the hose and the light producing medium and any wires that power the light producing medium. The hose itself, may become frozen due to back-to-back fuelings or subzero conditions at the station. The hose may become solid, and breakable. If traditional LED strips are under the sheath, they may fail to function because the power may break, or it may short circuit the wires or resistors. LEDs can be sensitive to abuse. The clear or light catching sheath, paint, or covering that is illuminated at the handle end or dispenser end, with the light producing equipment, powered LEDs, for example are not in the danger zone. They will still function even if the hose is snapped in half. The light comes from the the handle or the dispenser or ideally both, and having the hose split into two pieces does not obviate the remaining hose to cease to illuminate. The hose snapping into two pieces is irrelevant in this example since it contains no power or items that can fail if cut.

Figure 21:
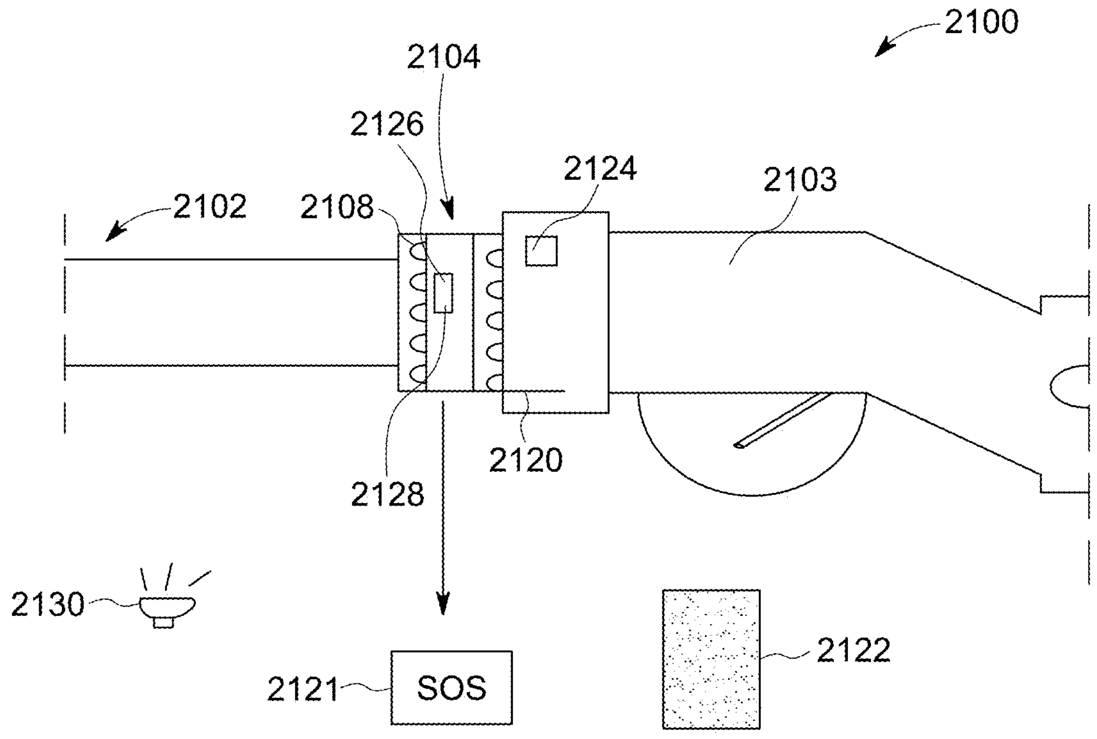
FIG. 21 illustrates an embodiment of a fueling apparatus.

FIG. 21 illustrates an embodiment of a fueling apparatus 2100 comprising a fueling hose 2102 attached to a nozzle 2103. A cuff 2104, that may be a rotatable cuff, is disposed upon the outer surface of the hose 2102 and abuts or is near the nozzle 2103. The fueling hose 2102 may be a standard, non-light producing hose, without any visual indicators described in this application. The cuff 2104 has disposed thereon a plurality of light emitting elements 2108, which may take the form of LEDs, OLEDs or light guides. In one embodiment the light emitting elements 2108 are positioned to project light along the surface of the hose 2102 to initiate a light medium attached to or formed upon the surface of the hose 2102. The fueling apparatus 2100 has disposed thereon sensors (not shown) such as the sensors 426 disposed on the rotatable cuff as described in connection with the fueling apparatus of FIG. 4. Additionally, in certain embodiments, the fueling apparatus 2100 may employ sensors such as shown and described in connection with FIGS. 2-5.

The sensors 426 may sense a variety of out of bounds conditions, such as a leak, hose leak, dispenser malfunction, lack of proper connection to the vehicle, electronic sensor fault, fueling fault, low pressure fault, etc. which may occur anywhere from the nozzle to the wires or wireless communications in the fueling station or even to a remote monitoring station overseas, that can initiate the warning. The hose 2102 tends to not be very insulated and as such sensors 426 positioned in the cuff, that is in the proximity of the hose 2102, can detect accurate temperature at the surface of the hose 2102.

The sensitivity of danger can be infinitely adjustable for different markets or types of fueling, for example, 700 or 1200 bar or 2200 bar, as fueling technology evolves. As of 2022, the force needed to initiate a breakaway has not been standardized (ISO), so manufacturers are free to calibrate the breakaway force they desire. Also, the receiving vehicle may have different parameters, meaning if it is a boat or ship, salt water may be detected which would be normal for a ship refueling. A large truck or train may have different parameters. Traditionally fueling dispensers have protective overhead structures, that provide light, and rain protection but these may not be available if a large ship or farm equipment is being filled. Hydrogen fueling protocols are thought of as the hydrogen being dispensed from a dispenser that is stable, into a vehicle that is stable. There is no movement of the vehicle or the dispenser (barring a drive off). With ships, boats, jet skis for example, they are in the water and are constantly in motion, even if tied to a dock. Any movement can create a problem or dangerous situation. A wake could suddenly pull the boat closer or farther away, force it up or down or pull it away from the dock it the vessel is not properly secured or the mooring rope or buoy fails. The dock itself may move and the attendant or fueling individual may miss the connector and an out of bounds situation could occur. The attendant may have dropped the handle in the salt water once or many times over a shift or week of fueling. The dangerous situation may have been caused by incremental molecules of debris or salt over time, not just during one noticeable error or damage.

A fiber optic or light guide 2120 illuminates one or more visual warnings such as 2121 or 2122, emerging from anywhere in or on the collar, on the sides of it or underneath it. The illuminated visual warning 2121 in the form of text such as "SOS" may be on the surface of the rotatable cuff or on the entire black rubber covering of the metal handle. Alternatively, or in conjunction the message "SOS" may be illuminated from behind the rotatable cuff and/or positioned to any part of the hose, handle, or metal pistol grip area. The visual warning 2121 may be produced by an OLED display or any other light producing medium. Fiber optics or plastic light guides allow for an illumination with no exposed electrical wires, which can be ideal, since hydrogen is such a flammable and explosive gas. Alternatively, or in addition, a visual warning 2122 may be provided that takes the form of an illumination without words or a symbol. Just a red or any color that the user desires. It can be solid, flash, strobe, etc. In one embodiment the visual warning 2122 surrounds the visual warning 2121 so text such as "SOS" is surrounded by an illuminated color that may be solid or that may be flashing. By way of example, it may flash in sequences illuminating "SOS" first, then "DANGER DO NOT TOUCH", then "CALL 911", then "EVACUATE THE AREA". This is advantageous if those in the vicinity have a limited viewing area, or those affected freeze due to being startled or paralyzed with fear. Hydrogen fueling is not like traditional gasoline fueling and the failures are nothing like a gasoline station's failures.

The metal fueling nozzle 2103 includes an illuminated area 2124 affixed thereto or disposed therein. A speaker or cut out 2126 is positioned in the rotatable cuff, with a speaker or sound producing component 2128 disposed therein. The acoustical warning can produce a sound, or words indicating a dangerous situation. The message can be "abort fueling, SOS" or "evacuate area immediately." The message can be automated, if a leak is detected or may be used by the station operator to send specific messages or open a two-way communication dialog. Many hydrogen fueling stations have global presence and emergency situations, may not be handled by the local attendant in the concession area, because it may be beyond his or her level of training. A remote call center can communicate and call for help, and may instruct the attendant to perform other tasks, such as closing the station or leading those in the area to safety. Speaker 2128 may be surface mounted or mounted below with a water-resistant covering, is seen in further detail at 2130 and may take the form of a typical speaker, with a metal base, cone and upwards sound projection of the acoustical warning and or produce violent vibrations.

Figure 22:
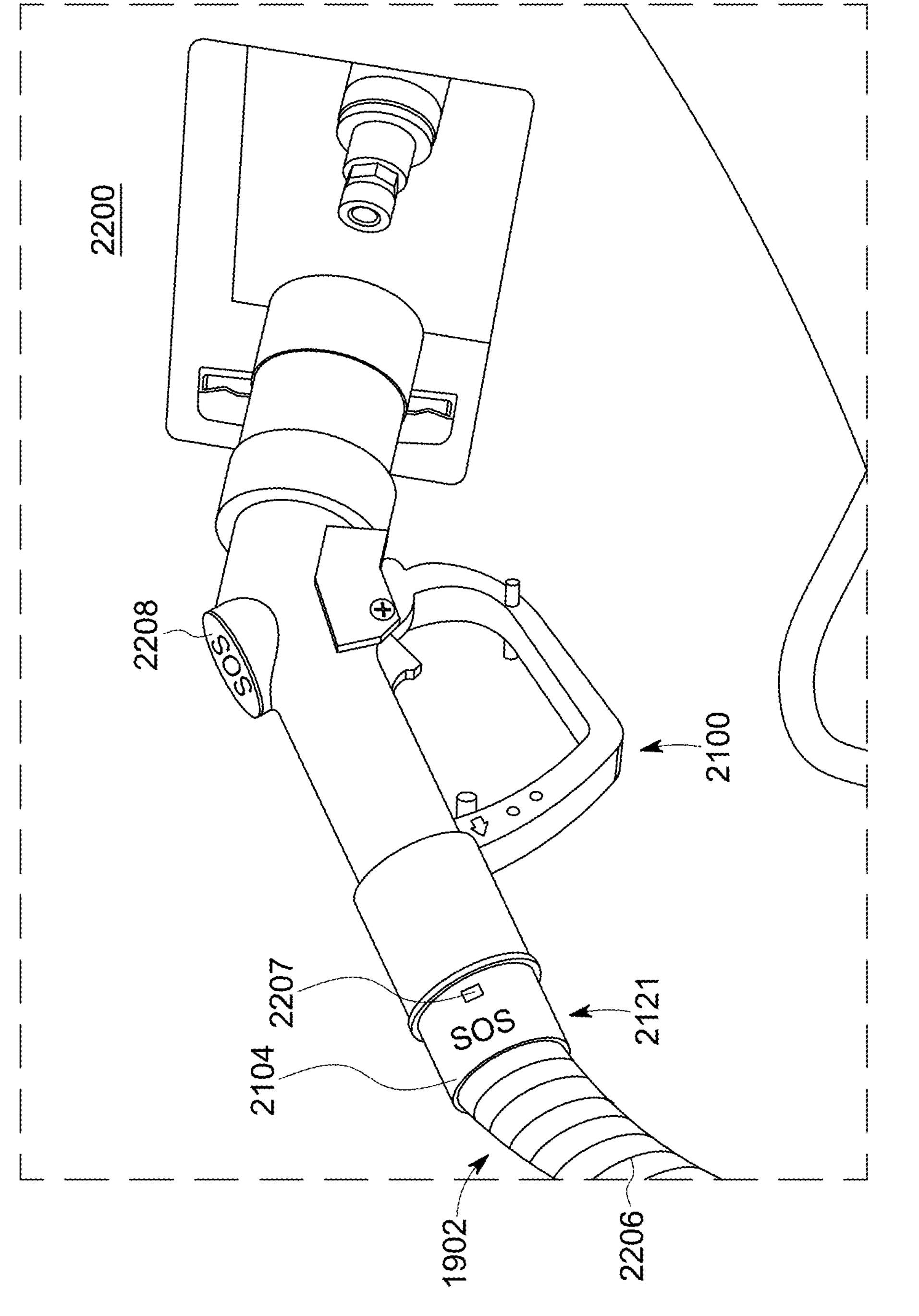
FIG. 22 illustrates another view of the fueling apparatus of FIG. 21.

FIG. 22 illustrates the apparatus 2100 showing the upper and right side in relation to a vehicle 2200. The cuff 2104 has an area that is illuminated with a warning 2121. The area may be lit from inside the collar as a clear "SOS" cut out window, OLED paint, LEDs embedded in the collar or any other light producing medium. A speaker may also be disposed in the cuff 2104 to provide an audible indication and may be flushly mounted below the collar with water resistant covering. As shown generally at 2206, fueling hose 1902 may have the visual indication(s) shown and described in conjunction with FIGS. 19A, 19B, 19C, 20A, 20B, 20C, 20D and 20E. Shown at 2208 is a surface of the fueling apparatus 2100 that faces substantially upward and is visible to the user when handling the fueling apparatus 2100. This surface 2208 has disposed thereupon a visual indicator that can provide a text (e.g., "SOS") or color based visual indication to the user. The apparatus 2100 may also incorporate the various visual and audible indications shown and described in connection with the fueling apparatus 2100 of FIG. 21. In one embodiment, vibration may be incorporated as another indication. In one embodiment, the rubber casing around the handle which protects the customer during the fill, by insulating the cold metal handle may also illuminate by way of cover or sheath. The entire handle can be manufactured just as the hose is described or the handle can have its black outer coating removed and replaced with any alternative described in this application. Additionally, in certain embodiments, the fueling apparatus 2100 may employ sensors such as shown and described in connection with FIGS. 2-5.

Figure 23:
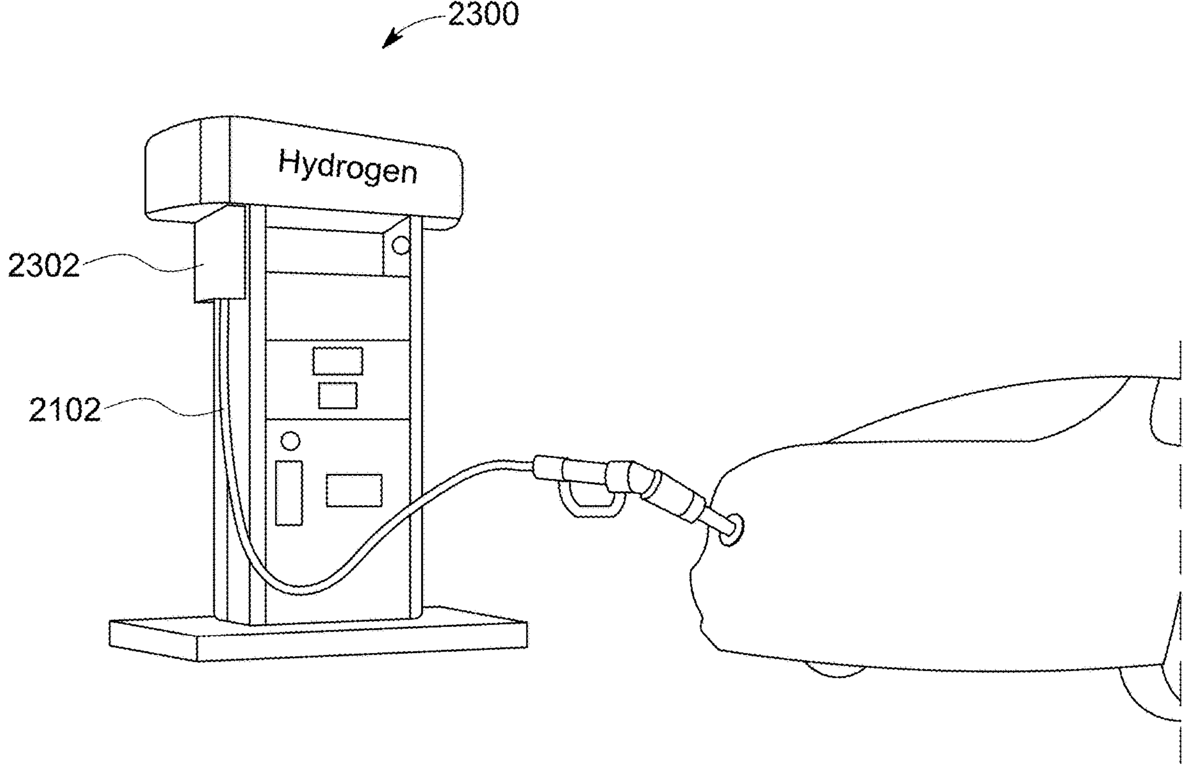
FIG. 23 illustrates a a hydrogen fueling dispenser cabinet that incorporates the fueling apparatus disclosed in connection with FIGS. 21 and 22.

FIG. 23 illustrates a hydrogen fueling dispenser cabinet 2300 that incorporates the fueling apparatus disclosed in connection with FIGS. 21 and 22. The cabinet 2300 incorporates sensors, wires, light producing mediums, vibration components, and sound producing components (a violent vibration can produce sound and a haptic response) housed where the fueling hose 2102 is attached and meets the dispenser cabinet. In one embodiment, signals provided by the sensors in the handle are relayed to the dispenser cabinet for processing. The flow is constantly monitored by a fill algorithm that detects flow, lack of flow, proper sealing of the nozzle and dispenser handle, communication with the vehicle and will abort the fill if an out of bounds situation occurs.

Figure 24:
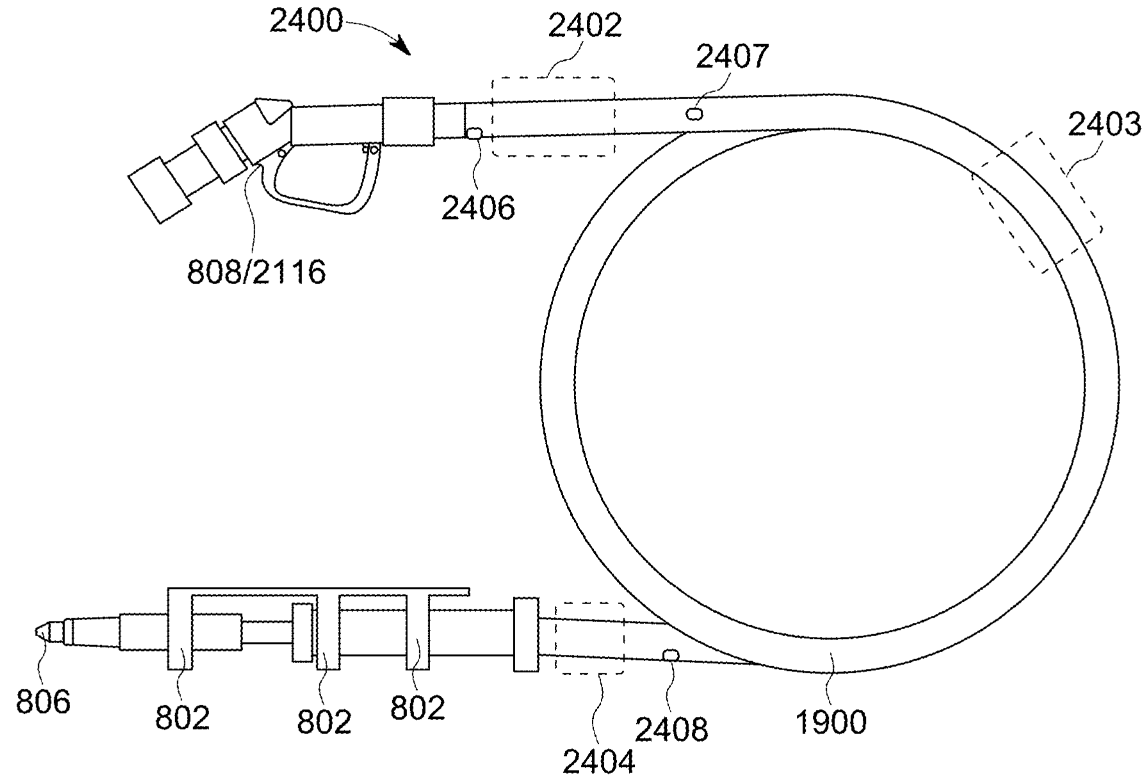
FIG. 24 illustrates a view of a hose assembly.

FIG. 24 is a view of a hose assembly 2400 that incorporates hose 1900 to better illustrate the various positions of the visual indicators described in connection with FIGS. 19A, 19B, 19C, 20A, 20B, 20C, 20D and 20E. The hose assembly 2400 is similar to that shown and described in connection with FIG. 8 but adds the visual indicator(s) described in FIGS. 19A, 19B, 19C, 20A, 20B, 20C, 20D and 20E. As seen, visual indicators as shown and described in connection with FIGS. 19A, 19B, 19C, 20A, 20B, 20C, 20D and 20E may be positioned at various positions along the hose 1900 such as at 2402, 2403, 2404. These positions are merely examples, and the visual indicators may be positioned at other locations along the hose 1900 or continuously along the hose 1900. The nozzle may take a form as described in connection with FIGS. 8 (808) and 21 (2103). The hose assembly 2400 may incorporate one or more sensors 2406, 2407, 2408 positioned at various locations on the hose to detect the various conditions described above. Details of such sensors are disclosed elsewhere in this specification, such as in the description accompanying FIGS. 2-5.

Figure 25A:
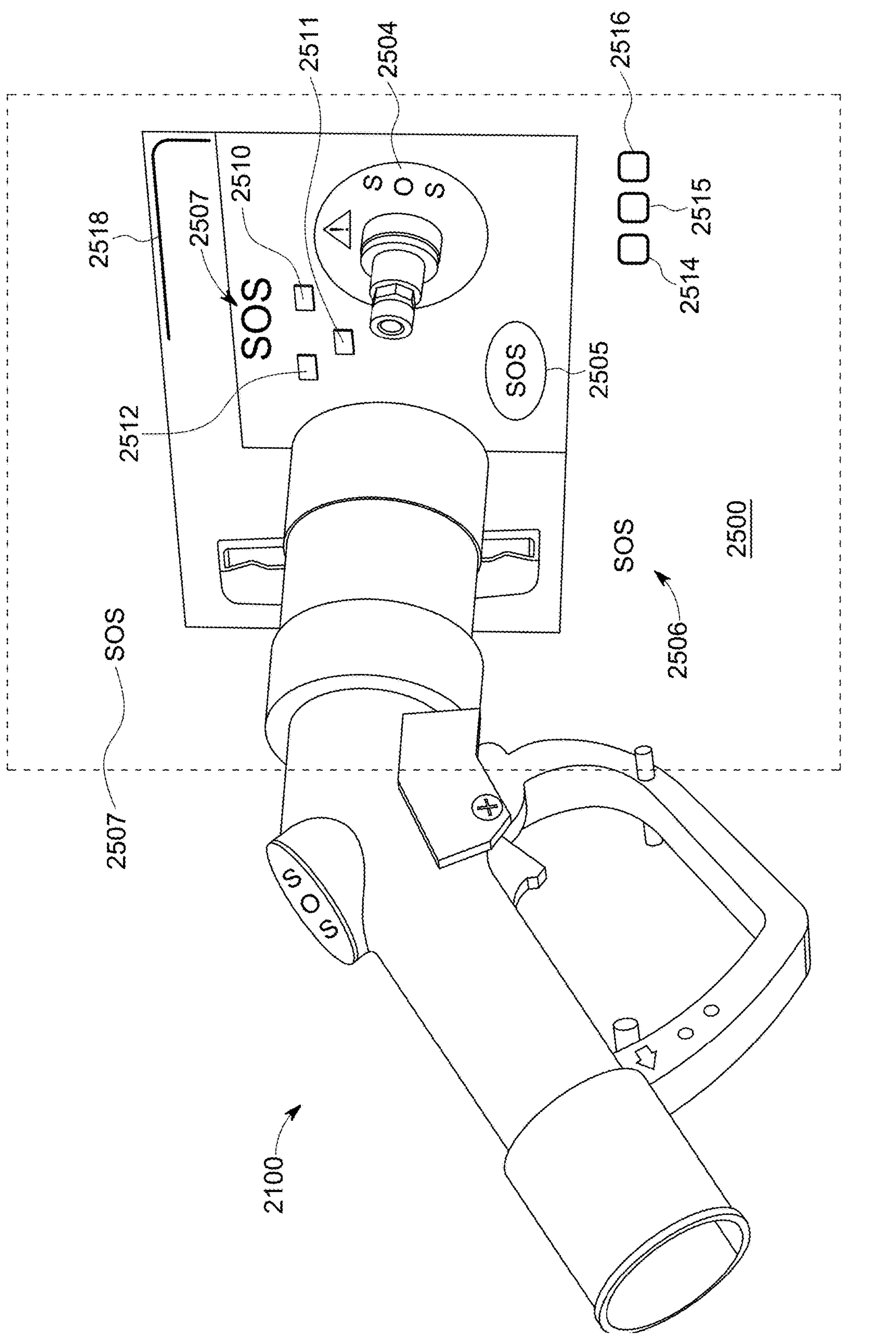
FIG. 25A illustrates the fueling apparatus of FIG. 21 in conjunction with a vehicle.

FIG. 25A illustrates fueling apparatus 2100 in conjunction with a vehicle 2500 (shown generally by the dotted rectangle) and vehicle fueling receptacle 2502. The details of the operation of the fueling receptacle 2502 and associated sensors are as described in conjunction with FIG. 3. In the embodiment of FIG. 25A, the vehicle 2500 employs a visual indicator 2504 to display an "SOS" warning or simply a red or blue dot. Meaning solid blue, means the hydrogen is fueling correctly. A blinking blue may indicate that the fueling has stopped, and the tank is full, and the user may remove the nozzle. If the red is blinking or on, it indicates a problem or danger. on the vehicle surface adjacent to the fueling receptacle 2502. Additional visual indicators 2505, 2506, 2507 may be employed at other locations in the vicinity of the fueling receptacle. The visual indicators may be positioned to ensure visibility to a user irrespective of the positioning of the user and the user's hand(s) relative to the vehicle and to the fueling apparatus 2100. The various visual indicators 2504, 2505, 2506, 2507 may be mounted as a retrofit or built into the vehicle's fueling receptor's area and may be self-powered and stuck on to the area, or be wired in as a retrofit, or as an OEM part. These indicators may also be at the front, side, back or roof of the vehicle. The user may initiate the fueling and go inside for a beverage while the vehicle is automatically fueling. The indicators on other areas or on all sides of the vehicle and on the shark's fin or roof would signal that there is an issue, or the fueling has been completed. Meaning the vehicle owner would see a blinking blue light, then a solid blue light which would indicate the vehicle has been successfully fueled and is ready to leave the station. The vehicle 2500 may incorporate various sensors such as disclosed in connection with FIGS. 2-5.

The various visual indicators may be flush with the back wall of the fueling space. Additionally, the entire area of the fueling space may illuminate or have specific warning messages such as shown at 2504, 2505, 2506, 2507. The space may contain an LED 2510, a temperature sensor 2511 or HF sensor 2512. An LED 2514 may be mounted on the sheet metal below the fueling door on the side panel of the vehicle, and an HF sensor 2515 and a temperature sensor 2516 are mounted on the side panel of the vehicle.

The SOS warning can be used for many uses, including: a poor connection with the hydrogen handle and vehicle mounted receptacle, an "SOS" or "H20!" warning if the sensors in the unit detect gasoline or diesel fumes, or other warnings, such as the nozzle is so cold it could create a thermal injury, or there is a leak, crack or other damage to the handle or nozzle. Hydrogen fueling can create a freezing bond between the handle and the receptacle. These units can also alert when it is safe to disconnect the handle from the receptacle, which could take up to ten minutes to thaw and release. This timed or sensed warning that is safe to disconnect the nozzle can be sent to the vehicle's on-board systems, the user's wearable, or tablet, make a sound indicating it is thawed, such as "THAW, SAFE TO DISCONNECT" or other visual or acoustical alerts. The freeze and thaw warning may also be transmitted to the fueling dispenser where the message would be displayed and heard. The attendant in the station area may also receive an alert and may wish to engage in a two-way conversation with the customer fueling the vehicle. The light producing area shown generally by 2518 can surround the entire door's opening, be on the door, on the sheet metal of the vehicle or be part of an OLED light producing paint, which could illuminate "SOS" anywhere on the vehicle. Since any portion or areas of a vehicle can be "painted" or made to illuminate, it is impossible to show all the variations. The advantages of having the visual warning beyond the door, or fueling area, is that it can be seen by the public, first responders or the customer, who may have left the vehicle fueling because they needed to use a rest room or purchase coffee inside of the station. The sensors which can be retrofitted and self-powered can contain an HF (Hydrogen Fluoride) sensor or any other gas, particle or toxin sensor to detect battery leaks, and the temperature sensors, can detect any important changes in temperatures both negative (hydrogen leak) or positive (battery event).

Figure 25B:
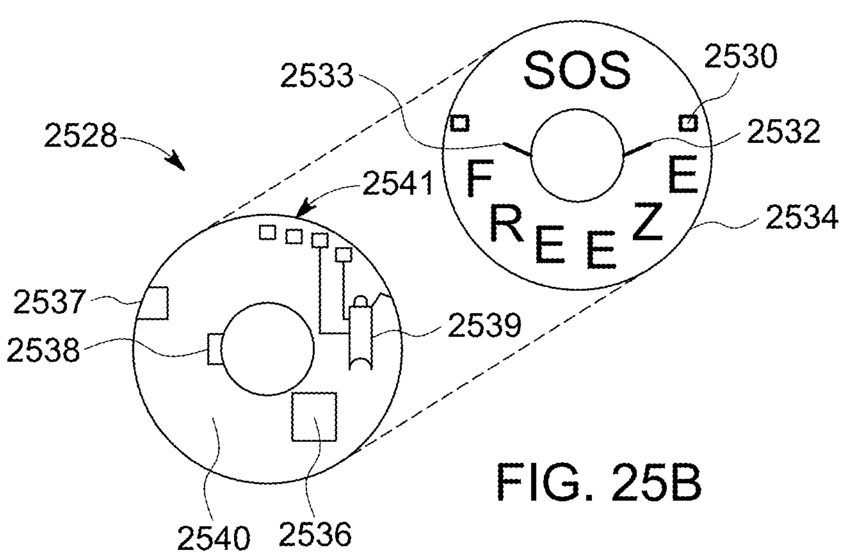
FIGS. 25B, 25C, 25D illustrate details of alternative embodiments of visual indicators of FIG. 25A.
Figure 25C:
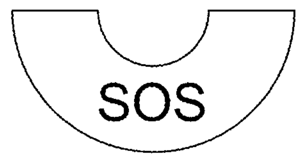
Figure 25D:
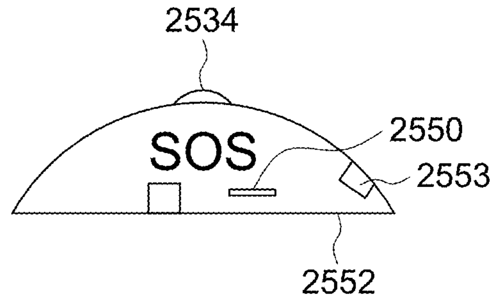

FIGS. 25B, 25C, 25D illustrate details of alternative embodiments of visual indicators 2505, 2506, 2507. FIG. 25B shows an exploded view of a visual indicator taking the form of a circle with a first textual indication ("SOS") in an upper half and a second textual indication ("Freeze") in a lower half. The underlying electronics are shown generally at 2528. FIG. 25C shows a visual indicator taking the form of a half-circle with only a first textual indication ("SOS"). FIG. 25D shows a side view of an embodiment that is raised, in a dome shape. Embedded LEDs 2530 are employed that may shine through a clear cover of the warning device. They may be mounted in a way that directs the light to the user's eyes for maximum effect concerning an emergency situation. LEDs are brightest when viewed head on vs at angles.

An opening 2532 is provided for an HF sensor, that constantly monitors the area for battery off gassing or battery events. Battery fires including propagation, thermal runaway, etc. can happen five seconds after HF is detected, and battery fires can be deadly if they occur while the hydrogen vehicle is fueling, or the handle is about to start dispensing if not connected properly. If a hydrogen vehicle is fueling and there is a battery event, the fire could melt the fueling hose, and create and explosive fire. The HF sensor would help detect a possible lithium-ion, lead acid or nickel metal hydride or other battery type event. Fuel cell or hydrogen vehicles function as battery vehicles, and the battery is what stores the electricity and drives the motor. This specification treats the hydrogen vehicle as inclusive of a battery which may fail independently or as part of the entire drivetrain. A temperature sensor 2533 that is mounted by the inside of the ring structure. This temperature sensor can measure the temperature of the vehicle dispenser attachment "nozzle" to check for out of bounds temperatures and if desired measure excess temperatures, that may indicate a vehicle battery issue or the potential for a fire, if the battery or its components become hot due to a potential failure of components. The entire unit 2534 may be attached with a permanent or semi-permanent glue, permanently mounted or in a snap on/snap off mount. If the unit 2534 is self-powered, the advantages to a semi-permanent or snap on and off mount allow the servicing of the unit, meaning the changing of the backup battery in the unit, or if the unit is self-powered, the battery may need to be changed at set intervals. The battery 2536 may be to self-power the unit or may simply be a backup battery source if the vehicle cannot produce power or the vehicle's batteries are drained or there is an electrical fault, blown fuse, or any other electrical or wiring failure. A speaker is positioned at 2537 and a sensor (e.g., HF, temperature) is positioned at 2538. A wireless (e.g., Bluetooth, 5G, 6G, chip, WIFI) transponder 2539 (which alternatively may be a wired sensor) sends, and or receives information about the status of the vehicle, temperature, off gassing, thermal runaway or other dangers. This transponder can send the message to the wearables, vehicle, dispenser, cloud-based monitoring systems, etc. This transponder/receiver can also receive messages to initiate the alert (acoustical, visual, vibration, etc.). The advantage of two-way communication is that if there is a dispenser, or vehicle out of bounds in the area, which does not include the vehicle and the dispenser of the user, the alert can be a warning of a danger that is not directly related to the user, dispenser or vehicle. It can alert if there is a general station danger, fire, or malfunction. This uses the vehicle and dispenser in an entirely new way, it becomes a warning of any danger in the area not just on the components being used. The aforementioned electronic components are mounted to a board 2540 which also has mounted thereupon around the periphery a plurality of LEDs 2541. As shown at FIG. 25C the unit shown in FIG. 25B may take a different form such as a half-circle shape instead of a full circle.

Turning to FIG. 25D, there is shown a self-contained, or wired visual, acoustical, vibrating, sensing unit which can be mounted to the handle. or any other portion of the fueling handle, vehicle, hose, dispenser or equipment visible to the user or station operator, or the general public in the vicinity of the dispensing unit or nearby, such as on the sidewalk, or on the other side of the vehicle being fueled. The unit may be built in, come as an upgrade kit for the handle, be self-powered and self-contained, or be self-contained, and wired into the handle, which leads to the dispenser, where it can communicate with the dispenser and also be powered by it. The unit can sense HF or temperature and can contain a wireless relay to communicate with wearables, the vehicle or station. A visual display area is seen at 2550 and may display a message of any type, letters, numerals, colors, figures, etc. It may flash, send beams of light, vibrate or produce sounds that warn of a danger. The domed effect allows for improved visual abilities that a flat unit may not have. The unit surrounding the fueling receptacle may be domed or flat. An attachment area 2552 is positioned at the bottom of the unit. Sensor areas (e.g., HF, temperature) are positioned at various points along the dome shaped area such as at 2553, 2554.

With respect to the hydrogen fueling apparatus disclosed herein, in one embodiment, the handle, collar, area of the connector and station, will send the freeze or thaw alerts the same way if HF or other gasses or indications of a hydrogen leak, fire, battery off gassing, component failure, hose failure or other vehicle or station issues are detected that present a danger to the user, station or surrounding areas. In one embodiment, a button type self-powered unit with HF and all the other sensors indicates the presence of HF gas or other toxic compounds detected from either a fault in the hydrogen powertrain or from the onboard batteries of the hydrogen vehicle.

Figures 26A, 26B:
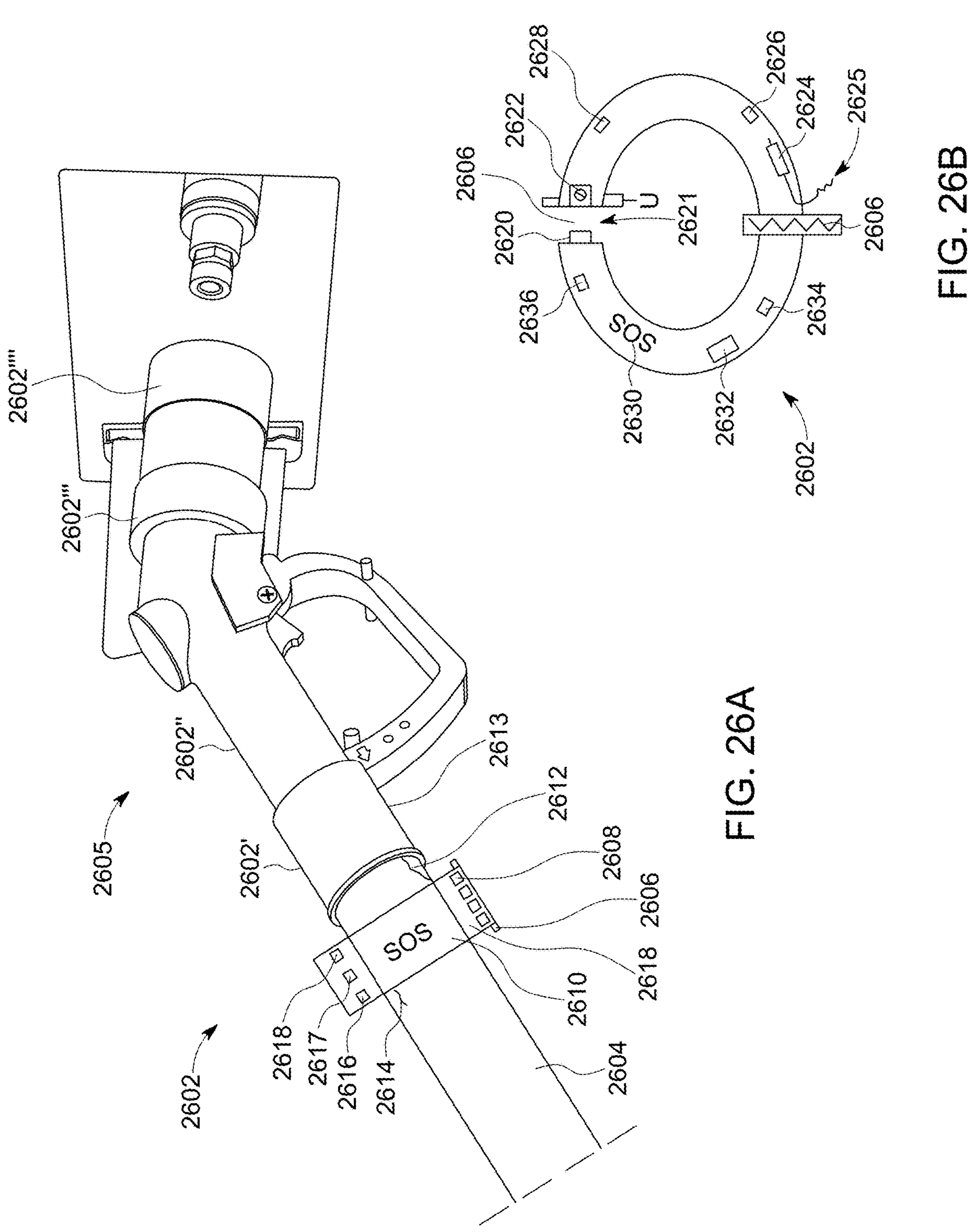
FIG. 26A illustrates an embodiment of fueling apparatus with a collar in conjunction with a vehicle.
FIG. 26B shows a side view of the collar of FIG. 26A.

FIG. 26A illustrates an embodiment of fueling apparatus 2100 with a collar 2602 in conjunction with a vehicle 2500 (shown generally by the dotted rectangle) and vehicle fueling receptacle 2502. FIG. 26B shows a side view of the collar 2602. The collar 2602 is shown positioned on hose 2604 in the vicinity of where the hose connects with the handle 2605. However, the collar 2602 may be positioned at a variety of other points shown at 2602', 2602", 2602'", 2602"". The collar 2602 which may be permanently mounted or removable on any portion of the hose or handle. This collar may be composed of two half circles and screwed or snapped into place. The collar may actually be a series of two or more collars, located at the handle on the hose and at the top of the dispenser cabinet where the hose connects to the dispenser. These collars can be infinitely adjustable to fit anywhere on the hose or handle like a bracelet. They can be removable for servicing, station reconfiguring, component upgrades, etc. They can be wired to the dispenser's or handle's electronics, or self-powered by a battery or the battery in the collar can be for backup power only, if for example the station loses power. In one embodiment shown in FIG. 25B, the collar opens into two half-moons and closes around an area on the dispenser, hose or handle. The variations and combinations are unlimited and these collars, may be a square shape, elongated, oval, or of any size or shape as long as they are secured to the handle, hose, or dispenser. For clarity, the collar is shown on the hose, just below the fueling handle. An attachment and hinged area 2606 of the collar, is provided if it is not slid on to a hose, like a bead on a string, but is put on the area like handcuffs, with a movable portion that expands, and on the opposite side a latch or screw on component. The hinge or other mechanism 2606 allows the collar to come apart for attachment. This collar can be made of four segments or ten. The simple separation into two half circles is for clarity of described functions. A plurality of LEDS 2608 are mounted below a clear portion of the collar to indicate a malfunction of the handle, dispenser, or hose or detection of off gassing from the vehicle's battery. The same HF sensor may be used for hydrogen and battery events. A visual warning 2610, which may be words, letters, a pattern is sized and positioned to be visible and conspicuous to a user of the fueling apparatus. The visual warning 2610 may illuminate the collar in its entirety if it is coated with an OLED substance or made of red plastic, which can glow from embedded LEDs. In one embodiment collar 2602 is powered by a power wire 2612 that electrically connects the collar to the handle, or from the handle to the collar. In one embodiment a communications wire 2614 from the collar to the dispenser cabinet, or from the dispenser cabinet to the collar provides wired communication capability. An HF sensor 2616 and temperature sensor(s) 2617 detect a battery leak and temperature. The area 2618 around the sensors may entirely light up, flash or project a pattern or warning. If the collar has clear portions, the illumination may come from below the clear surface, or the portion of the collar may be opaque, catching the light from below the collar, or OLED paint may illuminate this area that projects outward from the hose. Additionally, in certain embodiments, the fueling apparatus 2100 may employ sensors such as shown and described in connection with FIGS. 2-5.

A drop sensor 2613 is incorporated into the handle 2605 of the apparatus 2100. The location of the drop sensor 2613 is purely for illustrative purposes and the drop sensor 2613 may be positioned elsewhere on the handle 2605. The drop sensor 2613 senses a hard drop or fall of the handle. If a hydrogen or EV charging handle is dropped, it can damage the handle's ability to perfectly connect with the fueling connector, and damage the electronics and communications between the vehicle, handle, dispenser and station. Additionally oblique drops can damage the locking mechanism of the hydrogen handle's components, which may retard a perfect lock to the vehicle, resulting in a leak, due to a chip in the component or a misalignment of parts. Any damage, even minor to a hydrogen handle or it's components can cause a crack, fissure or pin hole, which would allow the −40 C-50 C hydrogen to escape from, and freeze other sensitive sensors or components, cause further embrittlement of components or allow the hydrogen to come in contact with the fingers or hands, may spray upwards to the eyes of the user, causing a thermal injury. A dropped handle may not show internal damage, which could create a great danger. The drop sensor 2613 can also operate to permit logging of how many drops the handle has taken, and at what force, meaning in normal yearly service life of the handle, ten drops from three feet or less, will not damage the handle or its components due to the method of manufacture and the outer protective covering of the handle. However, twenty drops from four feet or an injury to the handle not allowed for, may cause the handle to fail. This sensor can communicate and monitor the drops and force, and transmit the information wirelessly (IoT, 5G, WIFI, Bluetooth, etc.) or by wired means to the user, dispenser, attendant or server or central monitoring station in a remote location. If the sensor is designed to allow for nine drops at a set force, a tenth drop could send a signal notifying the station operator to initiate a routine maintenance call to inspect the handle and sensor. If the drop or force sensor, senses a drop greater than the set force or a series of drops that are unusual the information may trigger a shutdown of the dispenser, and an alert that the dispenser is out of service. This sensor can initiate a fail-safe method of taking the dispenser out of service when the fill in progress is complete, for example. Sensors and transmitting components can be programmed with unlimited algorithms, which can be any series of desired protocols to be initiated. One station owner may want an alarm, an immediate call to the central owner of the chain of stations, a call to 911, and all the perimeter lights to illuminate, while another station owner, may just want the dispenser to shut down, and display "Out of Order" on the screen on the dispenser. The algorithms can change as the fill rates increase, meaning a 350 BAR fill will not have the same parameters as a 2000 BAR fill for a heavy-duty truck. The equipment will be more durable, damage to any system can be a bigger danger due to the increased pressure and rate of flow. Additionally, vehicle fueling stations are typically covered and operate 24 hours a day. Pleasure craft fueling may only operate during daylight hours, and when the equipment is shut down, and re-powered up for the first fill, the damage may have been cause during the hours the dispenser was not in use, or from vandalism or cyber-attacks on the dispenser or network. In one embodiment, a wear sensor may be incorporated into the hose or sheath (or charging cable for electric charging) to permit an indication that the hose should be changed.

The sensors can form a virtual map of the temperatures of the handle, hose, dispenser, etc. The sensors if connected can give the first responders a clear understanding of a hydrogen leak or battery malfunction, off gassing, thermal runaway or other failure. Hydrogen can be hard to detect with one sensor, based on airflow, or other factors. Having a mesh network of sensors, can assist in accessing the venting or unintended releases of hydrogen gas or HF from the battery pack of a fuel cell or battery vehicle. These sensors can also detect heat and gas events not related to the equipment they are attached to. They can be "sniffers' monitoring a wider area and alerting of off gassing from a battery vehicle on the other side of the dispenser, or it can be set to monitor a wider area around the dispenser and handle, making sure that no one is smoking near a fueling dispenser. In some embodiments, a particle sensor may be employed to detect smoke particles. Spectral sensing may also be employed to detect smoke. Burning hydrogen and burning batteries have different burn signatures and different sensors can detect different types of combustion.

The hinge 2606 includes a pin 2620 which fits into a receiving portion 2621 which may be fastened by a screw, lock or solder point 2622 to attach the collar to the hose, handle or dispenser cabinet area. A battery 2624 is provided for a self-powered collar or a backup battery if the unit is powered by the handle or dispenser. A power wire 2625 may also be provided to connect to an external source of energy. A drop sensor, impact sensor or the like, 2626 in the form of a g-force sensor or accelerometer is located in the handle to detect the number and severity of drops the handle experiences. This "sensor" may in some cost-efficient applications, be a "fuse" or weak point in the wiring, or wire coated with a hard but breakable covering. If it is dropped too many times or with force, it would separate the wires, which would initiate a series of predetermined warnings and alerts, or even a full shutdown of the dispenser. A speaker 2628 provides an audible indication and may comprise of a speaker, below a water-resistant covering that is flush with the collar. The side of the collar 2602 may also include a visual display area 2630, which may be of any color, letters, symbols and flash, blink or be solid or a strobe light. The warning can have meanings based on the patterns. Meaning, if the "SOS" stays solid red, the station management would know a fault is detected that does not put the user or station in great danger. It is a fault code, which would allow the user, to abort the fill and leave the area. However, if the "SOS" is blinking rapidly that can mean a dangerous situation is at hand, and it should be treated as an emergency waring to shut down the station in its entirety and to evacuate the area. A solid yellow "SOS" may mean that a service call is due to diagnose a fault. The collar may light up in its entirety, if covered with an OLED paint or other light producing material. The collar may also be opaque, and capture light from any light producing medium inside of the collar or on the surface of it. It may be a clear red, with light emitting from the area of the sensors which would produce a uniform red glow for example. The collar 2602 may also indicate status, without an out of bounds event. Meaning a blinking blue light would mean the dispenser, hose and handle are fueling a vehicle, and a solid blue light may mean the fueling is complete. This information will be helpful if there is an issue at a different dispenser or an unrelated fire or emergency at the station or near it. First responders are taught to immediately "size up" the surroundings. This would indicate what dispensers are functioning properly (blue lights) which are not in use (no lights) and which are dangerous (red lights) in the simplest form.

The collar may also include a transponder/receiver 2632 that sends, and or receives information about the status of the vehicle, temperature, off gassing or other dangers. This transponder can send the message to the wearables, vehicle, dispenser, cloud-based monitoring systems, or station owner, first responders, police, etc. This transponder 2632 can also send the status to the vehicle and wearables, meaning the fueling is complete, and the driver/passenger may now return to the vehicle or there is a fault detected and you should return to the vehicle, or not if there is a dangerous situation. This transponder/receiver can also receive messages to initiate the alert (acoustical, visual, vibration (make the user's phone vibrate), etc.). The advantage of two-way communication is that if there is a dispenser, or vehicle out of bounds in the area, which does not include the vehicle and the dispenser of the user, the alert can be a warning of a danger that is not directly related to the user, dispenser or vehicle. It can alert if there is a general station danger, fire, or malfunction. This uses the vehicle and dispenser in an entirely new way, it becomes a warning of any danger in the area not just on the components being used. An RFID chip, NFC (Near Field Communications) 2634 or any other identifying relay or information containing device may also be included. The collar and its status can store the encrypted information which can be read by the scanner located in the station. Credit cards have small chips that allow information to be received from them even without power. If there is a fire or electrical shutdown of the station, the station owner could still read the information stored in the collar or about the collar from the embedded RFID chip for example. The collar may also include a vibration element 2636 that can violently buzz or vibrate if a danger exists. It may for example, be composed of a small vibration motor with an eccentrically mounted weight powered by the backup battery of the collar or the power supplied to the collar.

Figure 27:
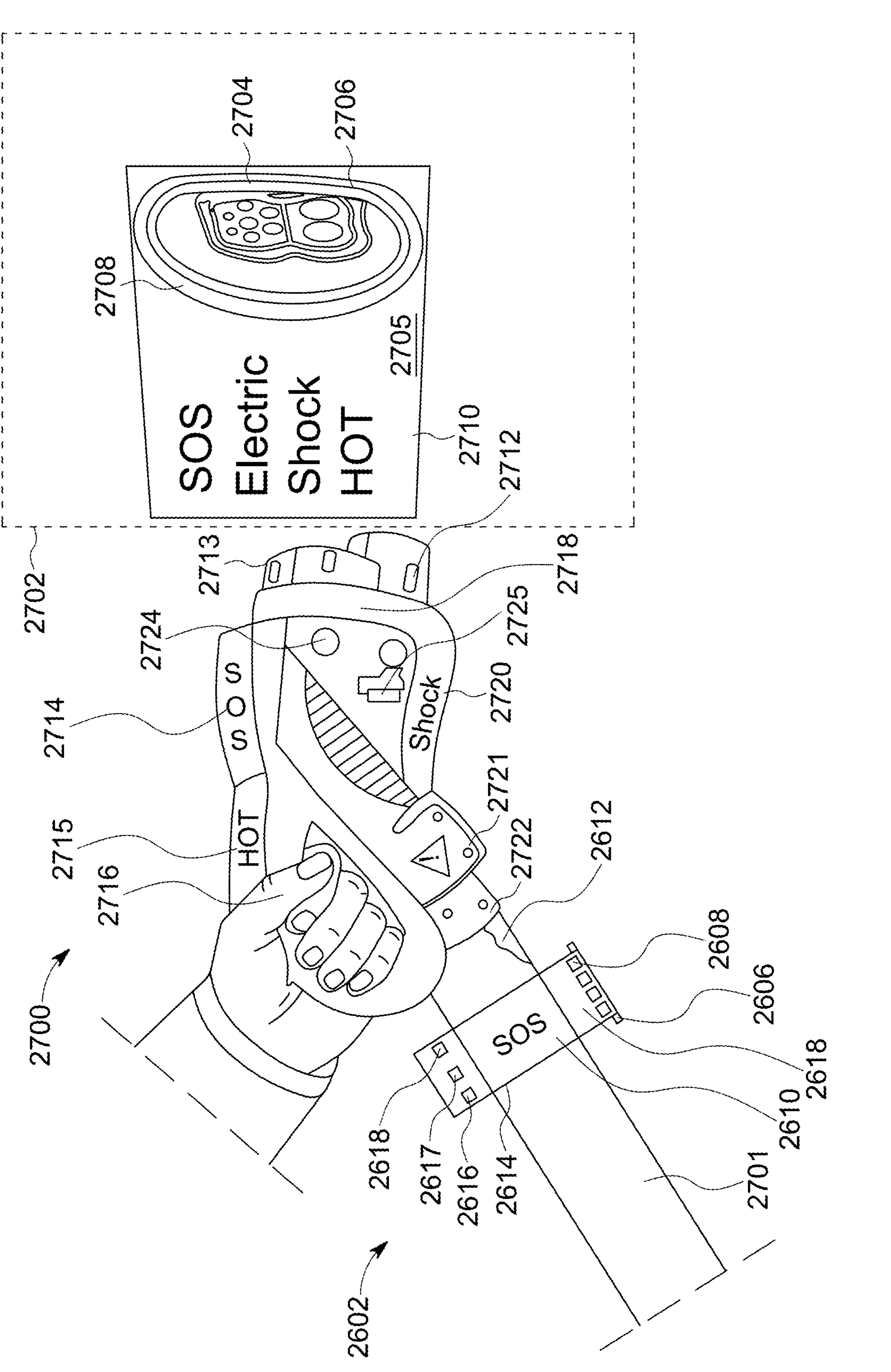
FIG. 27 illustrates an embodiment of a charging apparatus.

FIG. 27 illustrates an embodiment of a charging apparatus 2700 that incorporates the principles described herein to charge a vehicle shown generally at dotted rectangle 2702. As seen, the charging apparatus is connected to a power cable 2701 and includes a collar 2602 as described in detail in FIGS. 26A, 26B. The charging apparatus 2700 electrically connects to the vehicle 2702 by way of charging connector 2704 which is disposed in a charging area 2705 that is generally positioned behind a door or panel on the vehicle. The charging area 2705 may also include a second charging connector 2706 to accept a different incoming current to the vehicle. Meaning one may be for level 1 charging at home, or a fast-charging port, or DC charging for a commercial station charger. The sensors can detect which charger is being used and adjust the dangerous situation algorithms. Meaning, if a home charger is being used, the fault current will be less dangerous than a fast charger in a commercial setting. The charging area 2705 includes an outer ring 2708 of the charging area that can illuminate or flash a warning color or pattern. A lighted perimeter 2710 is positioned around the charging area 2705. Sensors 2712 and 2713 detect usage respectively of the fast-charging port and the level 1 charging port (i.e., home unit). Other sensors can detect temperature and thereby detect a melting of the cable. In one embodiment, a sensor with associated processing may be employed to detect a smoldering fire in a cable at an early stage by analyzing the plastic vapors released by overheated insulating cables, such as described in Karlsruhe Institute of Technology. "Sensor detects cable fire before it starts burning." ScienceDaily. ScienceDaily, 26 Nov. 2015. <www.sciencedaily.com/releases/2015/11/151126104044.htm>

Third party chargers (e.g., not Tesla to Tesla chargers for example) can be problematic, made of inferior parts, not have maintenance schedules that are regular enough to detect issues, or be uncovered in parking lots, where they can be subject to abuse or vandalism. These handles can overheat and create sparks, melting of components and fires. The sensors can detect over or under current situations which could cause sparks, fires, or other issues. These third-party chargers can cause problems on the charger handle and on the vehicle's charging port, or both. The electric cable 2701 from the cabinet to the charging handle can contain all of the sheath, LED, OLED elements of the hydrogen hoses as described herein. For the purely electric vehicle, the third-party chargers have handles that overheat, and cause issues with the charging ports. In one embodiment, the system can measure for the wrong voltage or wattage being used. Meaning the third-party charger could be delivering level 2 power but say level 1 on the charger. This could overheat the port, charging cables or send the car into a battery failure event. It could have been mixed up and send DC power to the vehicle instead of level 1. This signals an alert. The alerts take the same path and displays as described elsewhere in this application.

The charging apparatus 2700 has disposed upon an upward facing surface visual indicators 2714, 2715 that provide warnings and other information. A vibration element 2716 is disposed in the handle to provide tactile or haptic type feedback by way of the user's hand. A speaker 2718 can broadcast any spoken or audible warnings, a visual indicator 2720 located on the handle of the charging cable provides an "SOS" or other warning and a visual indicator 2721 located on the handle of the charging cable provides an "SOS" or other symbol. A vibration element or motor 2722 produces a strong vibration which the user holding the handle will feel on any portion of the handle. The vibration will not be so strong that the user drops the handle. It can pulse, vibrate, then pause and vibrate again for example. A bright white LED 2724 or other bright form of illumination is positioned on a side surface of the charging apparatus. This bright area can illuminate the surrounding area of the handle, or where the handle is attached to the vehicle if there is a power outage. It provides a warning and general illumination and may be useful to a first responder to know where the live electrical handle is located. This bright LED may also have a backup battery 2725 in the handle which may also provide backup power for any other sensors, alerts, vibration elements or receiver or transponder functions, if the station or dispenser loses power.

Figure 28:
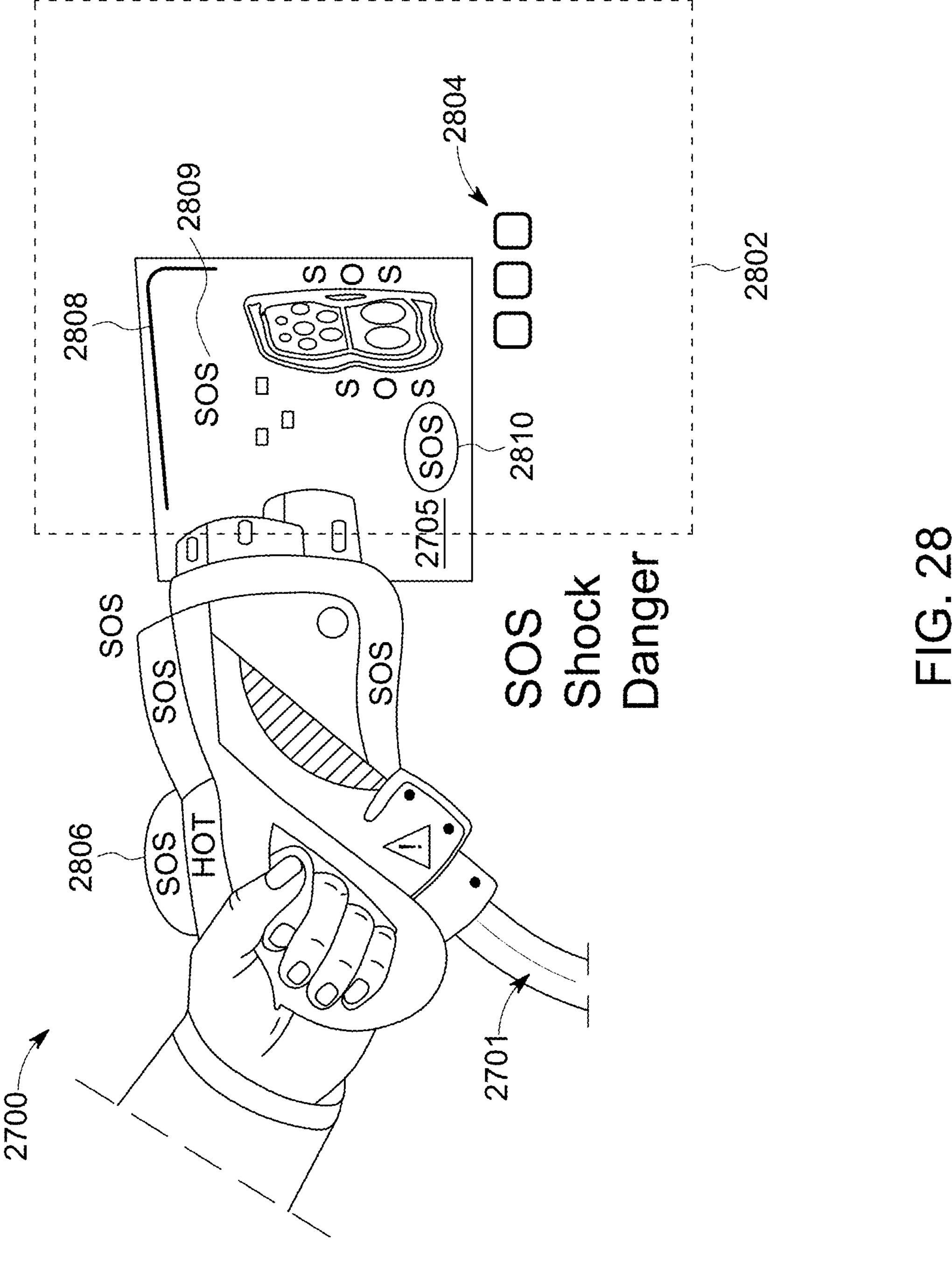
FIG. 28 another embodiment of a charging apparatus.

FIG. 28 illustrates additional indicators on an electric vehicle 2802 in connection with the charging apparatus 2700 of FIG. 27. One or more indicators seen generally at 2804 that are positioned in charging area 2705 provide a variety of indications regarding the electrical charging of vehicle 2802 such as a blinking green color for normal charging, a solid green color for charging complete, a yellow color for a malfunction and a red color for a danger situation such as excessive heat (which may be caused by thermal runaway). Also shown in FIG. 28 is a visual indicator 2806 positioned on an upper surface of the fueling handle in the vicinity of the user's hand while gripping the fueling handle and facing upward to be conspicuous to the user. The visual indicator 2806 is of the type shown and described in connection with FIG. 25D. The charging apparatus and vehicle disclosed in FIGS. 26A, 26B, FIG. 27 and FIG. 28 may employ temperature sensors and HF sensors as disclosed in connection with FIGS. 2-5 and elsewhere in this specification. In certain embodiments, electrical current or voltage sensors may be employed to detect out of bounds electrical conditions (unusually high/low current or voltage) at certain areas of the charging apparatus.

With respect to the embodiment of FIG. 28, The indicators 2804 indicate status of the charge, potential issues, and danger warning. In one example, the indicators are not visible prior or after the vehicle is charged, These LED indicators 2804 for example can be very small and very powerful and may flash, strobe, be solid or change colors. In one embodiment, the green LED is controlled so that it appears to breathe. It goes from bright to dull, and back again. When the green light is solid the charging process is complete. If the unit is discharged, a series of red and yellow LEDs that coordinate to charging state are displayed. The indicators 2804 can mimic the described status charging system of the NOCO or may come up with any indications the manufacturer may desire. These LEDs 2804 can be re-programmed to change patterns and colors at a later date, if for example the vehicle or last mile delivery van, goes from a Lithium-ion battery to a solid-state battery, or if a last mile delivery van is retrofitted to now be a hydrogen or propane powered vehicle. The green LEDs may signal a battery charging protocol, and if the same protocol is used for hydrogen, the indicators would be blue. Fuel sources and power sources may have standardized colors. These LEDs are very small and very bright. A typical size would be 1.6 mm×1.6 mm and have a total thickness of 0.70 mm. In one embodiment, one or more of the indicators 2804 are directional, meaning they can be controlled to coordinate the light output in a specific direction or for general illumination with for example a lens covering the LED. These LEDs may also be sold on tapes and reels. Meaning, the LEDs can come in spools of tape with the LEDs mounted on them. This is advantageous when creating a solid line of light such as shown at 2808. This "light line" can be composed of a strip of LEDs behind a clear, opaque or colored lens. The effect is a solid line, or if the user chooses may mount them individually producing a dotted effect. The "SOS" letters shown at 2809 can be formed using individual LEDs mounted on a board that create the letters. Given their small size and high power, and the fact that they can be bought mounted in rolls ready to be used, creates unlimited possibilities for lighting and messages desired on the vehicle, handle, dispenser and self-powered, self-contained unit as described elsewhere in this application and also shown for example at 2806 and 2810. The foregoing may also be applied to the other embodiments disclosed herein.

Figure 29:
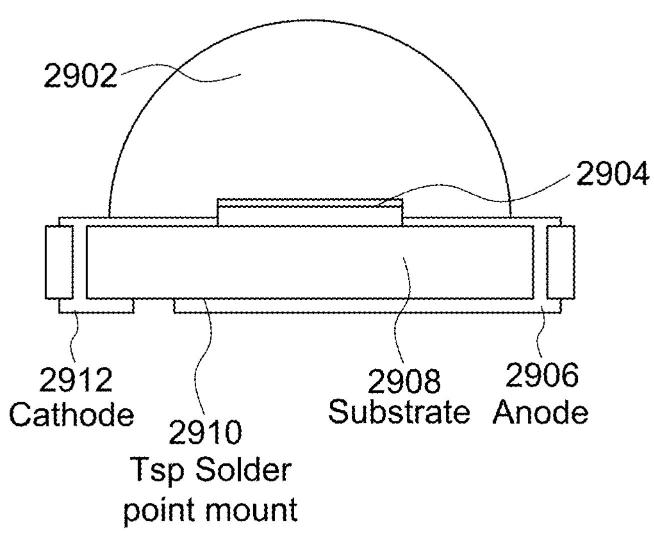
FIG. 29 is an illustration of an exemplary Light-Emitting Diode (LED).

FIG. 29 is an illustration of an exemplary Light-Emitting Diode (LED) 29 that may be employed in the various visual indicators described herein. The LED 2900 includes a silicone lens 2902, an LED chip 2904 to control operation of the device, an anode 2906, a substrate 2908, a solder point mount 2910 and a cathode 2912.

Figure 30:
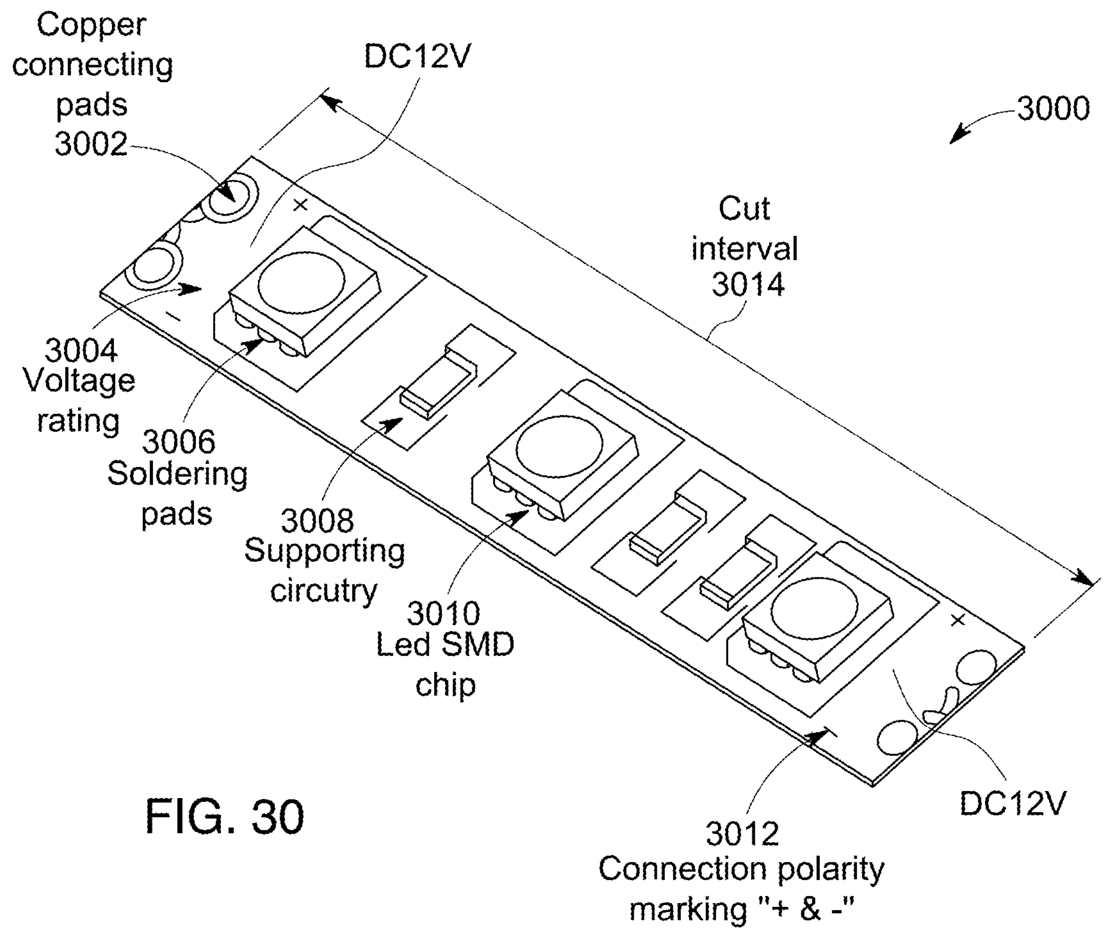
FIG. 30 is an illustration of an exemplary strip of LEDs.

FIG. 30 is an illustration of an exemplary strip 3000 of LEDs that may be employed in the various visual indicators described herein. The strip 3000 provides for multiple LEDs organized in a two-dimensional arrangement two LEDs wide and multiple LEDs long. The strip 3000 can be cut to a desired length and are malleable and fairly durable and can be coated in a clear or colored coating to be waterproof or uncoated. In one embodiment, a set of LEDs, two wide and three long can be used where the first row is red, the next is green and the third is yellow, orange or some other color that is desired to indicate various types of warnings. The components of the strip 3000 include a copper connecting pad 3002, a voltage rating indicated 3004, soldering pads 3006, supporting circuitry 3008, an LED SMD chip 3010, connection polarity markings 3012 and a cutting interval 3014.

Figure 31A:
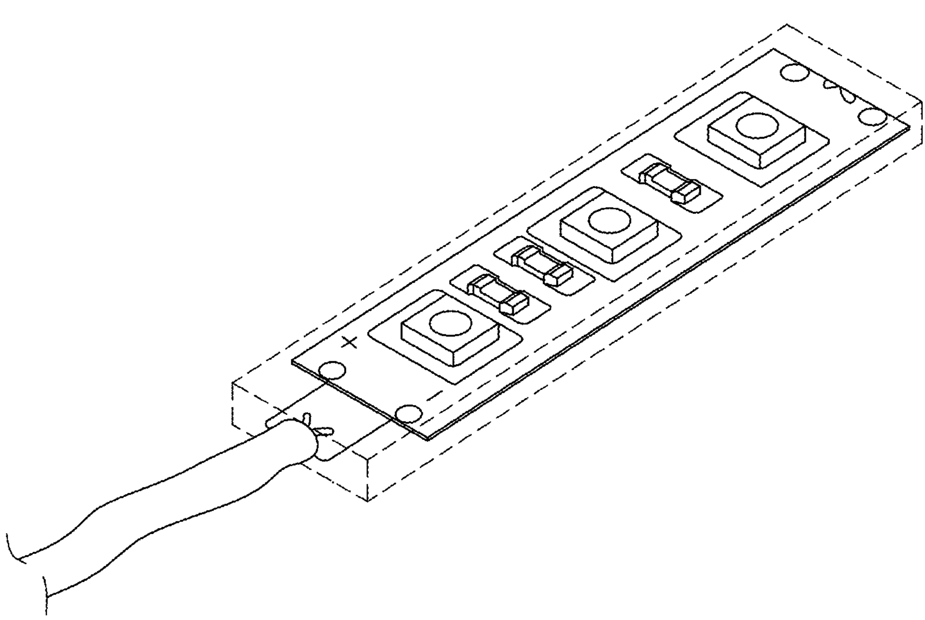
FIGS. 31A and 31B are illustrations of another exemplary strip of LEDs.
Figure 31B:
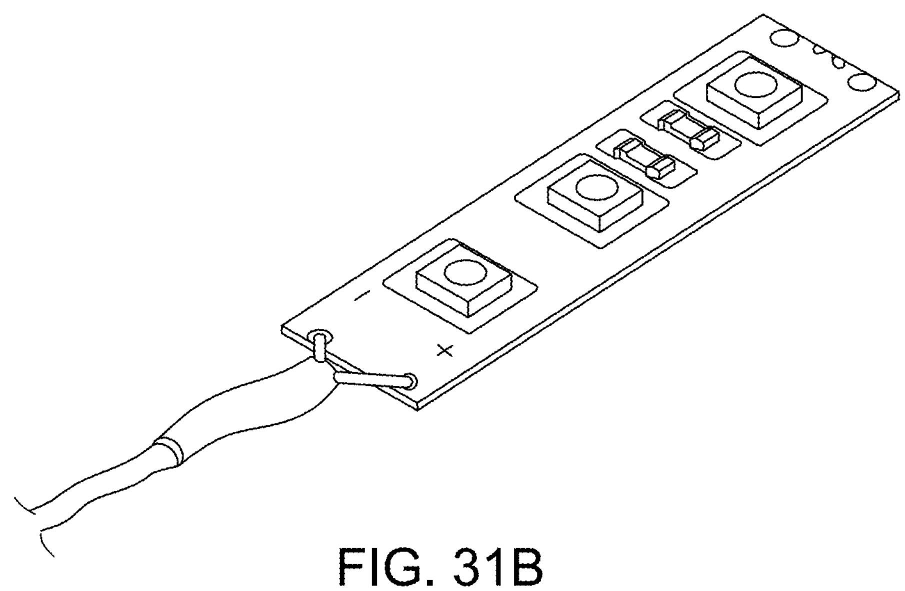

FIGS. 31A and 31B are illustrations of another exemplary strip of LEDs, respectively, in coated and uncoated form. The strips shown in these figures may take the form described above in connection with FIGS. 29-30.

Figure 32A:
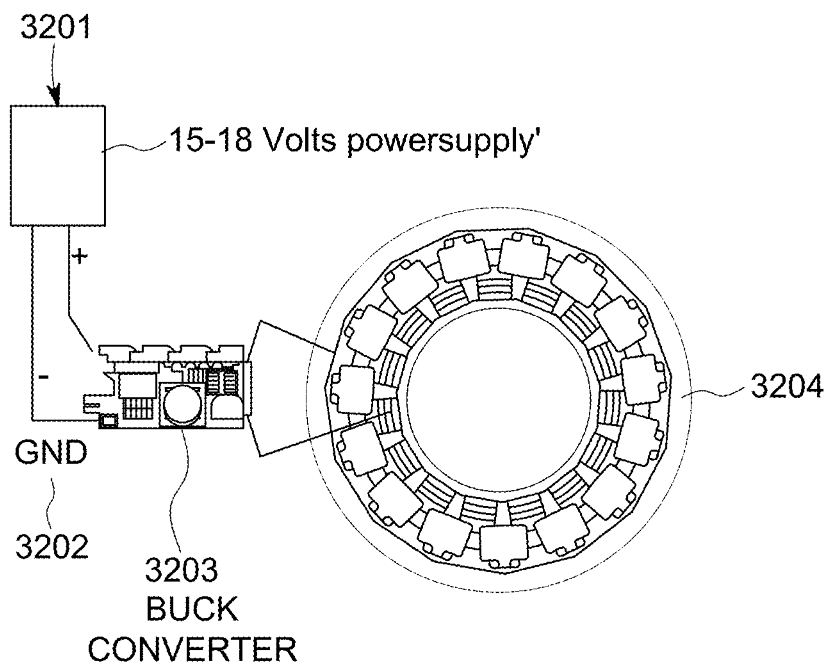
FIG. 32A illustrates another lighting unit that may be employed to provide one or more of the disclosed visual indications.
Figure 32B:
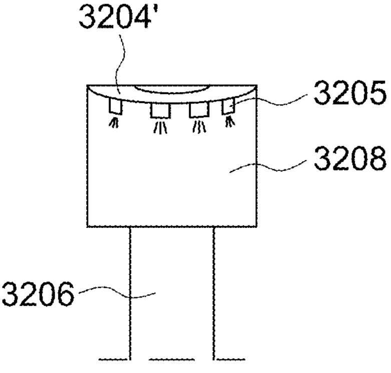
FIG. 32B shows an example of the lighting unit of FIG. 32A

FIG. 32A illustrates another lighting unit that may be employed to provide one or more of the disclosed visual indications. A powered or battery power unit 3201 provides electrical energy by way of wires 3202 leading to buck converter 3203 which contains a sensor and controls to illuminate a LED light ring inside of the collar of the fueling dispenser handle or the collar at the location where the collar meets the dispenser. LED board 3204 with the LEDs in sequence provide illumination that extends outward from the LED board 3204 in substantially the same plane as the LED board 3204. FIG. 32B shows an example of the lighting unit of FIG. 32A where the LEDs 3205 on the LED board 3204' are positioned to direct light along a tube or hose 3206 that is encircled by the LED board 3204. In such a configuration the LEDs on LED board 3204 project light on a path that is substantially perpendicular to the plane of the LED board 3204. The light may shine downwards through collar 3208.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

EXHIBIT A

ISO/IS 19880-2(en)

Gaseous Hydrogen—Fueling Stations—Part 2: Dispensers

3 Terms and Definitions

For the purposes of this document, the following terms and definitions apply.

ISO and IEC maintain terminological databases for use in standardization at the following addresses:

- ISO Online browsing platform: available at http://www.iso.org/obp
- EC Electropedia: available at http://www.electropedia.org/

3.1 Automatic Valve valve that is self-actuated or remotely actuated by a control device 3.2 Breakaway Device component installed upstream of the nozzle to shut off gas flow in the event of vehicle driving away while still connected to the dispenser 3.3 Component Pressure Rating maximum allowable pressure at which it is permissible to operate a component as specified by the manufacturer at a specified temperature Note 1 to entry: Components designed to the Maximum Allowable Pressure under the European Pressure Equipment Directive have their component ratings by the manufacturer indicated by the value of "PS".

Note 2 to entry: Further guidance on dispenser pressure terminology and design rating is included in 19880-1.

3.4 Control System system which responds to input signals from the process and/or from an operator and generates output signals causing the process to operate in the desired manner 3.5 Cv Value (Flow Coefficient)

coefficient to represent the flow rate of fluid that a valve is capable of handling Note 1 to entry: Cv is the flow coefficient of a valve with the fluid at 15.56° C. under a pressure difference of 703 kg/m$^2$.

Note 2 to entry: There are different types of flow coefficients including Cv, Kv and Av.

3.6 Dispenser parts of the pressurized-gas fueling station via which the pressurized gas is dispensed to vehicles Note 1 to entry: As an example, the dispenser may include a dispenser housing, gas flow meter, a fueling hose and fueling nozzle attachments.

3.7 Dispensing System system, downstream of the hydrogen storage, comprising all equipment necessary to carry out the vehicle fueling and protect against dispensing faults 3.8 Emergency Shutdown System (ESS)

system which responds to automatic and/or manually activated emergency shutdown devices to stop hazardous movements and operations such as the flow of hydrogen gas to the dispenser and vehicle 3.0 E-Stop device for manually activating the ESS 3.10 Enclosure protective housing that may enclose, or partially enclose, equipment such as compressors, valve manifolds, compressed hydrogen storage systems in order to protect equipment from the environment, provide noise attenuation, or provide safety barrier to the areas surrounding the equipment Note 1 to entry: In this standard the enclosure of the dispenser is defined as a "housing."

Note 2 to entry: Some hydrogen station manufacturers may build an all-in-one fueling station where the dispenser components are built into one side or end of the equipment enclosure without using a separate dispenser housing.

3.11 Fitting connector used in joining piping, tubing, or components for internal fluid transfer 3.12 Fueling Assembly part of the dispenser providing the interface between the hydrogen fueling station and the vehicle an assembly consisting of a breakaway device,qj a hose(s), a nozzle and connectors between these components 3.13 Fueling Station facility for the dispensing of compressed hydrogen, which includes all stationary equipment that supplies, compresses, stores, and dispenses gaseous hydrogen to fuel a land vehicle 3.14 Fueling Hose flexible conduit used for dispensing gaseous hydrogen to vehicles through a fueling nozzle 3.15 Housing protective structure that encloses process piping and may also enclose measurement, control and ancillary dispenser equipment including point of sale and user authorization interface Note 1 to entry: Housing may be synonymous with: enclosure, cabinet, or frame.

3.16 Hydrogen Service Level (HSL)

pressure level in MPa used to characterize the hydrogen service of the dispenser based on the NWP rating of the vehicle Note 1 to entry: The numerical value of HSL also matches the number after the "H" in Pressure Class. See the definition of Pressure Class for further discussion.

3.17 Manufacturer person or organization responsible for the design and fabrication of the equipment and components 3.18 Maximum Allowable Working Pressure (MAWP)

maximum pressure that a component may experience in service, including upset conditions, independent of temperature, before initiating mitigation options, which is typically the basis for the set point of the pressure relief device protecting the vessel or piping system Note 1 to entry: The maximum allowable working pressure may also be defined as the design pressure, the maximum allowable operating pressure, the maximum permissible working pressure, or the maximum allowable pressure for the rating of pressure vessels and equipment manufactured in accordance with national pressure vessel codes.

Note 2 to entry: For further guidance on pressure terminology, refer to Annex D of ISO/TR 19880-1.

3.19 Nominal Working Pressure (NWP)

pressure to which a full vehicle tank (that is being fueled by the dispenser) settles at a temperature of 15° C.

Note 1 to entry: For further guidance on pressure terminology and associated equipment ratings, refer to Annex D of ISO/TR 19880-1.

3.20 Nozzle device connected to a fuel dispensing system, which permits the quick connect and disconnect of fuel supply to the receptacle of the vehicle or storage system [SOURCE: ISO 17268]

3.21 Pressure Class non-dimensional rating for hydrogen vehicle fueling interface hardware that defines the operational pressure limits of a dispenser service (nozzle)

Note 1 to entry: Values are based on achieving the MOP needed to fill the CHSS of the hydrogen vehicle over the full range of operating conditions. See ISO 19880-1 for background and guidance.

3.22 Pressure Safety-Relief Valve (PSV)

pressure-activated valve that opens at a specified set point to protect a system from overpressure and re-closes when the pressure falls below the set point Note 1 to entry: Pressure safety-relief valves are also known as pressure safety valves (PSVs) and pressure relief valves (PRVs), but the latter term often leads to confusions with pressure regulating valves, also abbreviated PRVs.

3.23 Receptacle device on the vehicle that receives the nozzle for fueling 3.24 Risk Assessment determination of quantitative or qualitative value of risk related to a specific situation, recognized threats (also called hazards) and the layers of protection provided by the system design.

3.25 Safety Function function to be implemented by a control system or safety-instrumented system, which is intended to achieve or maintain a safe state for the process, with respect to a specific hazardous situation 3.26 State of Charge (SOC)

ratio of hydrogen density to the density at the maximum operating pressure rated at the standard temperature 15° C. in a compressed hydrogen storage system (CHSS)

Note 1 to entry: SOC is expressed as a percentage and is computed based on the gas density as per formula below:

$$SOX(\%) = \frac{\rho(P, T)}{\rho(NWP, 15^\circ\text{ C.})} \times 100 \quad \text{(Eq. 1)}$$

Hydrogen densities of CHSS at the two major nominal working pressures are respectively:

At 35 MPa and 15° C.=24.0 g/L

At 70 MPa and 15° C.=40.2 g/L.

3.27 Target Pressure dispensing pressure that the hydrogen fueling protocol targets for the end of fueling 3.28 Test Pressure pressure to which a component or equipment is taken during testing 3.29 Valve device by which the flow of a fluid may be started, stopped, or regulated by a movable part which opens or obstructs passage.

What is claimed is:

1. Apparatus for providing hydrogen to a vehicle, comprising:

a hose that carries hydrogen from a pump to the vehicle;

a nozzle attached to an end of the hose and adapted to removably attach to a filling receptacle on the vehicle;

a handle, attached to the nozzle and adapted to permit movement by a user of the nozzle to permit removable attachment of the nozzle to the filling receptacle on the vehicle;

one or more temperature sensors disposed on one or more of the hose, handle, and the nozzle; and wherein the hose has disposed thereon a visual indicator, that comprises one or more light emitting diodes, responsive to the one or more temperature sensors, and that provides a first visual textual indication, comprising one or more characters, indicating flow of hydrogen through the hose to the filling receptacle on the vehicle, and that provides a second visual textual indication, comprising one or more characters, when temperature of a surface of the handle is in a range to cause thermal injury to the user.

2. The apparatus of claim 1 wherein the visual indicator comprises a sheath that encloses one or more portions of the hose and that includes the one or more light emitting diodes.

3. The apparatus of claim 1 wherein the visual indicator causes at least one of the first visual textual indication and the second visual textual indication to flash.

4. The apparatus of claim 1 wherein the visual indicator causes at least one of the first and the second visual textual indication to blink.

5. The apparatus of claim 1 wherein the visual indicator causes the first visual textual indication and the second visual textual indication to be provided in sequence.

6. The apparatus of claim 1 wherein the visual indicator causes illumination of at least one of the first and the second visual textual indication to be adjusted to cause the at least one of the first and the second visual textual indication to be changed from bright to dim.

7. The apparatus of claim 1 further comprising one or more pressure sensors disposed on one or more of the hose, handle, and the nozzle, wherein the visual indicator disposed on the hose is responsive to the one or more pressure sensors to provide a third indication to the user when pressure of hydrogen in one or more of the hose, handle and nozzle is outside of a predetermined pressure range.

8. The apparatus of claim 1 wherein the first visual textual indication of flow of hydrogen through the hose to the filling receptacle on the vehicle is provided upon a determination that flow of hydrogen through the hose is within predetermined operational boundaries.

9. The apparatus of claim 1 wherein:

the handle has disposed thereon a second visual indicator, responsive to the one or more temperature sensors, that provides a first indication of flow of hydrogen through the hose to the filling receptacle on the vehicle, and that provides a second indication to the user when temperature of a surface of the handle is in a range to cause thermal injury to the user.

10. The apparatus of claim 1 wherein the first visual textual indication comprises a first color and the second visual indication comprises a change in color to a second color.

11. The apparatus of claim 1 wherein the hose provides a third visual textual indication to indicate a completion of filling of the vehicle.

12. The apparatus of claim 1 further comprising a humidity sensor positioned on one or more of the hose, nozzle and handle to sense humidity and wherein the visual indicator is responsive to the humidity sensor.

13. The apparatus of claim 1 further wherein at least one of the first visual textual indication and the second visual textual indication is additionally received from a sensor positioned on the vehicle.

14. Apparatus for providing electrical energy to a vehicle, comprising:

a charging hose containing one or more cables to provide electrical energy from charging station to the vehicle;

a connector attached to an end of the charging hose and adapted to removably attach to a charging receptacle on the vehicle;

a handle, attached to the connector and adapted to permit movement by a user of the connector to permit removable attachment of the connector to the charging receptacle on the vehicle;

one or more temperature sensors disposed on one or more of the charging hose, handle, and the connector; and wherein the charging hose has disposed thereon a visual indicator that comprises one or more light emitting diodes, the visual indicator responsive to the one or more temperature sensors, the visual indicator providing a first visual textual indication, comprising one or more characters, indicating charging of the vehicle, and providing a second visual textual indication, comprising one or more characters, when temperature of a surface of the handle is in a range to cause thermal injury to the user.

15. The apparatus of claim 14 wherein the visual indicator comprises a sheath that encloses one or more portions of the hose and that includes the one or more light emitting diodes.

16. The apparatus of claim 14 wherein the visual indicator causes at least one of the first visual textual indication and the second visual textual indication to flash.

17. The apparatus of claim 14 wherein the visual indicator causes at least one of the first and the second visual textual indication to blink.

18. The apparatus of claim 14 wherein the visual indicator causes the first visual textual indication and the second visual textual indication to be provided in sequence.

19. The apparatus of claim 14 wherein the visual indicator causes illumination of at least one of the first and the second visual textual indication to be adjusted to cause the at least one of the first and the second visual textual indication to be changed from bright to dim.

20. The apparatus of claim 14 wherein the first visual textual indication of charging of the vehicle by way of the hose and connector is provided upon a determination that charging of the vehicle is within predetermined operational boundaries.

21. The apparatus of claim 14 further comprising:

a transmitter, responsive to the one or more temperature sensors, to provide the first visual textual indication and the second visual textual indication to a vehicle communication unit disposed in the vehicle.

22. The apparatus of claim 21 wherein the vehicle communication unit:

provides at least one of the first visual textual indication and the second visual textual indication to a location that is separate from the vehicle.

23. The apparatus of claim 14 further comprising:

an audible indicator that is responsive to the one or more temperature sensors to provide a first audible indication to the user when temperature of a surface of the handle is in a range to cause thermal injury to the user.

24. Apparatus for providing hydrogen to a vehicle, comprising:

a hose that carries hydrogen from a pump to the vehicle;

a nozzle attached to an end of the hose and adapted to removably attach to a filling receptacle on the vehicle;

a cuff positioned adjacent to the nozzle and disposed upon an outer surface of the hose;

a handle, attached to the nozzle and adapted to permit movement by a user of the nozzle to permit removable attachment of the nozzle to the filling receptacle on the vehicle;

one or more temperature sensors disposed on one or more of the hose, handle, the nozzle and cuff; and wherein the cuff has disposed thereon a visual indicator, that comprises one or more light emitting diodes, responsive to the one or more temperature sensors, and that provides a first visual indication, indicating flow of hydrogen through the hose to the filling receptacle on the vehicle, and that provides a second visual indication when temperature of a surface of the handle is in a range to cause thermal injury to the user.

25. The apparatus of claim 24 wherein the cuff is rotatably mounted.

26. The apparatus of claim 24 wherein at least one of the first visual indication and the second visual indication comprises one or more characters.

* * * * *